US008467397B2

(12) United States Patent
Lysejko et al.

(10) Patent No.: US 8,467,397 B2
(45) Date of Patent: Jun. 18, 2013

(54) APPARATUS AND METHOD FOR CONTROLLING A WIRELESS FEEDER NETWORK

(75) Inventors: Martin Lysejko, Bagshot (GB); Andrew Logothetis, High Wycombe (GB); David Warman, Bracknell (GB)

(73) Assignee: Airspan Networks Inc., Boca Raton, FL (US)

( * ) Notice: Subject to any disclaimer, the term of this patent is extended or adjusted under 35 U.S.C. 154(b) by 0 days.

(21) Appl. No.: 13/252,131

(22) Filed: Oct. 3, 2011

(65) Prior Publication Data
US 2012/0082050 A1    Apr. 5, 2012

(30) Foreign Application Priority Data

Oct. 4, 2010  (GB) .................................. 1016647.8
Sep. 27, 2011  (GB) .................................. 1116613.9

(51) Int. Cl.
*H04L 12/28*    (2006.01)
(52) U.S. Cl.
USPC ....................................... 370/395.4; 370/401
(58) Field of Classification Search
None
See application file for complete search history.

(56) References Cited

U.S. PATENT DOCUMENTS

| 6,963,747 | B1 | 11/2005 | Elliott |
| 7,664,534 | B1 | 2/2010 | Johnson |
| 2002/0142779 | A1 | 10/2002 | Goto et al. |
| 2004/0077354 | A1 | 4/2004 | Jason et al. |
| 2005/0192037 | A1 | 9/2005 | Nanda et al. |
| 2006/0072518 | A1 | 4/2006 | Pan et al. |
| 2008/0123589 | A1 | 5/2008 | Lee et al. |
| 2009/0067333 | A1 | 3/2009 | Ergen et al. |
| 2009/0103492 | A1 | 4/2009 | Altshuller et al. |
| 2009/0116444 | A1 | 5/2009 | Wang et al. |
| 2009/0252088 | A1 | 10/2009 | Rao et al. |

(Continued)

FOREIGN PATENT DOCUMENTS

| EP | 1039689 | A2 | 9/2000 |
| EP | 1624627 | A2 | 2/2006 |

(Continued)

OTHER PUBLICATIONS

Back, T., "Evolutionary Algorithms in Theory and Practice: Evolution Strategies, Evolutionary Programming, Genetic Algorithms," Oxford University, 1996, (text book, no copy available).

(Continued)

*Primary Examiner* — Robert Wilson
(74) *Attorney, Agent, or Firm* — Haynes Beffel & Wolfeld LLP

(57) ABSTRACT

An apparatus and method are provided for controlling a wireless feeder network used to couple access base stations of an access network with a communications network. The wireless feeder network connects base stations coupled to the communications network and feeder terminals coupled to associated access base stations. Each feeder terminal has a feeder link with a feeder base station. The method includes allocating resource blocks for the feeder base stations and feeder terminals to establish the feeder links. The resource blocks are allocated between a centrally administered schedule and at least one feeder base station administered schedule. Network traffic being carried by the feeder links is monitored to determine at least one characteristic. The resource blocks are reallocated between the centrally administered schedule and the at least one feeder base station administered schedule in dependence on the at least one characteristic of the network traffic.

26 Claims, 50 Drawing Sheets

U.S. PATENT DOCUMENTS

| | | | |
|---|---|---|---|
| 2009/0274076 | A1 | 11/2009 | Muharemovic et al. |
| 2009/0310554 | A1 | 12/2009 | Sun et al. |
| 2010/0216477 | A1 | 8/2010 | Ryan |
| 2010/0240380 | A1 | 9/2010 | Yim et al. |
| 2012/0002598 | A1 | 1/2012 | Seo et al. |
| 2012/0082044 | A1* | 4/2012 | Lysejko et al. ............ 370/252 |
| 2012/0082050 | A1* | 4/2012 | Lysejko et al. ............ 370/252 |
| 2012/0082061 | A1* | 4/2012 | Lysejko et al. ............ 370/254 |

FOREIGN PATENT DOCUMENTS

| | | | |
|---|---|---|---|
| EP | 1681816 A1 | 7/2006 | |
| EP | 1924109 A1 | 5/2008 | |
| EP | 2037706 A2 | 3/2009 | |
| EP | 2088826 A2 | 8/2009 | |
| EP | 2372927 A2 | 10/2011 | |
| GB | 2356320 A | 5/2001 | |
| WO | 02063798 A1 | 8/2002 | |
| WO | 2002 087176 A2 | 10/2002 | |
| WO | 2004 073243 A2 | 8/2004 | |
| WO | 2006 123854 A1 | 11/2006 | |
| WO | 2008007375 A2 | 1/2008 | |
| WO | 2008 024773 A2 | 2/2008 | |
| WO | 2008015562 A2 | 2/2008 | |
| WO | 2008029411 A2 | 3/2008 | |
| WO | 2008037853 A1 | 4/2008 | |
| WO | 2010003509 A1 | 1/2010 | |
| WO | 2010018516 A1 | 2/2010 | |
| WO | 2010047627 A1 | 4/2010 | |
| WO | 2010107207 A2 | 9/2010 | |
| WO | 2010125427 A1 | 11/2010 | |
| WO | 2010126852 A1 | 11/2010 | |
| WO | 2012000046 A1 | 1/2012 | |

OTHER PUBLICATIONS

Back, T., et al., "Evolutionary computation: comments on the history and current state," IEEE Transactions on Evolutionary Computation, vol. 1, pp. 3-17, Apr. 1997, Online available at http://citeseer.ist.psu.edu/viewdoc/summary?doi=10.1.1.6.5943 (accessed May 24, 2010).

Weise, T., "Global Optimization Algorithms, Theory and Application," http://www.it-weise.de/projects/book.pdf, Jun. 26, 2009, 820 pgs.

International Search Report from corresponding Application No: GB1016650.2, mailed Jan. 21, 2011, 3 pgs.

International Search Report from corresponding Application No: GB1016648.6, mailed Jan. 19, 2011, 5 pgs.

International Search Report from corresponding Application No: GB1016647.8, mailed Jan. 31, 2011, 4 pgs.

Search Report from corresponding GB Application No. GB1116613.9; Jan. 26, 2012; 5 pgs.

Sesia, S, Toufik, I and M., Baker. LTE: The UMTS Long Term Evolution. s.l. : Wiley, 2009; pp. 24-26. ISBN 978-0-470-69716-0.

Lescuyer, P and Lucidarme, T. Evolved Packet System: The LTE and SAE Evolution of 3G UMTS. s.l. : Wiley, 2008; pp. 172-175. ISBN 978-470-05976-0.

Melson, T and Blake, S. RFC 4562: Mac Forced Forwarding, IETF; Jun. 2006; 17 pgs.

Ye Wu, B and Chao, K-M. Chapter 1. Spanning Trees and Optimization Problems. s.l. : Chapman & Hall/CRC, 2004; pp. 1-7. ISBN 1-58488-436-3.

Policy charging and control architecture. 3GPP. 9.3.0, Technical Specification 23.203, Section 6.1.7; Dec. 2009; 123 pgs.

Architecture Tenets, Reference Model and Reference Points. WiMax. WMF-T32-001-R015v01, WiMax Forum Network Architecture, Section 7.6; Nov. 30, 2010; 246 pgs.

System Evaluation Methodology. WiMax Forum. Dec. 15, 2007, V 2.0, Sect 3; 208 pgs.

Labovitz, et al.; ATLAS Internet Observatory 2009 Annual Report. s.l. : http://www.nanog.org/meetings/nanog47/presentations/Monday/Labovitz_ObserveReport_N47_Mon.pdf, NANOG.NANOG 47. 32 pgs.

Labovitz, C. The Internet After Dark. Jan. 2009, Arbor Networks, http://asert.arbornetworks.com/2009/08/the-internet-after-dark/. 6 pgs. [URL checked Dec. 14, 2011].

Labovitz, C. What Europeans do at night. Feb. 2009, Arbor Networks, http://asert.arbornetworks.com/2009/08/what-europeans-do-at-night/. 8 pgs. [URL checked Dec. 14, 2011].

Szabo et al. Traffic Analysis of Mobile Broadband Networks. 2007. Mobile WiCon. 8 pgs.

Tomlinson, D.; Streaming and iPlayer news. 2008, Plusnet Blog, http://community.plus.net/blog/2008/07/17/more-record-breaking-streaming-and-the-latest-iplayer-news/. 10 pgs. [URL checked Dec. 14, 2011].

Leland, W. and Willenger, W.; On the self-similar nature of Ethernet traffic (extended version); 1994, IEEE/ACM Trans Net, pp. vol. 2, No. 1 (Feb. 1994); 15 pgs.

Paxson, V. and Floyd, S.; Wide-Area Traffic: The Failure of Poisson Modeling. 1995, IEEE/ACM Trans Net, vol. 3, No. 3 (Jun. 1995); 21 pgs.

Park, K. and Willenger, W. Self Similar Network Traffic and Performance Evaluation. s.l. : Wiley, © 2000; 574 pgs.

Karagiannis, T, et al. A Nonstationary Poisson View of Internet Traffic. 2004. Proc INFOCOM04. 12 pgs.

Ekelin, S. and Nilsson, M. The Failure of "The Failure of Poisson Modeling" for Internet Bandwidth Measurements. Linkoping, Sweden : s.n., 2005. Proc. RadioVetenskap och Kommunikation (RVK 2005). 4 pgs.

Jiang and Dovrolis. Why is the Internet Traffic Bursty in Short Time Scales? Jun. 2005, SIGMETRICS'05; 12 pgs.

Dottling et al. Radio Technologies and Concepts for IMT-Advanced. s.l. : Wiley, 2009, pp. 508-512. ISBN 978-0-470-73763-6.

Bengtsson M et al., "D1.4 Initial Report on Advanced Multiple Antenna Systems," ed. P. Komulainen, CELTIC/ CP5-026 Wireless World Initiative New Radio—Winner+, Jan. 16, 2009, 110 pp.

Qualcomm Europe, Agenda item 11, "Coordinated Multi-Point downlink transmission in LTE-Advanced," Prague Nov. 2008, 3GPP TSG-RANWG1 #55, R1-084400, 6 pp.

International Search Report for corresponding International Application No. PCT/GB2011/051515; Nov. 3, 2011; 5 pgs.

International Search Report from corresponding application No. PCT/GB2011/051553; Nov. 3, 2011; 5 pgs.

International Search Report for Corresponding Application No. PCT/GB2011/051554; Nov. 25, 2011; 5 pgs.

International Search Report for Corresponding Application No. PCT/GB2011/051838; Nov. 7, 2011; 5 pgs.

International Preliminary Report on Patentability from corresponding Application No: PCT/GB2011/051838, mailed Jan. 15, 2013, 32 pages.

\* cited by examiner

Controlability regions

Visability regions $D_{FBS}$ = [ [1], [2], [3] ]
$D_{FT}$ = [ [1,2,3,4,5,6,7,8,9,10,11,12,13,14], [1,2,3,4,5,6,7,8,9,10,11,12,13,14], [1,2,3,4,5,6,7,8,9,10,11,12,13,14]]
$U_{FT}$ = [ [1], [2], [3], [4], [5], [6], [7], [8], [9], [10], [11], [12], [13], [14] ]
$U_{FBS}$ = [ [1,2,3], [1,2,3], [1,2,3], [1,2,3], [1,2,3], [1,2,3], [1,2,3], [1,2,3], [1,2,3], [1,2,3], [1,2,3], [1,2,3], [1,2,3], [1,2,3] ]

Initial network, prior to global sounding

Global sounding complete. Visibility matrix generated.

n=4
$D_{FBS} = [[4]]$
$D_{FT} = [[1,2,3,4,5,6,7,8]]$
$U_{FT} = [[1], [2], [3], [4], [5], [6], [7], [8]]$
$U_{FBS} = [[1,4], [1,4], [1,3,4], [3,4], [3,4], [3,4], [3,4], [3,4]]$
V = [1 0 0 1]
    [1 0 0 1]
    [1 0 1 1]
    [0 0 1 1]
    [0 0 1 1]
    [0 0 1 1]
    [0 0 1 1]
    [0 0 1 1]
    [0 0 1 0]
    [0 0 1 0]
    [0 1 1 0]
    [0 1 1 0]
    [1 1 1 0]
    [1 0 0 0]

Hypothesised visibility matrix prior to initial sounding

Updated visibility matrix post initial sounding

Hypothesised visibility matrix prior to initial sounding

Updated visibility matrix post initial sounding

| DL (FBS → FT), [RB id] | | | | | UL (FT → FBS), [RB id] | | | | |
|---|---|---|---|---|---|---|---|---|---|
| [41] (8,41) | [42] (8,42) | [43] (8,43) | [44] (8,44) | [45] (8,45) | [41] (41,8) | [42] (42,8) | [43] (43,8) | [44] (44,8) | [45] (45,8) |
| [36] (7,36) | [37] (7,37) | [38] (7,38) | [39] (7,39) | [40] (7,40) | [36] (36,7) | [37] (37,7) | [38] (38,7) | [39] (39,7) | [40] (40,7) |
| [31] (6,31) | [32] (6,32) | [33] (6,33) | [34] (6,34) | [35] (6,35) | [31] (31,6) | [32] (32,6) | [33] (33,6) | [34] (34,6) | [35] (35,6) |
| [26] (5,26) | [27] (5,27) | [28] (5,28) | [29] (5,29) | [30] (6,30) | [26] (26,5) | [27] (27,5) | [28] (28,5) | [29] (29,5) | [30] (30,6) |
| [21] (4,21) | [22] (4,22) | [23] (4,23) | [24] (4,24) | [25] (5,25) | [21] (21,4) | [22] (22,4) | [23] (23,4) | [24] (24,4) | [25] (25,5) |
| [16] (3,10) | [17] (3,11) | [18] (3,12) | [19] (3,13) | [20] (4,20) | [16] (10,3) | [17] (11,3) | [18] (12,3) | [19] (13,3) | [20] (20,4) |
| [11] (2,17) | [12] (2,18) | [13] (2,19) | [14] (3,8) | [15] (3,9) | [11] (17,2) | [12] (18,2) | [13] (19,2) | [14] (8,3) | [15] (9,3) |
| [6] (1,6) | [7] (1,7) | [8] (2,14) | [9] (2,15) | [10] (2,16) | [6] (6,1) | [7] (7,1) | [8] (14,2) | [9] (15,2) | [10] (16,2) |
| [1] (1,1) | [2] (1,2) | [3] (1,3) | [4] (1,4) | [5] (1,5) | [1] (1,1) | [2] (2,1) | [3] (3,1) | [4] (4,1) | [5] (5,1) |

UL/DL resource block assignments. Simple orthogonal case.

FIG. 23

| | DL (FBS → FT) | | | | | UL (FT → FBS) | | | | |
|---|---|---|---|---|---|---|---|---|---|---|
| | (3,10)(5,28)(8,44) | (3,10)(5,28)(8,44) | (3,11)(5,29)(8,45) | (3,11)(5,29)(8,45) | (3,11)(5,29)(8,45) | (16,2)(24,5)(39,7) | (16,2)(24,5)(39,7) | (17,2)(20,4)(31,6) | (17,2)(20,4)(31,6) | (17,2)(20,4)(31,6) |
| | (3,8)(5,26)(8,42) | (3,9)(5,27)(8,43) | (3,9)(5,27)(8,43) | (3,9)(5,27)(8,43) | (3,10)(5,28)(8,44) | (12,3)(13,2)(36,7) | (14,2)(30,6)(37,7) | (14,2)(30,6)(37,7) | (14,2)(30,6)(37,7) | (16,2)(24,5)(39,7) |
| | (3,7)(5,25)(8,41) | (3,7)(5,25)(8,41) | (3,7)(5,25)(8,41) | (3,8)(5,26)(8,42) | (3,8)(5,26)(8,42) | (11,3)(29,5)(45,8) | (11,3)(29,5)(45,8) | (11,3)(29,5)(45,8) | (12,3)(13,2)(36,7) | (12,3)(13,2)(36,7) |
| | (2,16)(5,24)(7,39) | (2,16)(5,24)(7,39) | (2,17)(4,20)(6,31) | (2,17)(4,20)(6,31) | (2,17)(4,20)(6,31) | (9,3)(27,5)(43,8) | (9,3)(27,5)(43,8) | (10,3)(28,5)(44,8) | (10,3)(28,5)(44,8) | (10,3)(28,5)(44,8) |
| | (2,13)(3,12)(7,36) | (2,14)(6,30)(7,37) | (2,14)(6,30)(7,37) | (2,14)(6,30)(7,37) | (2,16)(5,24)(7,39) | (7,3)(25,5)(41,8) | (8,3)(26,5)(42,8) | (8,3)(26,5)(42,8) | (8,3)(26,5)(42,8) | (9,3)(27,5)(43,8) |
| | (1,6)(2,18)(6,35) | (1,6)(2,18)(6,35) | (1,6)(2,18)(6,35) | (2,13)(3,12)(7,36) | (2,13)(3,12)(7,36) | (6,1)(18,2)(35,6) | (6,1)(18,2)(35,6) | (6,1)(18,2)(35,6) | (7,3)(25,5)(41,8) | (7,3)(25,5)(41,8) |
| | (1,4)(4,22)(6,33) | (1,4)(4,22)(6,33) | (1,5)(4,23)(6,34) | (1,5)(4,23)(6,34) | (1,5)(4,23)(6,34) | (4,1)(22,4)(33,6) | (4,1)(22,4)(33,6) | (5,1)(23,4)(34,6) | (5,1)(23,4)(34,6) | (5,1)(23,4)(34,6) |
| | (1,2)(2,15)(7,38) | (1,3)(4,21)(6,32) | (1,3)(4,21)(6,32) | (1,3)(4,21)(6,32) | (1,4)(4,22)(6,33) | (2,1)(15,2)(38,7) | (3,1)(21,4)(32,6) | (3,1)(21,4)(32,6) | (3,1)(21,4)(32,6) | (4,1)(22,4)(33,6) |
| | (1,1)(4,19)(7,40) | (1,1)(4,19)(7,40) | (1,1)(4,19)(7,40) | (1,2)(2,15)(7,38) | (1,2)(2,15)(7,38) | (1,1)(19,4)(40,7) | (1,1)(19,4)(40,7) | (1,1)(19,4)(40,7) | (2,1)(15,2)(38,7) | (2,1)(15,2)(38,7) |

Frequency ↑ subchannel ↑

← slot → 610

Time →

600

UL/DL resource block assignments. Enhanced orthogonal case.

FIG. 24

Steps in an evolutionary algorithm

Generating and executing global schedules for a single FNC

Controllability regions

Visibility regions

FBS 2 → {FT11, FT12, FT13}

| | | | | | | | | | |
|---|---|---|---|---|---|---|---|---|---|
| 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 |
| 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 |
| 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 |
| 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 |
| 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 | 0.0<br>0.0<br>0.0 |
| 0.3<br>0.2<br>0.0 | 0.3<br>0.2<br>0.0 | 0.3<br>0.2<br>0.0 | 0.3<br>0.2<br>0.0 | 0.3<br>0.2<br>0.0 | 0.3<br>0.2<br>0.0 | 0.3<br>0.2<br>0.0 | 0.3<br>0.2<br>0.0 | 0.3<br>0.2<br>0.0 | 0.3<br>0.2<br>0.0 |
| 0.3<br>0.2<br>0.0 | 0.3<br>0.2<br>0.0 | 0.3<br>0.2<br>0.0 | 0.3<br>0.2<br>0.0 | 0.3<br>0.2<br>0.0 | 0.3<br>0.2<br>0.0 | 0.3<br>0.2<br>0.0 | 0.3<br>0.2<br>0.0 | 0.3<br>0.2<br>0.0 | 0.3<br>0.2<br>0.0 |
| 0.4<br>0.0<br>0.1 | 0.4<br>0.0<br>0.1 | 0.4<br>0.0<br>0.1 | 0.4<br>0.0<br>0.1 | 0.4<br>0.0<br>0.1 | 0.4<br>0.0<br>0.1 | 0.4<br>0.0<br>0.1 | 0.4<br>0.0<br>0.1 | 0.4<br>0.0<br>0.1 | 0.4<br>0.0<br>0.1 |
| 0.4<br>0.0<br>0.1 | 0.4<br>0.0<br>0.1 | 0.4<br>0.0<br>0.1 | 0.4<br>0.0<br>0.1 | 0.4<br>0.0<br>0.1 | 0.4<br>0.0<br>0.1 | 0.4<br>0.0<br>0.1 | 0.4<br>0.0<br>0.1 | 0.4<br>0.0<br>0.1 | 0.4<br>0.0<br>0.1 |

Frequency ↑ / subchannel ↓

← slot → / Time →

FIG. 42

Example of offered and delivered traffic for various traffic demands using global schedules.

Example of offered and delivered traffic for various traffic demands using global and autonomous schedules.

| Traffic Type | Bandwidth | Latency | Persistence | Priority |
|---|---|---|---|---|
| VoIP | Low | Critical | Continuous | High |
| Browsing | Variable | Moderate | Intermittent | Medium |
| Streaming | High/Variable | Moderate | Continuous | Medium |
| Gaming | Low | Critical | Intermittent | High |
| P2P | Variable | Unimportant | Continuous | Low |

FIG. 48

APPARATUS AND METHOD FOR CONTROLLING A WIRELESS FEEDER NETWORK

BACKGROUND OF THE INVENTION

1. Field of the Invention

The present invention relates to an apparatus and method for controlling a wireless feeder network used to couple access base stations of an access network with a communications network.

2. Description of the Prior Art

Typical access networks provide a plurality of access base stations which communicate via wireless links with mobile or fixed end user equipment. A number of wireless communications protocols are known for the communications between the access base stations and the end user equipment, for example WiFi, WiMAX, or LTE wireless communications, etc.

The various access base stations need to be coupled with a communications network to allow traffic originating from the user equipment to be propagated on to the communications network, and for traffic within the communications network to be delivered to the required end user equipment within the access network. One known way to provide such connection between the communications network and the access network is to provide wired backhaul connections from each of the base stations to the communications network. However, this requires the access base stations to be located in places where it is feasible to provide a wired backhaul connection to those access base stations. As an alternative to a wired backhaul, it is also known to provide a dedicated out-of-band wireless backhaul to provide a point-to-point wireless connection between each base station and the communications network.

However, as the demands for bandwidth increase, cell splitting techniques have been used, where a cell that would have previously been serviced by a single access base station is sub-divided into smaller geographical regions served by additional access base stations, such cell splitting techniques providing a well-proven technology for increasing system capacity. However, as the number of access base stations are increased, this increases the cost of providing the earlier-described wired or wireless point-to-point backhaul connections between the various access base stations and the communications network. This significantly increases the cost to the operator. For wired backhaul, the cost clearly increases as each additional backhaul connection is required. For a wireless backhaul solution, there is a similar increase in the cost, since scarce radio frequencies must be allocated in advance, and once fixed the frequencies allocated for access (from an access base station to the mobile or fixed end user equipment and vice versa) and for the backhaul (from a base station to the network router and vice versa) cannot change.

There is a growing requirement for the access base stations to be made smaller and easier to deploy in a variety of locations. For example it would be desirable to be able to place such access base stations on street furniture such as lampposts and signage. However, to achieve such an aim, it is necessary for the access base stations to be small, compact and consume low power. There is also a need for an efficient way to connect such access base stations to the communications network via a wireless backhaul connection.

One known approach for reducing the costs associated with providing a backhaul connection for the various base stations is to employ one or more of the base stations as relay stations. Hence, in such embodiments, relay traffic can be passed between base stations, so that at least some of the base stations do not directly need to be connected to the backhaul. However, such relay traffic consumes a significant amount of the total resource provided within the access network for handling data traffic.

Accordingly, it would be desirable to provide an improved mechanism for coupling access base stations of an access network with a communications network, which allows freedom in placement of base stations of the access network, whilst providing a spectrally efficient backhaul connection.

SUMMARY OF THE INVENTION

Viewed from a first aspect, the present invention provides a method of controlling a wireless feeder network used to couple access base stations of an access network with a communications network, the wireless feeder network connecting a plurality of feeder base stations coupled to the communications network and a plurality of feeder terminals coupled to associated access base stations, each feeder terminal having a feeder link with a feeder base station, and the feeder links being established over a wireless resource comprising a plurality of resource blocks, the method comprising the steps of:

allocating resource blocks for use by said plurality of feeder base stations and said plurality of feeder terminals to establish said feeder links, wherein said resource blocks are allocated between a centrally administered schedule in which each resource block is associated with a predetermined feeder link and at least one feeder base station administered schedule in which a set of resource blocks is associated with a predetermined feeder base station, said predetermined feeder base station being configured to implement said feeder base station administered schedule dynamically by using said set of resource blocks in dependence on current traffic requirements of said predetermined feeder base station;

monitoring network traffic being carried by said feeder links to determine at least one characteristic of said network traffic; and re-allocating said resource blocks between said centrally administered schedule and said at least one feeder base station administered schedule in dependence on said at least one characteristic of said network traffic.

In accordance with the present invention, a wireless feeder network is provided which is arranged to couple access base stations of an access network with a communications network. In order to provide this coupling, the wireless feeder network comprises a plurality of feeder base stations coupled to the communications network and a plurality of feeder terminals coupled to associated access base stations. The communication between the feeder terminals and the feeder base stations is provided by each feeder terminal having a feeder link with a feeder base station. These feeder links are established over a wireless resource comprising a plurality of resource blocks. The allocation of resource blocks to feeder links can vary, depending on the current configuration of the wireless feeder network.

The resource blocks form a plurality of orthogonal resources which can be used to provide the links. These orthogonal resources can be provided in a variety of ways. For example, in accordance with a "Time Division Multiple Access" (TDMA) approach, a particular frequency channel of the wireless resource can be partitioned in the time domain such that each resource block occupies a different time slot. As another example, in a "Frequency Division Multiple Access" (FDMA) approach, a band of frequencies may be partitioned, so that each individual frequency forms a resource block. In a combined TDMA/FDMA approach, a combination of time/frequency slot can be used to define each resource block.

As another example, in a "Code Division Multiple Access" (CDMA) approach, a particular frequency channel may be partitioned by applying different orthogonal codes to thereby establish a plurality of resource blocks within the frequency channel.

Whichever approach is taken, when controlling the wireless network it is necessary to determine, at any given moment in time in the network's operation, which resource blocks are allocated to which particular links. In order to increase the system throughput, the individual resource blocks can be reused for multiple links at the cost of increased interference between those links. Interference may be reduced by employing well established reuse plans, but such schemes are generally not adaptive, or are overly conservative, and hence do not permit the maximum utilisation of the wireless network in which they are deployed.

In accordance with the present invention, the plurality of resource blocks which are available for establishing the feeder links are allocated between two types of schedule: a centrally administered ("global") schedule and a feeder base station administered ("autonomous") schedule. On the one hand, in the centrally administered schedule each resource block is associated with a predetermined feeder link, in other words each resource block is predefined as being for enabling communication between a particular feeder terminal and a particular feeder base station. On the other hand, in the feeder base station administered schedule, a set of resource blocks is allocated to a predetermined feeder base station but without further defining which resource blocks should be used by that feeder base station to communicate with which feeder terminals. The predetermined feeder base station then implements the feeder base station administered schedule in a dynamic fashion by using that set of resource blocks defined in the feeder base station administered schedule in dependence on the current traffic requirements of that feeder base station. In other words, the feeder base station can make use of this set of resource blocks as required by the traffic which that feeder base station seeks to exchange with its associated feeder terminals. There can of course (and typically will be) more than one feeder base station administered schedule implemented in the wireless feeder network at a time, indeed there will typically be a feeder base station administered schedule per feeder base station in the wireless feeder network.

After an initial allocation of the resource blocks for use by the feeder base stations and feeder terminals to establish their feeder links, the network traffic then carried by those feeder links is monitored on an ongoing basis. This monitoring of the network traffic enables an overview to be maintained of where resource blocks of the wireless resource are currently being used and with what intensity within the wireless feeder network. In order to parameterise the usage of the wireless resource by the network traffic, at least one characteristic of the network traffic is determined on the basis of the monitoring process.

Thereafter, on the basis of the at least one characteristic of the network traffic, the resource blocks of the wireless resource are then reallocated between the centrally administered ("global") schedule and the at least one feeder base station administered ("autonomous") schedule in order to adapt the usage of the resource blocks within the wireless feeder network to the current network traffic requirements.

Whilst a centrally administered schedule has the advantage of the full overview of network traffic within the wireless feeder network, such a "global" schedule may not be able to be adapted fast enough to respond satisfactorily to shorter term fluctuations in the traffic requirements over particular feeder links. Whilst some variations in traffic requirements are longer term and more predictable, for example those related to typical working hours in a locality or planned events, other aspects of network traffic usage are much less (if at all) predictable. For example a sudden rise in network usage for voice calls at a particular locality may occur due to an unplanned event in the vicinity, such as an accident. On the other hand, providing an "autonomous" schedule associated with each feeder base station typically enables quicker reaction to unpredictable network traffic fluctuations by allowing a feeder base station to allocate resource blocks of the wireless resource to feeder links which are unexpectedly demanding greater bandwidth. Nevertheless, keeping resource blocks available for a particular feeder base station in this "autonomous" manner necessarily means that these resource blocks are tied to a particular feeder base station, and are unavailable for use elsewhere in the wider wireless feeder network. As such, the present invention brings an advantageous degree of flexibility to the boundary between allocation to the "global" and the "autonomous" schedules by monitoring the network traffic being carried by the feeder links and adapting the allocation of the resource blocks between the two types of schedule in dependence on at least one characteristic of the network traffic determined as a result of the monitoring process. The resource blocks of the wireless resource used to establish the wireless feeder network can thus be more efficiently allocated and used.

The monitoring may be performed in a number of different ways, but in one embodiment said monitoring step comprises: gathering traffic information in at least one feeder terminal, said traffic information indicative of said network traffic being handled by said at least one feeder terminal. The feeder terminals represent the components of the wireless feeder network which are closest (indeed coupled) to the access base stations of the access network and are therefore the closest component of the wireless feeder network to the user equipment which is generating the fluctuating demand for the wireless resource. Accordingly, the feeder terminals are expediently placed to gather traffic information which is indicative of the network traffic currently being handled in that part of the wireless feeder network.

A feeder terminal may receive this traffic information in a number of different ways, but in one embodiment said traffic information is received in said at least one feeder terminal from an access base station associated with that feeder terminal. The coupling of the feeder terminals to their associated access base stations provides an interface via which the feeder terminals may receive the traffic information. Accordingly in such an embodiment the traffic information may come from the access base station and be passed to its associated feeder terminal.

The traffic information may be provided to the feeder terminal in a variety of ways by the access base station, some ways being more targeted for the benefit of the feeder terminal than others. For example, in one embodiment said step of gathering traffic information is performed by snooping said network traffic being handled by said at least one feeder terminal. In such an embodiment, the access base station does not explicitly pass any additional information to the feeder terminal, but rather the feeder terminals relies on observing ("snooping") the network traffic which is being handled by the feeder terminal. Accordingly, the feeder terminal merely derives such information that it can about the network traffic which it is passing between its associated access base station and the corresponding feeder base station at the other end of the relevant feeder link. Depending on the nature of the network traffic which this feeder terminal is handling, this may allow a greater or lesser degree of information about the network traffic to be derived. For example, if the access base station is communicating data in an unencrypted fashion with the communications network then the feeder terminal may in principle be able to gain a detailed view of the network traffic because of the visibility of this data. On the other hand, if the access base station is communicating encrypted data with the communications network then a detailed view of the network traffic will typically not be available to the feeder terminal by snooping the network traffic it is handling, but nevertheless the feeder terminal may still be able to derive useful characteristics of the network traffic, despite the encryption, on the basis of the volume of data carried, packet size, unencrypted portions of packet headers and so on.

Alternatively or in addition there may be a more cooperative relationship between the access base station and the feeder terminal. For example, in one such embodiment said step of gathering traffic information is performed by receiving traffic management information from said access base station associated with that feeder terminal. Given the fact that the feeder terminal is coupled to an associated access base station, this provides the opportunity for information to be easily passed or exchanged between these two components. Indeed, in some embodiments of the present invention the feeder terminal and access base station may be provided as a single integrated unit, further enhancing the possibility for information exchange between the two. The traffic management information passed from the access base station to the feeder terminal may take a number of forms, but in essence provides the feeder terminal with information indicative of the network traffic which the access base station is passing to and receiving from the feeder link which couples the feeder terminal to a feeder base station. This traffic management information may be a relatively direct and synchronous indication of the instantaneous network traffic being handled, or may be information presented as a summary of network traffic handled by the access base station over a predetermined time period of recent history.

Whilst the traffic information may be gathered in a feeder terminal, alternatively or in addition the traffic information may be gathered at the other end of the feeder links, and hence in some embodiments said monitoring step comprises: gathering traffic information in at least one feeder base station, said traffic information indicative of said network traffic being handled by said at least one feeder base station. The gathering of traffic information in a feeder base station may take place in an analogous fashion to the gathering of traffic information in a feeder terminal as described above.

The administration of the wireless feeder network may in some embodiments be carried out by a feeder network controller, which maintains the overview of the configuration and performance of the wireless feeder network. In such an embodiment said monitoring step may further comprise: transmitting said traffic information to a feeder network controller, said feeder network controller configured to perform said re-allocating step. Accordingly, the feeder network controller can gather traffic information from one or more components (feeder base stations or feeder terminals) in the wireless feeder network in order to update its view of the performance of the wireless feeder network and to reallocate the resource blocks of the wireless resource between the two types of schedule as necessary.

As mentioned above, the traffic information may take a number of forms. In one embodiment said traffic information comprises a statistical representation of said network traffic. This statistical representation, which may be a relatively instantaneous "snap-shot" of the network traffic being carried by the relevant feeder link or may be a more averaged view developed over a longer time period, may itself take a number of forms. For example in one embodiment said statistical representation of said network traffic is indicative of a bit-rate distribution of said network traffic. A bit-rate distribution (for example a probability density function (pdf) distribution of network traffic handed by a given feeder link gathered empirically over a predetermined time period) provides a useful quantitative measure of the network traffic. In particular, because of the finite capacity of a given feeder link, the bit-rate distribution of the network traffic can quantify the extent to which the network traffic handled falls within the capacity of that feeder link. Whilst a small overshoot of the capacity of a feeder link by the given bit-rate distribution of the network traffic may be absorbed by some moderate packet delay, too great an overshoot can result in unacceptable packet delays and packet drops.

The statistical representation of said network traffic may take a variety of forms. For example it may be a derivative quantity and in one embodiment said statistical representation comprises a characteristic value derived from said bit-rate distribution. This characteristic value may comprise at least one of: a mean value of said bit-rate; and a variance of said bit-rate. Other characterisations of the bit-rate distribution may of course be used.

The traffic information may take a variety of forms and in embodiments said traffic information comprises at least one traffic type indication, said traffic type indication being indicative of a predetermined classification of network traffic. Accordingly, a traffic type indication may be provided which indicates that the network traffic monitored is of a particular type, the types of traffic being predetermined according to a classification scheme. For example, the network traffic may be classified as VoIP traffic, browsing traffic, streaming traffic and so on. Indicating the type of traffic according to a predetermined classification scheme is useful because of the known general characteristics of such traffic types, for example VoIP traffic is known to have a relatively low bandwidth, whilst browsing traffic may have a comparatively higher bandwidth. Conversely, browsing traffic is typically less latency critical than VoIP traffic. Accordingly, an indication as to the traffic type can be usefully used to administer the allocation of the resource blocks between the centrally administered schedule and the at least one feeder base station administered schedule in order to provide a high quality of service in the wireless feeder network.

The predetermined classification of network traffic may take a number of forms, for example it may be characterised by a data rate of the network traffic (i.e. the bandwidth which such traffic typically requires). It may be characterised by a periodicity of the network traffic (i.e. whether the traffic is relatively intermittent or more continuous). It may be characterised by a sensitivity to latency over the network traffic (i.e. the extent to which an imposed packet delay for this traffic type will result in a perceived lower quality of service for the end user or not). It may be characterised by a sensitivity to error of the network traffic (i.e. the extent to which errors in this type of network traffic will be perceived by the end user as a reduction in quality of service or not).

The predetermined classification may be associated with a predetermined network event. The present invention recognises that not only can the network traffic be classified into different types, but that particular changes in the network traffic may be associated with particular network events. Accordingly, the occurrence of such a network event can provide an indication that a particular type of network traffic is expected or that the network traffic in particular feeder link is about to increase/decrease.

Various network events may be defined which can be associated with predetermined network traffic types, this either being performed predictively on the basis of a network operator's knowledge of traffic types which can be expected to follow particular events, or may be performed more empirically by observing that particular traffic types are statistically found to commonly follow particular events. In embodiments said predetermined network event is at least one of: a signing-on event; a hand-over event; and a signing-off event. Each of these types of event may be found to generate particular types of traffic in the wireless feeder network.

The re-allocation of the resource blocks between the two schedules may be performed in a number of ways. For example, the re-allocation may be reactive to traffic indications which show that the current needs of the wireless feeder network have changed and the allocation should be altered. However the re-allocation of said resource blocks may also be performed on the basis of a network traffic prediction. Accordingly, although the current allocation may currently be providing an acceptable quality of service, it may be predicted that the network traffic distribution will soon change and the allocation may be proactively adjusted to match. Such a prediction may for example be made on the basis of a predetermined network event, for example the notification of a signing-on of new user equipment to the access network. Other network events could be identified within the data forming the network traffic, for example when a user accesses a particular URL. Accessing a URL which is known to provide a high-bandwidth data streaming service could be classified as a network event which it is useful to identify, for the purposes of appropriately allocating resource blocks.

In one embodiment said network traffic prediction is determined in dependence on said at least one traffic type indication. The identification of a particular traffic type may be used to predict the network traffic in the near future. For example the first occurrence of a type of traffic which is known from experience to be followed by a significant amount of that type of traffic provides a useful basis for a network traffic prediction.

Various aspects of the network traffic may be usefully determined in the monitoring step in order to determine at least one characteristic of the network traffic. In one embodiment said step of monitoring said network traffic comprises identifying a transmission protocol used by said network traffic. Transmission protocols may give a good indication of the type of the network traffic and therefore its expected bandwidth requirements.

In one embodiment said step of monitoring said network traffic comprises identifying a traffic structure of said network traffic. For example, even without identifying the specific content of particular network traffic (possibly due to encryption) it may nonetheless be possible to determine useful information on the basis of the traffic structure, such as how continuous the traffic is or how "bursty" the traffic is. VoIP traffic can have a significantly different traffic structure from browsing traffic or streaming traffic for example, and this structure can provide useful information about the traffic.

In one embodiment said step of monitoring said network traffic comprises identifying a mode packet size of said network traffic. One useful characterisation of the traffic structure is the mode (i.e. most frequent) packet size of the network traffic, because this can be indicative of the type of network traffic.

In some embodiments it may be determined to be useful to allocate all of the wireless resource to the centrally administered ("global") schedule for a preliminary session of operation of the wireless feeder network, such that the initial performance of the wireless feeder network can be determined before allocating some resource blocks to particular feeder base stations for their own "autonomous" schedules. Accordingly, in one embodiment, the method further comprises the steps, performed prior to allocating said resource blocks between said centrally administered schedule and said at least one feeder base station administered schedule, of:

initially allocating all resource blocks according to said centrally administered schedule; and initially monitoring said network traffic being carried by said feeder links to determine at least one initial characteristic of said network traffic, wherein said step of allocating resource blocks is performed in dependence on said at least one initial characteristic of said network traffic.

Viewed from a second aspect, the present invention provides a feeder network controller configured to control a wireless feeder network used to couple access base stations of an access network with a communications network, the wireless feeder network connecting a plurality of feeder base stations coupled to the communications network and a plurality of feeder terminals coupled to associated access base stations, each feeder terminal having a feeder link with a feeder base station, and the feeder links being established over a wireless resource comprising a plurality of resource blocks, the feeder network controller comprising:

a resource block allocation unit configured to allocate resource blocks for use by said plurality of feeder base stations and said plurality of feeder terminals to establish said feeder links, wherein said resource blocks are allocated between a centrally administered schedule in which each resource block is associated with a predetermined feeder link and at least one feeder base station administered schedule in which a set of resource blocks is associated with a predetermined feeder base station, said predetermined feeder base station being configured to implement said feeder base station administered schedule dynamically by using said set of resource blocks in dependence on current traffic requirements of said predetermined feeder base station; and a network traffic monitoring unit configured to monitor network traffic being carried by said feeder links to determine at least one characteristic of said network traffic, wherein said resource block allocation unit is configured to re-allocate said resource blocks between said centrally administered schedule and said at least one feeder base station administered schedule in dependence on said at least one characteristic of said network traffic.

Viewed from a third aspect, the present invention provides a feeder network controller configured to control a wireless feeder network used to couple access base stations of an access network with a communications network, the wireless feeder network connecting a plurality of feeder base station means for coupling to the communications network and a plurality of feeder terminal means for coupling to associated access base stations, each feeder terminal means having a feeder link with a feeder base station means, and the feeder links being established over a wireless resource comprising a plurality of resource block means, the feeder network controller comprising:

resource block allocation means for allocating resource blocks for use by said plurality of feeder base station means and said plurality of feeder terminal means to establish said feeder links, wherein said resource blocks are allocated between a centrally administered schedule in which each resource block is associated with a predetermined feeder link and at least one feeder base station administered schedule in which a set of resource blocks is associated with a predetermined feeder base station means, said predetermined feeder base station means for implementing said feeder base station administered schedule dynamically by using said set of resource blocks in dependence on current traffic requirements of said predetermined feeder base station means; and network traffic monitoring means for monitoring network traffic being carried by said feeder links to determine at least one characteristic of said network traffic, wherein said resource block allocation means for re-allocating said resource blocks between said centrally administered schedule and said at least one feeder base station administered schedule in dependence on said at least one characteristic of said network traffic.

The above, and other objects, features and advantages of this invention will be apparent from the following detailed description of illustrative embodiments which is to be read in connection with the accompanying drawings.

BRIEF DESCRIPTION OF THE DRAWINGS

FIG. 23 illustrates how the resource blocks of a wireless resource may be utilised to produce a global schedule for allocating to each feeder link at least one resource block;

FIG. 24 illustrates how resource blocks may be re-used to support a plurality of feeder links;

FIG. 42 schematically shows in one embodiment the subdivision of a wireless resource into a plurality of resource blocks, where each resource block has allocated resource utilisation fractions corresponding to the links that may be established using that resource block;

FIG. 48 shows an example predetermined classification of network traffic and particular characteristics of those types of network traffic;

DESCRIPTION OF THE PREFERRED EMBODIMENTS

This application is related to UK patent applications 1016647.8, 1016648.6 and 1016650.2 which are incorporated herein by reference in their entirety.

Figure 1:
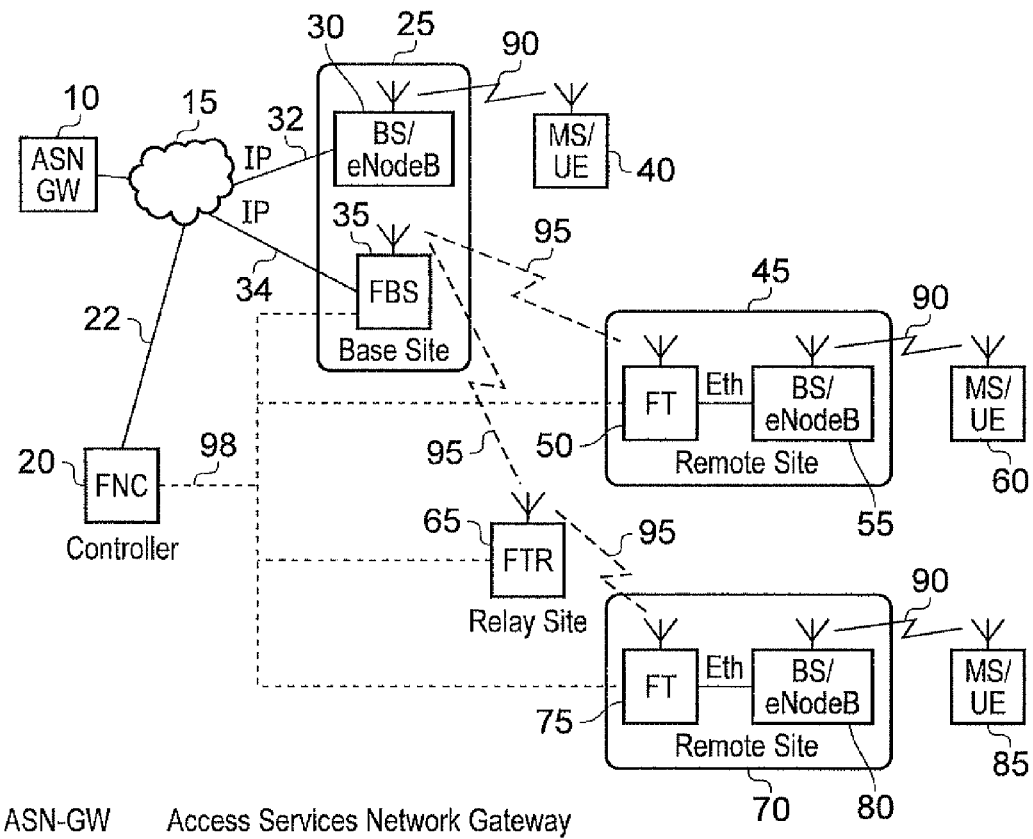
FIG. 1 is a diagram schematically illustrating a network architecture including a wireless feeder network in accordance with one embodiment.

FIG. 1 is a block diagram schematically illustrating a network architecture including a wireless feeder network in accordance with one embodiment. As shown in FIG. 1, a number of access base stations 30, 55, 80 are provided in the conventional manner to communicate via a wireless air interface 90 with a number of mobile stations/items of end user equipment 40, 60, 85. Whilst for simplicity, each base station 30, 55, 80 is shown as communicating with a single item of end user equipment, it will be appreciated that in practice such base stations form point-to-multipoint devices enabling a plurality of items of end user equipment to communicate with an individual base station. The items of end user equipment may be mobile or fixed, and any one of a number of known wireless communication protocols may be used to effect the wireless links 90. For example, in one embodiment such wireless links may be constructed using WiMAX or LTE air interfaces.

The access network consisting of the various base stations 30, 55, 80 and items of end user equipment 40, 60, 85 are typically connected via a communications infrastructure 15 with an access services network gateway 10 to enable inbound communication to be forwarded to the items of end user equipment and for outbound communication to be routed to some other network via the access services network gateway 10. This requires each base station to be provided with a backhaul connection to the communications infrastructure 15. The base station 30 is shown provided with a traditional wired backhaul connection 32 to the communications infrastructure 15. However, in accordance with embodiments, other base stations 55, 80 can be coupled to the communications infrastructure 15 via a wireless feeder network consisting of a plurality of feeder base stations 35 coupled to the communications infrastructure 15, and a plurality of feeder terminals 50, 75 coupled to associated access base stations. The feeder base stations 35 and feeder terminals 50, 75 communicate via a feeder air interface 95. Each feeder base station (FBS) forms a wireless point-to-multipoint hub which provides connectivity between a wired infrastructure and remote sites 45, 70. Each feeder terminal provides the feeder end-point functionality. Accordingly, it terminates the feeder wireless link and, in the first instance, provides an interface to one or more co-located access base stations. Whilst the locations in which the feeder base stations and feeder terminals are located may be varied, in one example the feeder base stations will typically be installed on a tower or building roof-top whilst the feeder terminals will typically be installed either below the roof-line, on a building, or on street furniture, such as a lamp post or utility pole.

In accordance with the architecture illustrated in FIG. 1, a number of base sites and a number of remote sites are established. A base site 25 receives a wired backhaul connection 32, 34 and in the example base site 25 illustrated in FIG. 1, the base site includes not only a feeder base station 35 but also an access base station 30 of the access network. However, in some embodiments a base site may only include a feeder base station 35 and no access base station.

Each remote site 45, 70 includes a feeder terminal 50, 75 and an associated access base station 55, 80. In one embodiment, the feeder terminal and associated access base station are physically separate devices, and may be coupled to each other via a variety of connections, for example an Ethernet connection such as shown in FIG. 1. In an alternative embodiment, the feeder terminal and access base station may be incorporated into a single unit used to form a remote site.

As will be described in more detail later, the wireless feeder network provides a wireless backhaul solution via the associated feeder air interface 95 that partitions the resource blocks of the wireless resource used to implement the feeder air interface 95 in a way that ensures high spectral efficiency. By achieving high spectral efficiency, it is ensured that more bandwidth is available for the actual transfer of useful traffic through the access network. In one embodiment, the feeder air interface is adaptive, in that the allocation of the resource blocks amongst the various feeder links connecting individual feeder terminals with an associated feeder base station is altered during use, for example to take account of different traffic conditions, thereby ensuring that high spectral efficiency is maintained in the presence of varying operating conditions.

In one embodiment, one or more feeder network controllers 20 are used to control the wireless feeder network with the aim of ensuring that high spectral efficiency is maintained. The dotted line 98 in FIG. 1 illustrates this logical control of the feeder network controller 20 over the various elements of the wireless feeder network. In practice, the control messages are routed to the various feeder base stations 35 and feeder terminals 50, 75 via the wired backhaul connections 22, 34 and the feeder links provided by the feeder air interface 95. The feeder network controller is responsible for configuring the wireless feeder network, monitoring its performance in use, and continually optimising its configuration.

Optionally, the wireless feeder network may include one or more feeder terminal relays 65. The feeder terminal relay is a stand alone node, the function of which is to receive and re-transmit feeder transport. Hence, in the example illustrated in FIG. 1, a feeder terminal relay 65 is used to enable the feeder base station 35 to communicate with the feeder terminal 75, and vice versa.

Figure 2A:
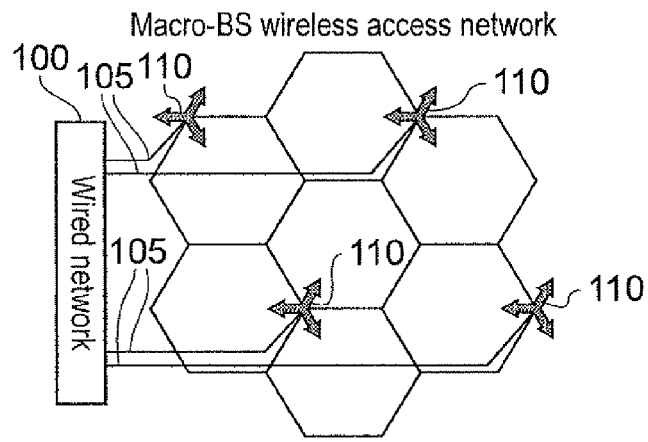
FIGS. 2A and 2B schematically illustrate known wireless access networks.
Figure 2B:
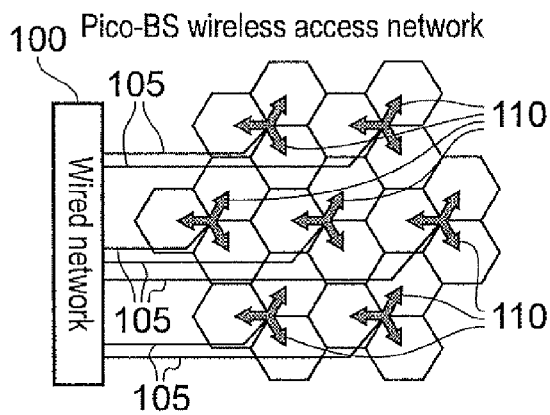

FIGS. 2A and 2B illustrate how traditional wireless access networks are sectored. In particular, FIG. 2A illustrates a macro base station wireless access network where tri-sector access base station sites 110 are used to provide communication within associated geographical regions. Each access base station site is connected via a wired backhaul connection 105 with a wired network 100.

Cell splitting, where a cell is sub-divided into smaller geographical regions served by additional base stations, is a well-proven technology that increases system capacity. Accordingly, where increased system capacity is required, the macro base station wireless access network may be modified as shown in FIG. 2B to provide a pico base station wireless access network. As will be appreciated from a comparison of FIG. 2B with FIG. 2A, the basic set up is the same, but each access base station site 110 serves a smaller geographical region. Accordingly, it will be seen that there is an associated increase in the backhaul requirement to support the various wired backhaul connections 105 to the wired network 100.

Figure 3:
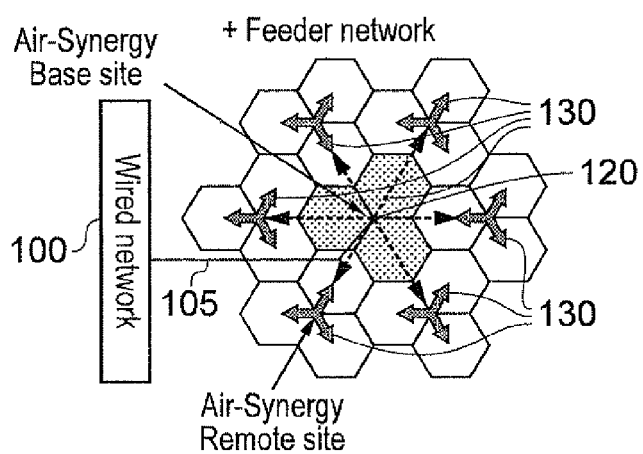
FIG. 3 schematically illustrates how a wireless feeder network of embodiments can be used to reduce the backhaul requirements of a wireless access network in accordance with one embodiment.

FIG. 3 schematically illustrates how a wireless feeder network in accordance with one embodiment may be used to implement a system similar to the pico base station wireless access network of FIG. 2B, but with only a single wired backhaul connection 105 to the wired network. In particular, a single base site 120 is provided which is connected via a wired backhaul connection 105 to the wired network 100. In addition, a number of remote sites 130 are provided which incorporate the existing access base station functionality, but also incorporate a feeder terminal associated therewith, allowing communication via the feeder air interface to occur between the feeder base site 120 and the remote site 130.

Figure 4:
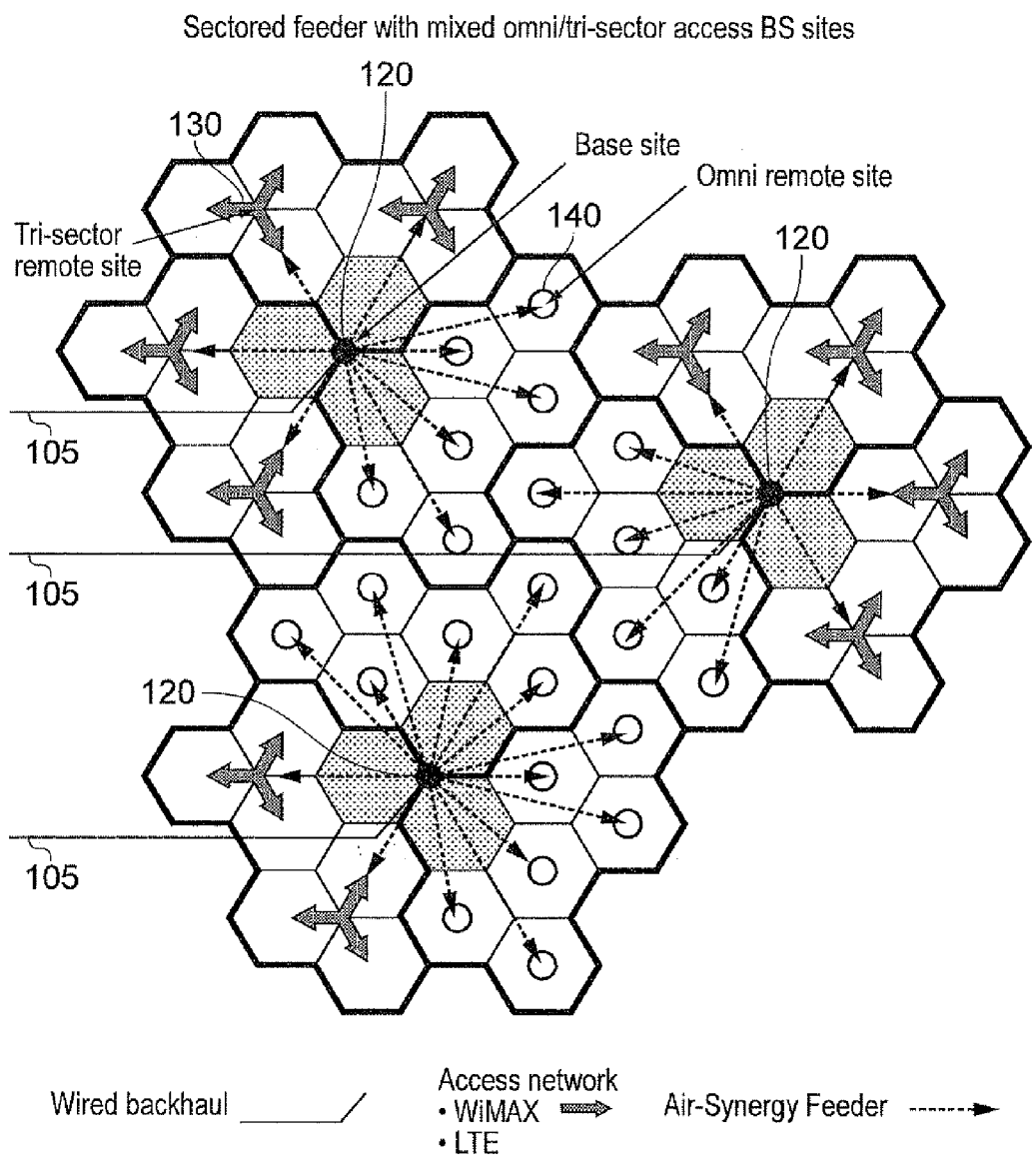
FIG. 4 is a diagram schematically illustrating the use of a sectored wireless feeder network in accordance with one embodiment.

FIG. 4 illustrates how such an arrangement may be replicated to provide a sectored wireless feeder network. In this example, two different types of remote site are shown, the first being the tri-sector remote site 130 where an access base station may use a known sectored antennae approach to communicate with items of end user equipment in the associated three sectors. Alternatively, the single feeder terminal at the remote site may serve multiple access base stations and so can eliminate redundant downlink broadcast and multicast traffic. The second type of remote site is an omni remote site 140 where an omni directional antenna is used to communicate with items of end user equipment within the associated sector. It will be appreciated that, by virtue of the use of the wireless feeder network, a significant reduction in the wired backhaul requirement is achieved. Further, due to the techniques employed in embodiments to ensure that the wireless feeder air interface is very spectrally efficient, the wireless backhaul functionality provided by the wireless feeder network has only a small impact on the overall amount of wireless resource available to carry traffic within the access network.

Figure 5A:
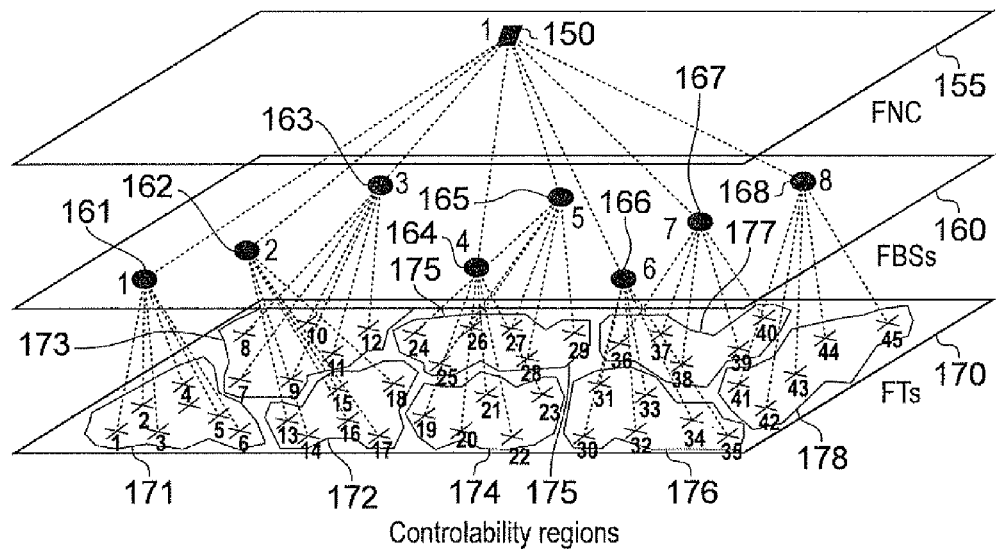
FIG. 5A schematically illustrates how each feeder base station of the wireless feeder network of one embodiment has associated controllability regions.

FIG. 5A schematically illustrates a plurality of layers of the wireless feeder network. The first layer 155 is the feeder network controller layer, and in this embodiment comprises a single feeder network controller 150. The next layer is a feeder base station layer 160 and in this example includes eight feeder base stations 161 to 168 which are all controlled via the feeder network controller 150.

The next layer 170 is a feeder terminal controllability layer and identifies which feeder terminals are controlled by which feeder base stations. Accordingly, each of the feeder base stations 161 to 168 is arranged during use of the wireless feeder network to communicate with those feeder terminals within its associated controllability region 171 to 178, respectively. Whilst the controllability regions can be amended if desired, in one embodiment it is assumed that the controllability regions are relatively static. In one embodiment, the controllability regions are assigned by the feeder network controller. As a new feeder terminal is deployed, it will be allocated to one of the feeder base stations, and will hence be contained within that feeder base station's controllability region. Between each feeder terminal and its associated feeder base station, a feeder link will be established over which data and control messages will pass between the feeder base station and a feeder terminal.

However, it will be apparent that in a typical deployment, a feeder terminal may be in a position to listen to another one or more feeder base stations in addition to its allocated feeder base station. The information as to which feeder base stations each feeder terminal is able to see communications from can be determined during a sounding process that will be described in more detail later. That sounding process produces a visibility matrix defining a plurality of visibility regions as shown by the layer 180 in FIG. 5B. It will be appreciated from a comparison of FIG. 5B with FIG. 5A that each visibility region 181 to 188 is somewhat larger than the associated controllability region, and by its nature the visibility regions will overlap. For example, considering FIG. 5B, it is noted that feeder terminal 9 may connect to or be interfered with by signals originating from feeder base stations 161, 162 or 163. Thus, a visibility region contains any feeder terminal that a feeder base station can communicate to or interfere with.

Figure 5B:
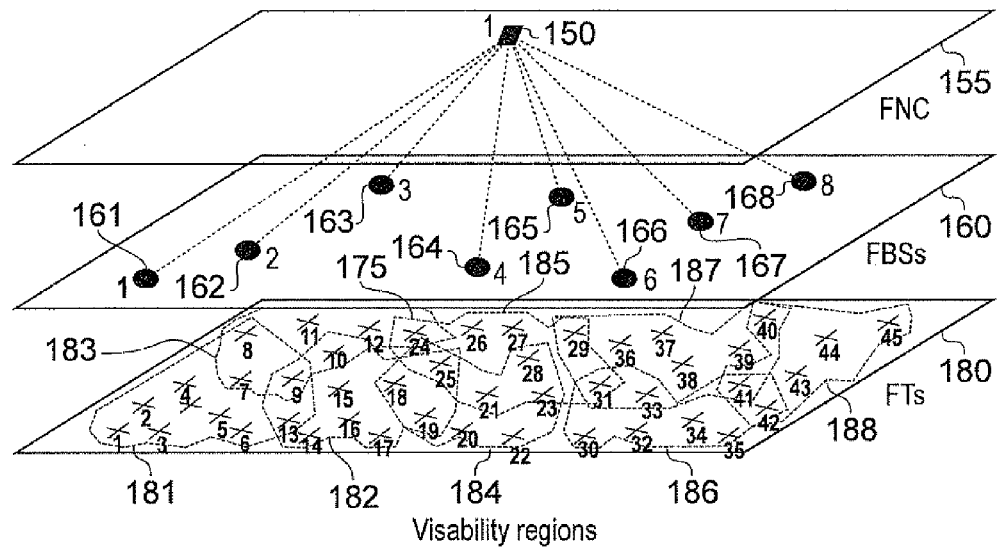
FIG. 5B schematically illustrates how each feeder base station of the wireless feeder network of one embodiment has associated visibility regions.

In order initially to configure the wireless feeder network, and to monitor its performance on an ongoing basis, the feeder network controller 150 in FIGS. 5A and 5B is configured to control sounding procedures in the wireless feeder network. During a sounding process an element of the wireless feeder network (e.g. a selected feeder base station) transmits a known sounding signal and the feeder terminals which are able to receive that signal then perform downlink sounding measurements. A similar procedure is carried out to perform uplink sounding measurements wherein a feeder terminal transmits a known sounding signal to be received by the feeder base stations which have visibility of that feeder terminal. Sounding yields various channel metrics that include (but are not limited to): channel impulse responses, complex channel frequency responses, frequency dependent co-variance matrices of the received signals, frequency dependent eigenmodes, and so on. Building up a set of channel metrics in this manner for the whole wireless feeder network provides a system-wide view of the quality of the wireless channels in the network.

In an established wireless feeder network, there is typically a well defined relationship between feeder base stations and feeder terminals, wherein any given feeder terminal is uniquely associated with one feeder base station (see FIG. 5A). However, due to the overlapping nature of the visibility regions (see FIG. 5B), coordination is required when performing the above-described sounding processes, such that the source of a given sounding signal is precisely defined. For example, with reference to FIG. 5B, if feeder terminal 9 were to be configured to receive a downlink sounding signal, without coordination between feeder base stations 161, 162 and 163, it would not be possible for feeder terminal 9 to identify which feeder base station was the source of a given sounding signal. Worse still, if feeder base stations 161, 162 and 163 were to transmit sounding signals at the same time (or at least in overlapping time windows), these signals would interfere and result in an incorrect downlink sounding measurement being performed by feeder terminal 9. Similarly, uplink sounding measurements made by a given feeder base station can also suffer from interference between uplink sounding signals transmitted by more than one feeder terminal.

Figure 6:
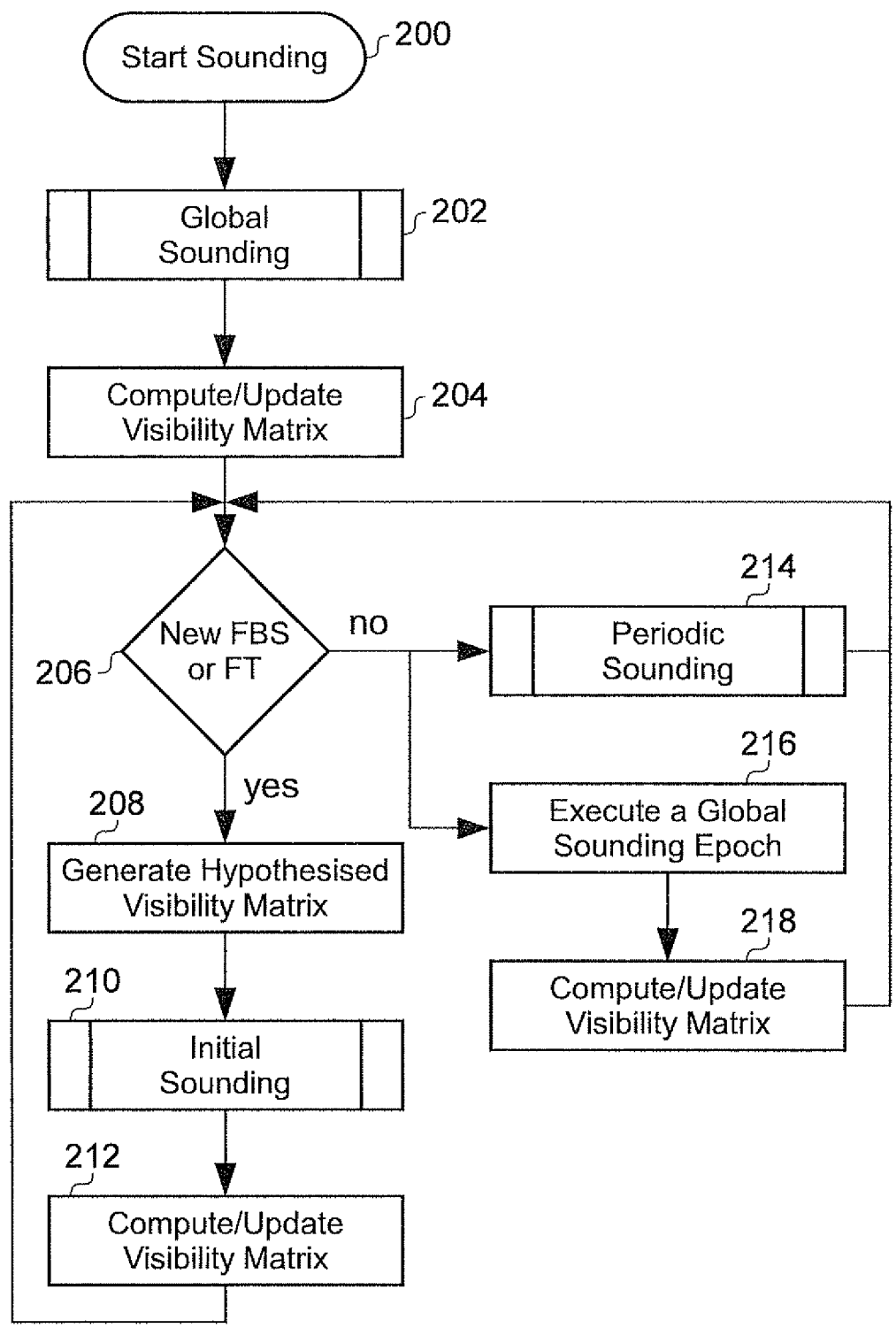
FIG. 6 is a flow diagram schematically illustrating a process in which first a global sounding procedure is performed followed by further sounding procedures as required in accordance with one embodiment.

The basic steps involved in performing coordinated sounding in the wireless feeder network are schematically illustrated in FIG. 6. At step 200 the process is started, whereafter at step 202 a global sounding process is carried out. Global sounding is a network-wide exhaustive sounding method utilising fully orthogonal (non-overlapping) sounding schedules used to generate a visibility matrix which indicates the visibility between feeder base stations and feeder terminals. The feeder network controller 150 controls this process, such that each feeder base station performs downlink sounding in turn, whereafter each feeder terminal performs uplink sounding in turn. This process is described in more detail with reference to FIGS. 8-12.

Once the global sounding process has been carried out, at step 204 the feeder network controller computes the visibility matrix for the network (or updates a pre-existing visibility matrix, if one exists). On the basis of the visibility matrix, the feeder network controller can then configure the wireless feeder network, for example determining the controllability regions illustrated in FIG. 5A and allocating the wireless resource available to the feeder network. The flow in FIG. 6 proceeds to step 206, where it is determined if a new feeder base station or feeder terminal has been added to the network. If it has, then at step 208 a hypothesised visibility matrix is generated by the feeder network controller including the new feeder base station or feeder terminal. This can be done on the basis of the geographical location of the new feeder base station or feeder terminal and other knowledge about the local transmission conditions to produce the hypothesised visibility matrix. In general the hypothesised visibility matrix will be set up as an overestimate of the visibility of the new network element, so as to ensure that all possible interferences are determined. On this basis at step 210 an initial sounding process is carried out to test the actual visibility of the new feeder base station or feeder terminal with respect to the existing wireless network and on the basis of that sounding process at step 212 the visibility matrix can be re-calculated and updated. The flow then returns to step 206. Further detail of the initial sounding process carried out when a new feeder base station or feeder terminal is added to the wireless network is described hereinafter with reference to FIGS. 13-17.

Alternatively at step 206, if it is determined that no new feeder base stations or feeder terminals have been added to the wireless feeder network, then at step 214 periodic sounding may be carried out. Periodic sounding is a slow rate, highly parallelised sounding scheme which is carried out as a background process whilst the wireless feeder network is transmitting its usual network traffic. It is carried out so as to ensure minimum interference between the sounding process itself and the network traffic. Further details of the periodic sounding process are described hereinafter with reference to FIGS. 18-22. After step 206, as well as the periodic sounding at step 214, the feeder network controller may also (step 216) control a global sounding epoch in the wireless feeder network. In order for this global sounding epoch to be carried out whilst periodic sounding (step 214) is also happening, it is necessary for a multiple access scheme such as time division multiple access (TDMA), frequency division multiple access (FDMA), code division multiple access (CDMA) or combinations of these three to be used to separate the respective sounding signals from one another. On the basis of a further global sounding epoch, at step 218 the visibility matrix can be determined and updated. Thereafter the flow returns to step 206.

Figure 7:
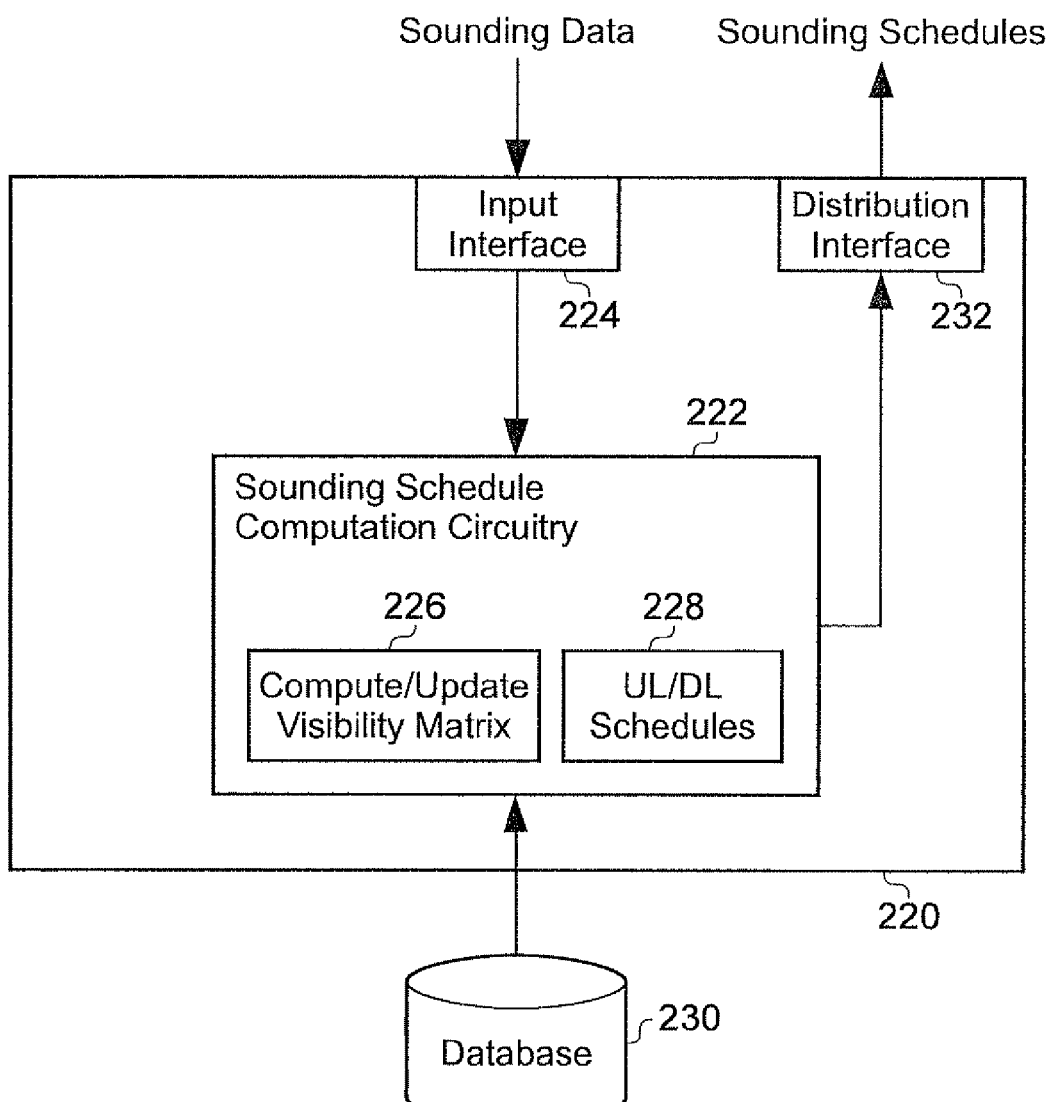
FIG. 7 is a block diagram schematically illustrating the components provided in a feeder network controller is accordance with one embodiment.

FIG. 7 schematically illustrates the configuration of the feeder network controller. Feeder network controller 220 contains sounding schedule computation circuitry 222 for computing and updating sounding schedules and visibility matrices. Via the input interface 224, the sounding schedule computation circuitry receives sounding data from the network which provides the information from which the visibility matrix can be determined (item 226). The sounding data received at input 224, together with the visibility matrix, provides the basis for determining the uplink and downlink schedules (item 228) within the sounding schedule computation circuitry 222. The sounding schedule computation circuitry 222 also has reference to a database 230 wherein previously determined visibility matrices and uplink/downlink sounding schedules may be stored as well as other configurational parameters. Once determined, the uplink and downlink schedules are distributed to the network via distribution interface 232 to cause the determined schedules to be carried out.

Figure 8:
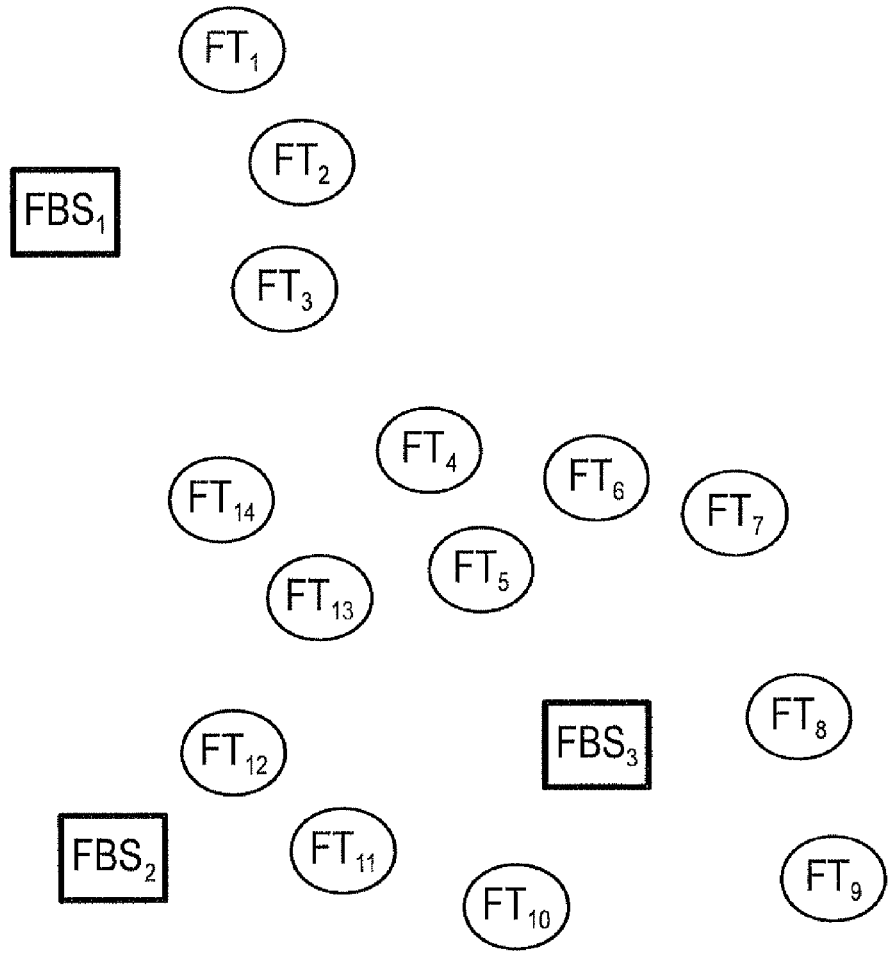
FIG. 8 illustrates a set of feeder base stations and feeder terminals when a new wireless feeder network is being set up, and a corresponding global sounding schedule, according to one embodiment.

FIG. 8 illustrates a first stage in the setting up of a wireless feeder network comprising three feeder base stations $FBS_{1-3}$ and 14 feeder terminals ($FT_{1-14}$). The first step in setting up this new wireless feeder network is to determine the visibility matrix representing the visibility of the feeder base stations and feeder terminals for one another. To do this a global sounding procedure is coordinated by the feeder network controller. The global sounding process comprises a downlink sounding process followed by an uplink sounding process.

The downlink sounding schedule is represented in FIG. 8 by the ordered lists $D_{FBS}$ and $D_{FT}$. The downlink sounding schedule has three epochs which can be most easily seen from $D_{FBS}$ which shows the ordering in which the feeder base stations perform their downlink sounding, namely first $FBS_1$, then $FBS_2$, and finally $FBS_3$. Correspondingly, $D_{FT}$ shows the configuration of the feeder terminals for receiving the downlink sounding signals transmitted by the feeder base stations in each epoch. It can be seen that all 14 feeder terminals are configured to receive downlink sounding signals in each of the three epochs.

Conversely, the uplink sounding schedule is shown by $U_{FT}$ and $U_{FBS}$. Here, there are 14 epochs corresponding to the 14 feeder terminals. $U_{FT}$ shows that each feeder terminal takes its turn in one epoch to transmit its uplink sounding signals, whilst $U_{FBS}$ shows that in each of the 14 epochs all three feeder base stations are configured to receive uplink sounding signals.

In other words, during the downlink sounding schedule each feeder base station takes a turn to transmit downlink sounding signals whilst all feeder terminals listen and during the uplink sounding schedule each feeder terminal takes a turn to transmit uplink sounding signals, whilst all three feeder base stations listen.

Figure 9:
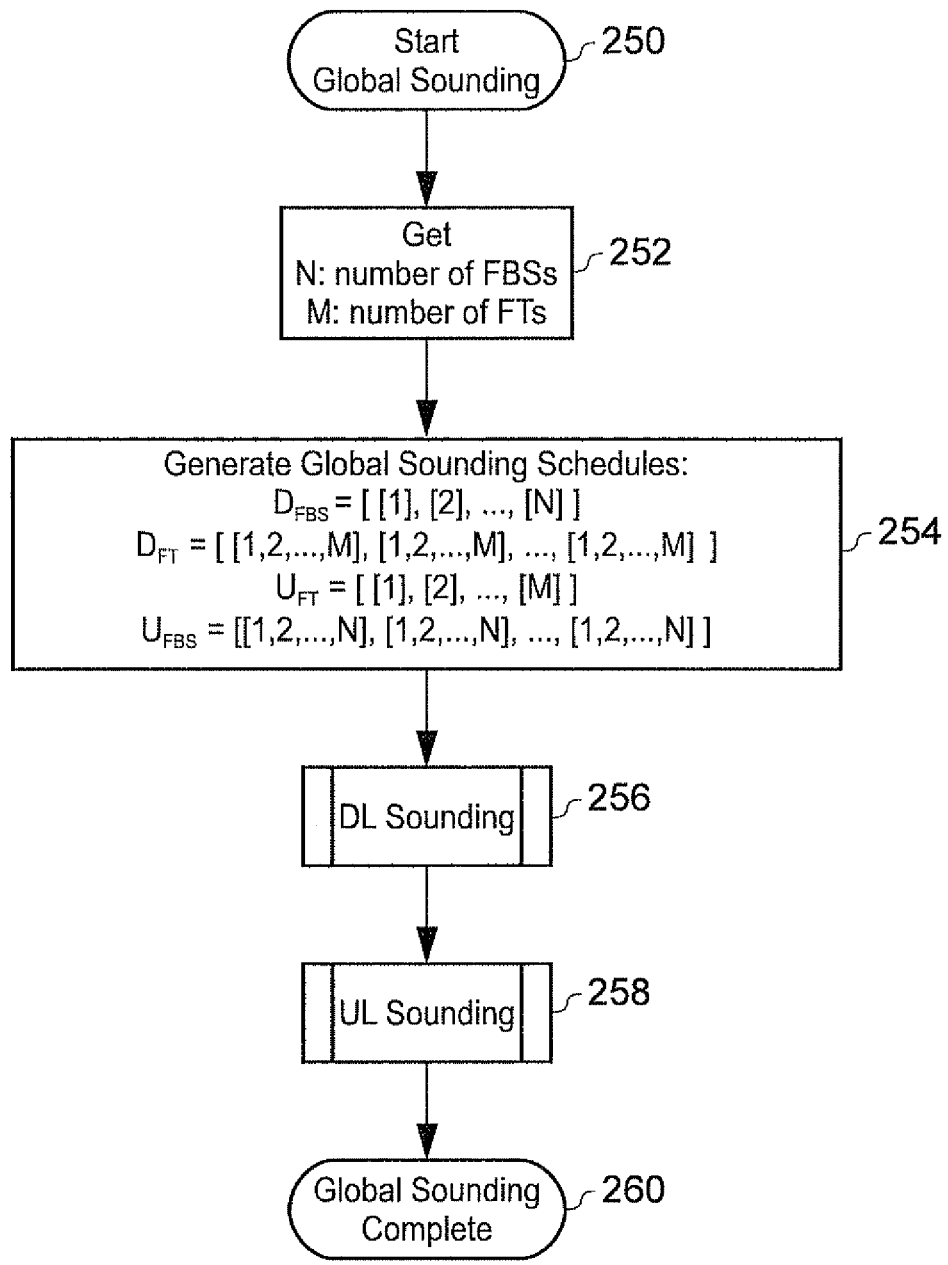
FIG. 9 is a flow diagram illustrating the basic steps performed when carrying out a global sounding procedure in accordance with one embodiment.

FIG. 9 is a flow diagram illustrating the steps performed by the feeder network controller to coordinate a global sounding process. At step 250, the process is started, whereafter at step 252 the feeder network controller sets a variable N corresponding to the number of feeder base stations and a variable M corresponding to the number of feeder terminals. At step 254 the exhaustive set of uplink and downlink global sounding schedules is then determined, the number of epochs in the downlink schedule $D_{FBS}$ and $D_{FT}$ being defined by the number of feeder base stations N and the number of epochs in the uplink sounding schedule $U_{FT}$ and $U_{FBS}$ being determined by the number of feeder terminals M. Having generated the global sounding schedules, at step 256 the downlink sounding is carried out (described in more detail with reference to FIG. 10) and at step 258 the uplink sounding is carried out (described in more detail with reference to FIG. 11). The global sounding procedure completes at step 260.

Figure 10:
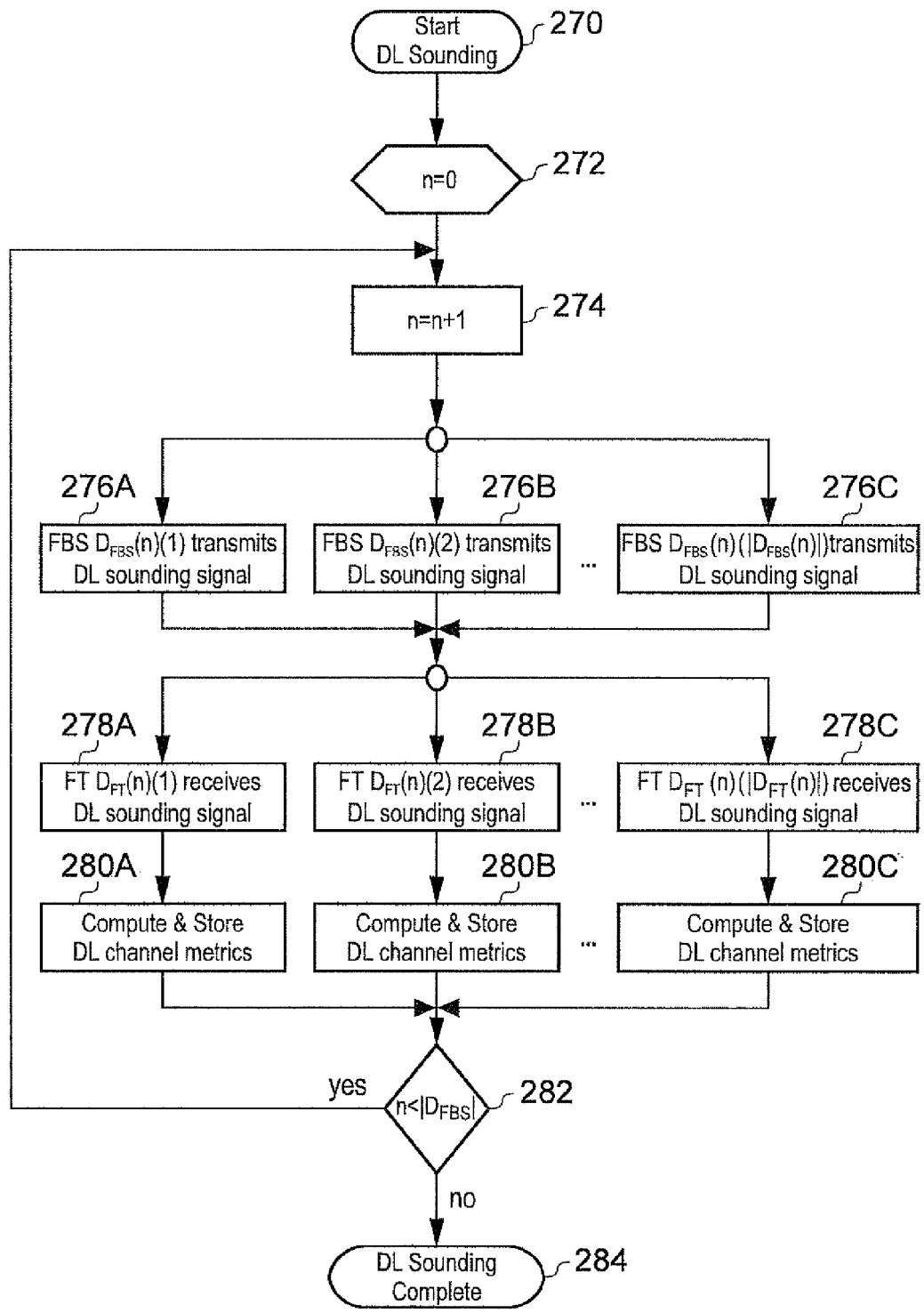
FIG. 10 is a flow diagram schematically illustrating the basic steps performed when carrying out downlink sounding in accordance with one embodiment.

The downlink sounding process is now described with reference to the steps illustrated in the flow diagram shown in FIG. 10. The process begins at step 270, whereafter at step 272 the counter n (used to track the epoch number) is set to 0. The process then enters the loop beginning at step 274, where n is incremented by 1. At step 276 the feeder base stations indicated in epoch n of downlink schedule $D_{FBS}$ transmit their downlink sounding signal. It should be noted the FIG. 10 represents a generic downlink sounding process according to which it is possible for feeder base stations to perform downlink sounding simultaneously. Hence in FIG. 10 step 276 is illustrated as a number of simultaneous downlink sounding steps (276A, 276B . . . 276C). However, when downlink sounding is being performed as part of a global sounding schedule (i.e. at step 256 in FIG. 9), only one feeder base station will typically perform downlink sounding per epoch and hence only one sub-step (step 276A) will exist at step 276. In the more general case (discussed later on) when simultaneous downlink sounding may be allowed, several feeder base stations may transmit downlink sounding signals at the same time. The number of sub-steps at step 276 is given (see step 276C) by $|D_{FBS}(n)|$ (i.e. the number of feeder base stations listed in the $n^{th}$ element of $D_{FBS}$).

The flow in FIG. 10 then proceeds to step 278 (illustrated as parallel sub-steps 278A-C), where the feeder terminals indicated in epoch n of downlink schedule $D_{FT}$ receive the downlink sounding signal(s). The number of feeder terminals arranged to receive downlink sounding signals in epoch n determines how many parallel sub-steps are carried out at step 278, the number being given by the size of $|D_{FT}(n)|$ (i.e. the number of feeder terminals listed in the $n^{th}$ element of $D_{FT}$). Following step 278, at step 280 (i.e. sub-steps 280A-C as appropriate) the downlink channel metrics measurable on the basis of the sounding signals transmitted and received in this epoch are computed and stored in the feeder network controller.

Finally at step 282 it is determined if n (the epoch counter) is less than the total number of epochs in the downlink sounding schedule, given by $|D_{FBS}|$. If it is, then the flow returns to step 274 for n to be incremented and the next epoch to be performed. Once all epochs of the downlink sounding schedule have been performed, the flow concludes at step 284.

Figure 11:
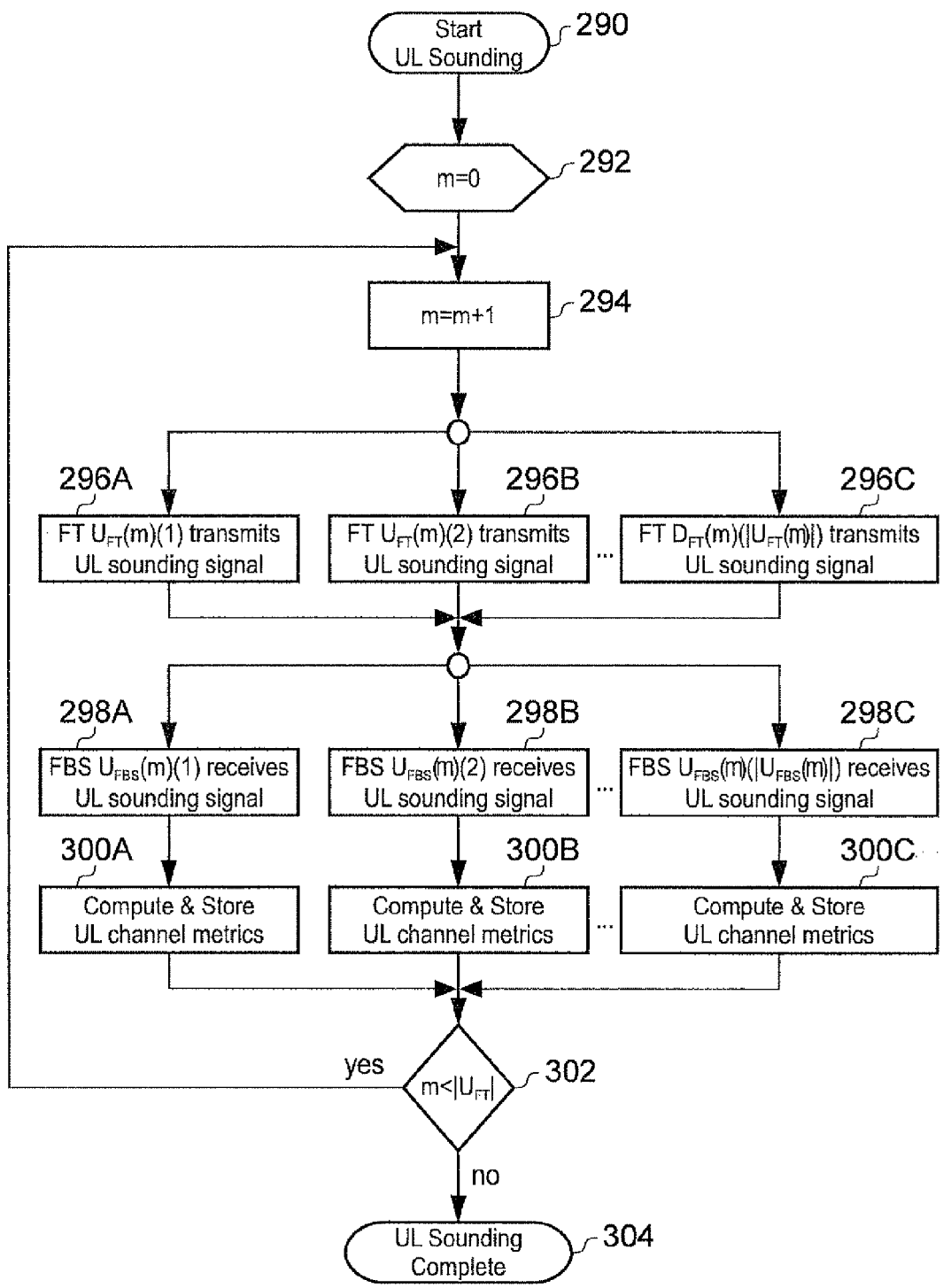
FIG. 11 is a flow diagram schematically illustrating the basic steps performed when carrying out uplink sounding in accordance with one embodiment.

The uplink sounding procedure is carried out in an analogous fashion to the downlink sounding procedure and FIG. 11 is a flow diagram illustrating the basic steps carried out when performing uplink sounding. The process begins at step 290, whereafter at step 292 the counter m (used to track the epoch number) is set to 0. The process then enters the loop beginning at step 294, where m is incremented by 1. At step 296 the feeder terminals indicated in epoch m of uplink schedule $U_{FT}$ transmit their uplink sounding signal. As noted with reference to FIG. 10, it should also be noted with reference to FIG. 11 that the figure also represents a generic uplink sounding process according to which it is possible for feeder terminals to perform uplink sounding simultaneously. Hence in FIG. 11 step 296 is illustrated as a number of simultaneous downlink sounding steps (296A, 296B . . . 296C). However, when uplink sounding is being performed as part of a global sounding schedule (i.e. at step 258 in FIG. 9), only one feeder terminal station will typically perform downlink sounding per epoch and hence only one sub-step (step 296A) will exist at step 296. In the more general case (discussed later on) when simultaneous uplink sounding may be allowed, several feeder terminals may transmit uplink sounding signals at the same time. The number of sub-steps at step 296 is given (see step 296C) by $|U_{FT}(m)|$ (i.e. the number of feeder terminal listed in the $m^{th}$ element of $U_{FT}$).

The flow in FIG. 11 then proceeds to step 298 (illustrated as parallel sub-steps 298A-C), where the feeder base stations indicated in epoch m of uplink schedule $U_{FBS}$ receive the uplink sounding signal(s). The number of feeder base stations arranged to receive uplink sounding signals in epoch m determines how many parallel sub-steps are carried out at step 298, the number being given by the size of $|U_{FBs}(m)|$ (i.e. the number of feeder base stations listed in the $m^{th}$ element of $U_{FBS}$). Following step 298, at step 300 (i.e. sub-steps 300A-C as appropriate) the uplink channel metrics measurable on the basis of the sounding signals transmitted and received in this epoch are computed and stored in the feeder network controller.

Finally at step 302 it is determined if m (the epoch counter) is less than the total number of epochs in the uplink sounding schedule, given by $|U_{FT}|$. If it is, then the flow returns to step 274 for m to be incremented and the next epoch to be performed. Once all epochs of the uplink sounding schedule have been performed, the flow concludes at step 304.

Figure 12:
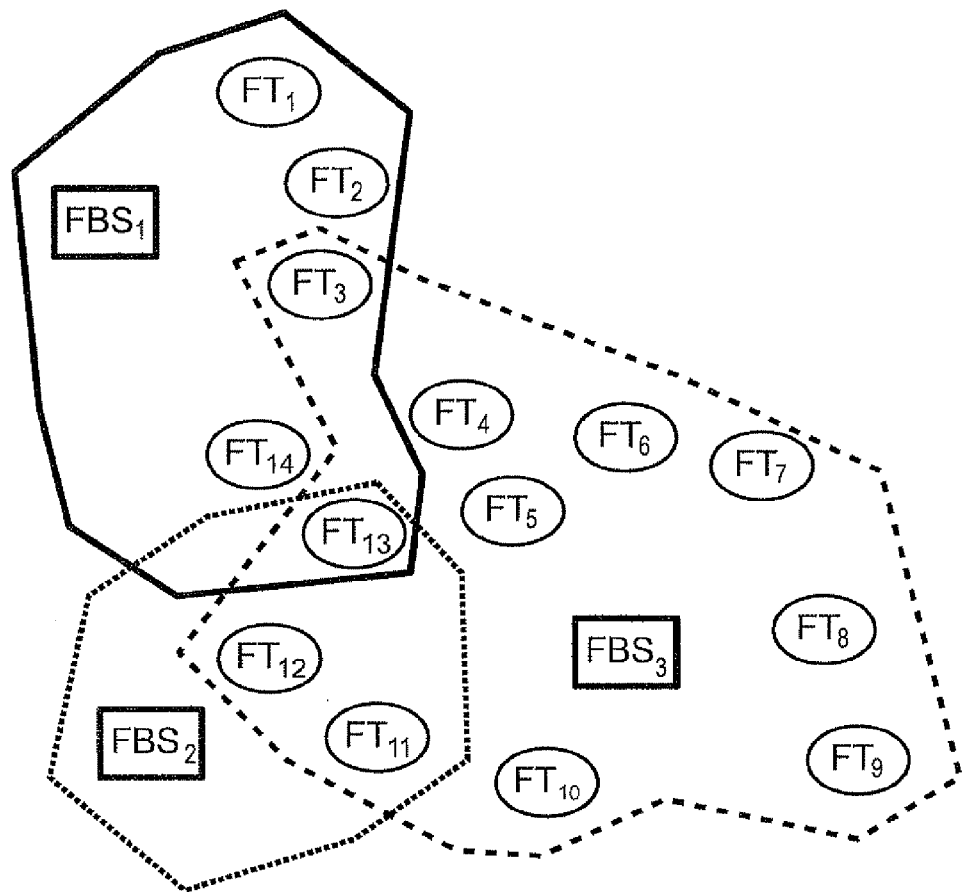
FIG. 12 schematically illustrates the visibility regions and a corresponding visibility matrix derived from a global sounding procedure in accordance with one embodiment.

FIG. 12 illustrates the result of the global sounding procedure determined for the example network of FIG. 8 in terms of the determined visibility between the feeder base stations and the feeder terminals. Feeder base station $FBS_1$ has visibility of feeder terminals $FT_{1-3}$, $FT_{13}$ and $FT_{14}$; feeder base station $FBS_2$ has visibility of feeder terminals $FT_{11-13}$; and feeder base station $FBS_3$ has visibility of feeder terminals $FT_{3-13}$. This is also represented by the visibility matrix V, wherein the columns correspond to feeder base stations and the rows correspond to feeder terminals. Thus determined, the visibility matrix is stored by the feeder network controller in its database 230 to form the basis of further configuration of the wireless feeder network.

Figure 13:
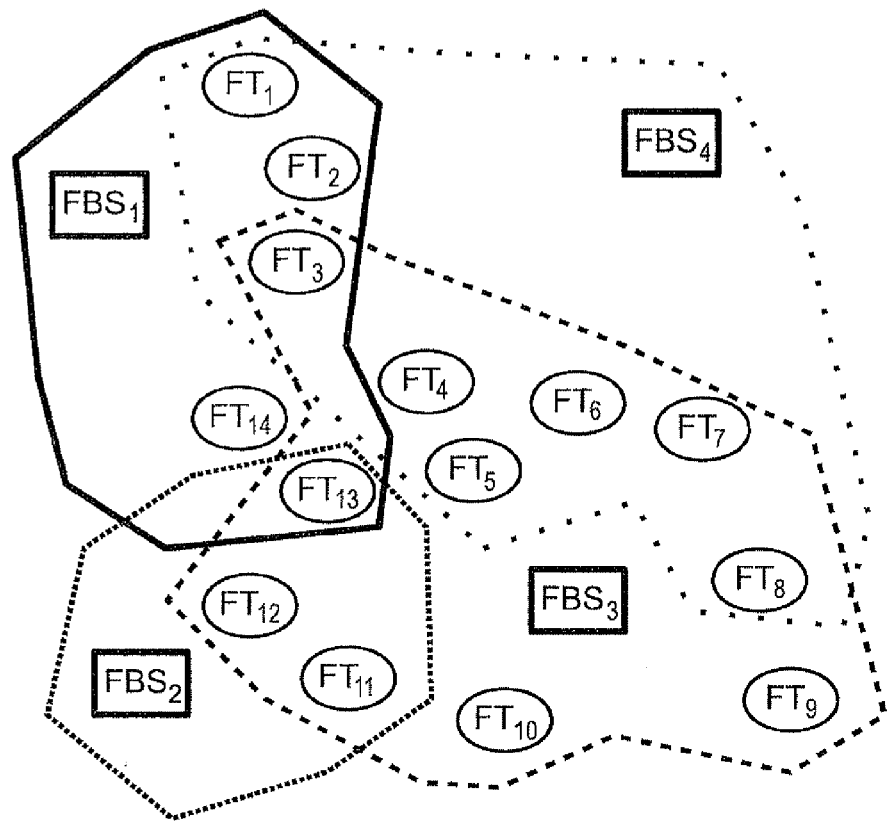
FIG. 13 illustrates the network shown in FIG. 12 after the addition of a feeder base station, and a corresponding initial sounding schedule and visibility matrix in accordance with one embodiment.

FIG. 13 schematically illustrates the feeder wireless network discussed with reference to FIG. 12, wherein an additional feeder base station (FBS$_4$) has been added. When a new feeder base station is added to the wireless feeder network, it first identifies itself to the feeder network controller indicating that it wishes to join the network. In response to this the feeder network controller determines a hypothesised visibility matrix which includes the new feeder base station. The hypothesised visibility matrix is an adaptation of the visibility matrix generated previously during global sounding an illustrated in FIG. 12. As can be seen in the visibility matrix illustrated in FIG. 13, for a new feeder base station this involves the addition of a column to the previously generated visibility matrix. Furthermore, the new column is populated in accordance with the hypothesis for which feeder terminals in the existing wireless feeder network the new feeder base station may have visibility. Based on the geographical location of the existing feeder terminals and the geographical location of the new feeder base station FBS$_4$, it is hypothesised that FBS$_4$ may have visibility of feeder terminals FT$_{1-8}$. It should be noted that in general the hypothesis represents an over-estimate of the visibility, to ensure that all possible interferences generated by the introduction of new feeder base station FBS$_4$ are taken into account.

FIG. 13 also illustrates a sounding schedule generated in accordance with the hypothesised visibility matrix shown. Like the global sounding schedule, this sounding schedule is an exhaustive procedure, but only covers those elements of the new wireless feeder network that involve (or are at least hypothesised to involve) the new feeder base station FBS$_4$. Hence, for the downlink sounding schedule there is only one epoch, wherein FBS$_4$ transmits its downlink sounding signal and during which all eight of the feeder terminals which are hypothesised to have a visibility of FBS$_4$ are configured to receive the downlink sounding signal. Conversely, in the uplink sounding schedule there are eight epochs, wherein each of the eight feeder terminals takes its turn to transmit its uplink sounding signal. Note that during the uplink sounding procedure, not only does the new feeder bases station FBS$_4$ listen at each epoch, but also those feeder base stations which are already known to have visibility of the corresponding feeder terminal from the previous global sounding procedure. Hence, for example, in the first epoch of the uplink sounding schedule, both FBS$_1$ and FBS$_4$ listen when feeder terminal 1 is transmitting its uplink sounding schedule.

Figure 14:
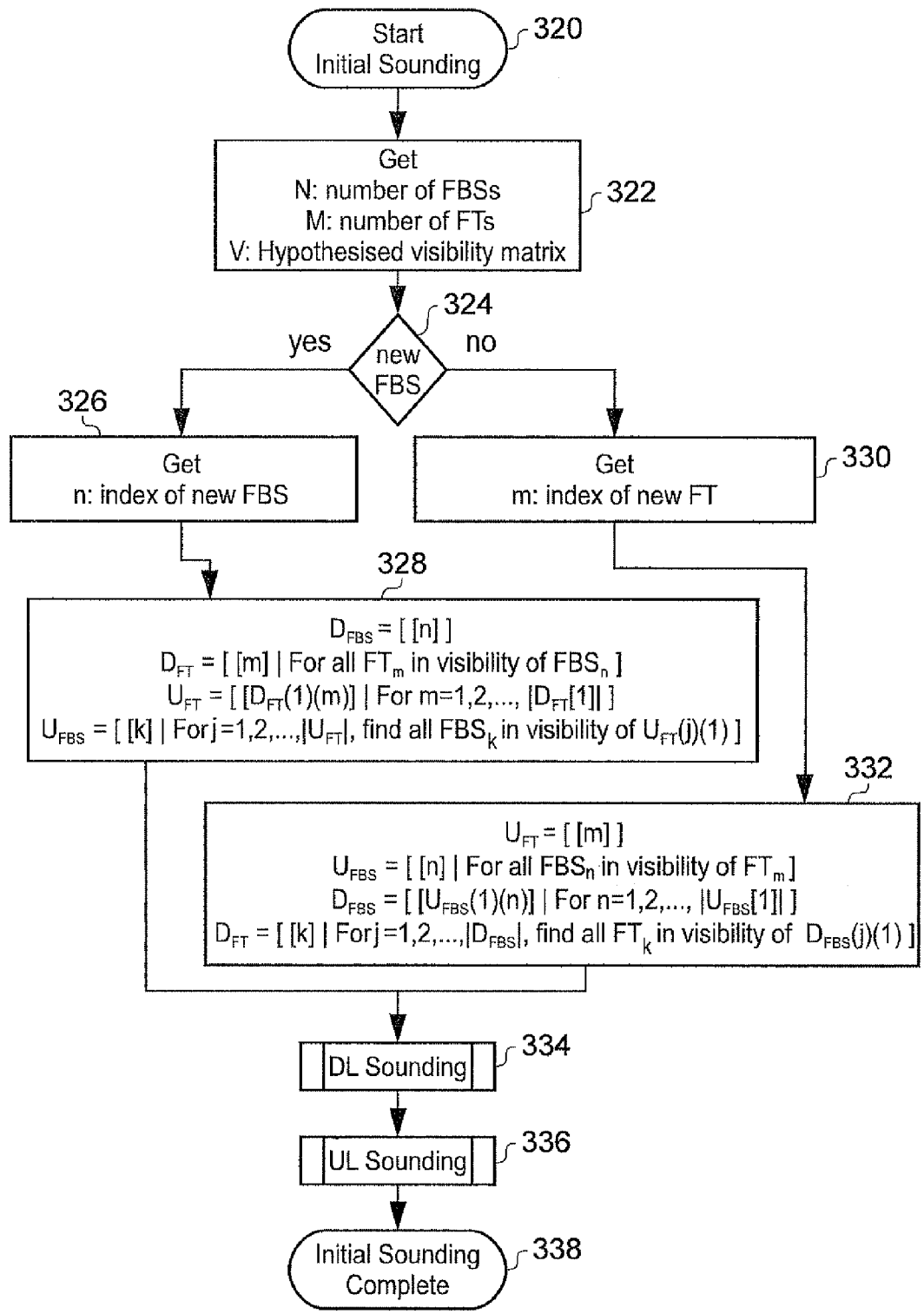
FIG. 14 is a flow diagram illustrating the basic steps performed when an initial sounding process is carried out in accordance with one embodiment.

FIG. 14 is a flow diagram illustrating the basic steps carried out to perform an initial sounding process, such as that carried out when a new element has been added to the wireless feeder network (such as the addition of a new feeder base station discussed with reference to FIG. 13). The flow begins at step 320, whereafter at step 322, the total number of feeder base stations N and the total number of feeder terminals M is obtained by the feeder network controller 220. The feeder network controller 220 also retrieves the hypothesised visibility matrix generated in response to the signing on of the new feeder base station or feeder terminal to the wireless network. At step 324 it is determined whether the new element is a feeder base station or not. If it is then the flow proceeds to step 326, where the index n of the new feeder base station is obtained. Then, at step 328, downlink and uplink sounding schedules for initial sounding in response to the addition of the new feeder base station are generated. For a single new feeder base station there is only one downlink sounding epoch, whilst there will be as many uplink sounding epochs as there are feeder terminals which have visibility of the new feeder base station, i.e. allowing the new feeder base station to listen to each of those feeder terminals in turn. This number of feeder terminals is given by $|D_{FT}[1]|$ (i.e. the number of receiving feeder terminals listed for the one downlink sounding epoch).

For each of these $|D_{FT}[1]|$ uplink sounding epochs, the feeder base stations configured to receive the uplink sounding signals are those indicated by the hypothesised visibility matrix to have visibility of the feeder terminal performing uplink sounding in that epoch. Hence in each of the $|D_{FT}[1]|$ uplink sounding epochs (alternatively written as $|U_{FT}|$ uplink sounding epochs) the feeder base stations are those having visibility of feeder terminals listed in $U_{FT}(1)(1)$, where 1 runs from one to $|U_{FT}|$. Once the initial downlink and uplink sounding schedules have been generated in this manner they are carried out at steps 334 and 336 respectively.

Conversely if at step 324 it is determined that it is not a new feeder base station that has been added to the network, this means that it is a feeder terminal that has been added and at step 330 the index m of the new feeder terminal is obtained. Then at step 332 uplink and downlink sounding schedules for the initial sounding process are derived.

With the addition of a new feeder terminal there will be only one uplink sounding epoch, during which the new feeder terminal transmits its uplink sounding signal and all feeder base stations which are indicated by the hypothesised visibility matrix to have visibility of that feeder terminal are configured to receive the uplink sounding signal. Conversely, for the downlink sounding schedule there will be as many epochs as there are feeder base stations which are hypothesised as having visibility of the new feeder terminal, this number being given by $U_{FBS}[1]$. In each of these epochs all feeder terminals which are indicated by the hypothesised visibility matrix to have visibility of the feeder base station which is sounding in that epoch will be configured to receive the downlink sounding signal, i.e. the feeder terminals are those having visibility of the feeder base stations listed in $D_{FBS}(1)(1)$, where 1 runs from one to $|D_{FBS}|$. When the initial downlink and uplink sounding schedules corresponding to the introduction of the new feeder terminal have been generated in this manner the downlink sounding is performed at step 334 and the uplink sounding is performed at step 336. The initial sounding process is complete at step 338.

Figure 15:
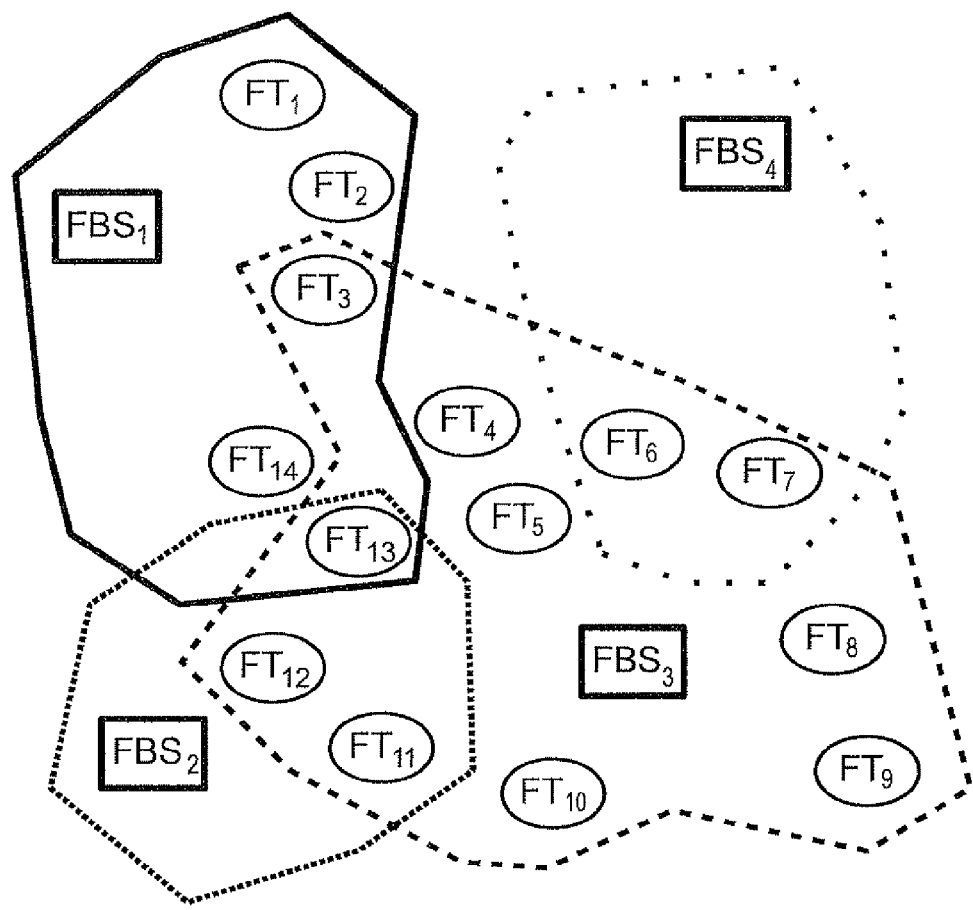
FIG. 15 illustrates the updated visibility regions and visibility matrix for the example network of FIG. 13 after the initial sounding procedure has been carried out.

FIG. 15 illustrates the wireless feeder network in terms of visibility regions once the visibility matrix has been updated after the initial sounding process described with reference to FIG. 14 has been carried out. As can be seen from the illustrated visibility regions and from the visibility matrix, the initial sounding procedure has revealed that in fact feeder base station FBS$_4$ only has visibility of feeder terminals FT$_6$ and FT$_7$. Hence the hypothesised visibility for new feeder base station FBS$_4$ has been reduced from indicating feeder terminals FT$_{1-8}$ down to only feeder terminals FT$_6$ and FT$_7$.

On the basis of the updated visibility matrix, which the feeder network controller 320 stores in database 230, the feeder network controller can then configure the updated wireless feeder network both in terms of how regular network traffic will be transmitted, for example where feeder terminals FT$_6$ and FT$_7$ previously had to be controlled by feeder base station FBS$_3$, either feeder terminal could now be associated with new feeder base station FBS$_4$, freeing up capacity for feeder base station FBS$_3$.

Figure 16:
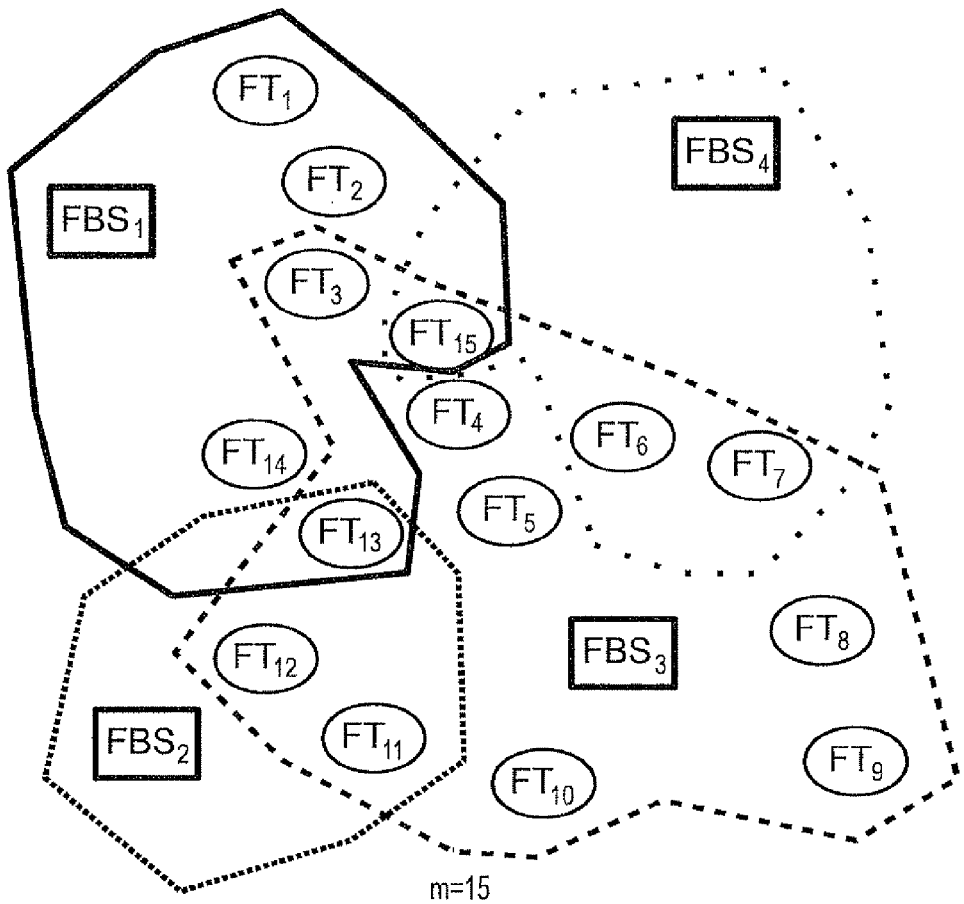
FIG. 16 illustrates the hypothesised visibility regions, an initial sounding schedule and a hypothesised visibility matrix after the addition of a feeder terminal to the example network shown in FIG. 15.

FIG. 16 schematically illustrates the addition of a further element to the wireless feeder network, namely an additional feeder terminal FT$_{15}$. From the geographical location of the new feeder terminal FT$_{15}$, it is hypothesised that this new feeder terminal in the wireless feeder network may be visible to original feeder base stations FBS$_1$ and FBS$_3$ and also to the recently added feeder base station FBS$_4$. This is also represented by a revised hypothesised visibility matrix having an additional row illustrating this hypothesis. The initial sounding procedure corresponding to the addition of this new feeder terminal is also illustrated in FIG. 16. The single new feeder terminal $FT_{15}$ results in a single uplink sounding epoch in which feeder terminal $FT_{15}$ transmits its uplink sounding signal and (based on the hypothesised visibility matrix) feeder base stations $FBS_1$, $FBS_3$ and $FBS_4$ listen for the uplink sounding signal. Conversely during downlink sounding there are three epochs corresponding to the three feeder base stations hypothesised to have visibility of feeder terminal $FT_{15}$. During each of the downlink sounding epochs the feeder terminals indicated by the hypothesised visibility matrix have visibility of the corresponding feeder base station are configured to listen for the downlink sounding signal.

Figure 17:
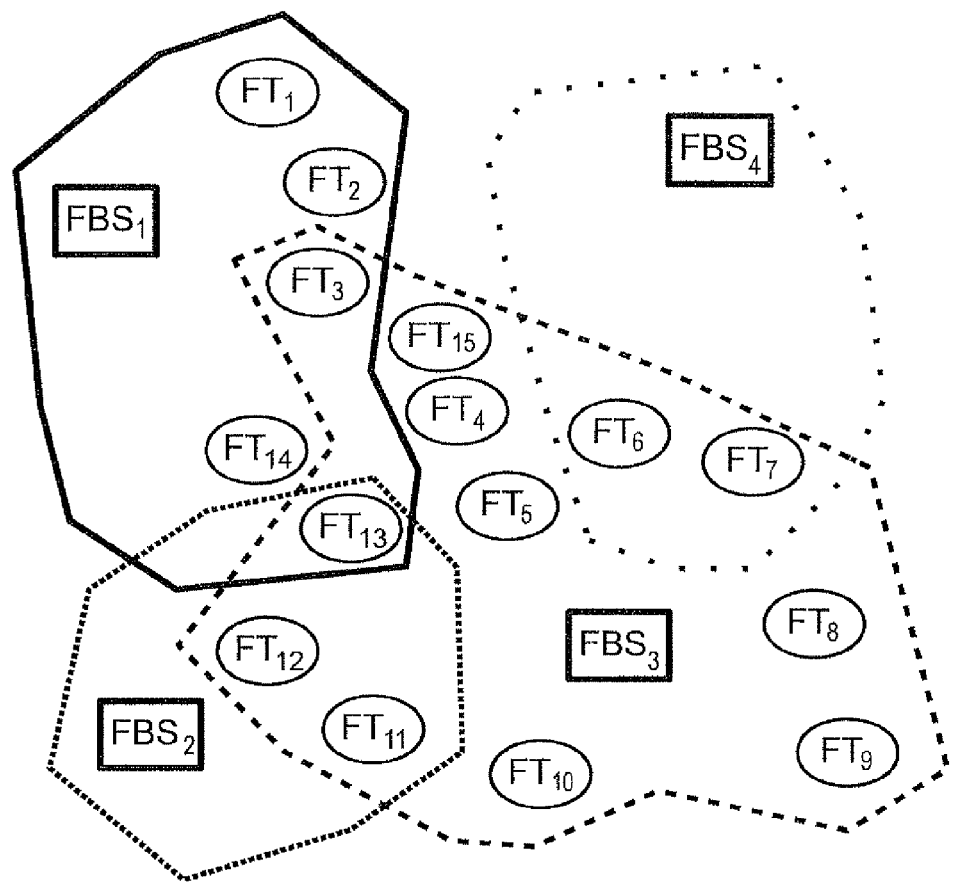
FIG. 17 illustrates the updated visibility regions and visibility matrix of the example network of FIG. 16, after the initial sounding procedure has been performed.

After the initial sounding process corresponding to the addition of new feeder terminal $FT_{15}$ has been carried out (according to the process described with reference to FIG. 14), the results are shown in FIG. 17.

FIG. 17 schematically illustrates the visibility within the wireless feeder network after the initial sounding process has been carried out following the addition of feeder terminal $FT_{15}$. As can be seen from the illustrated visibility regions and the updated visibility matrix, the initial sounding process has revealed that in fact feeder terminal $FT_{15}$ is only visible to feeder base station $FBS_3$ and not to feeder base stations $FBS_1$ and $FBS_4$ as hypothesised. This updated visibility matrix can then be stored by feeder network controller 220 in database 230 to be referred to when further configuring the wireless feeder network.

As well as the global sounding procedure and initial sounding procedure carried out when setting up a wireless feeder network (or a new component thereof), a further sounding process may be carried out once the wireless feeder network is established to monitor its performance and keep track of any changes in the channel metrics for the wireless channels in the network. This process is known as periodic sounding and is a slow rate, highly parallelised sounding procedure. Periodic sounding is coordinated by the feeder network controller such that minimum interference takes place. That is to say, the visibility matrix gives the feeder network controller the information necessary to perform periodic sounding such that the sounding may be carried out in parallel by components of the wireless feeder network which are known to have no interference overlap. This enables the periodic sounding procedure to be carried out more efficiently, since wireless channels in the network which are known to have no interference with one another can be simultaneously sounded.

Figure 18:
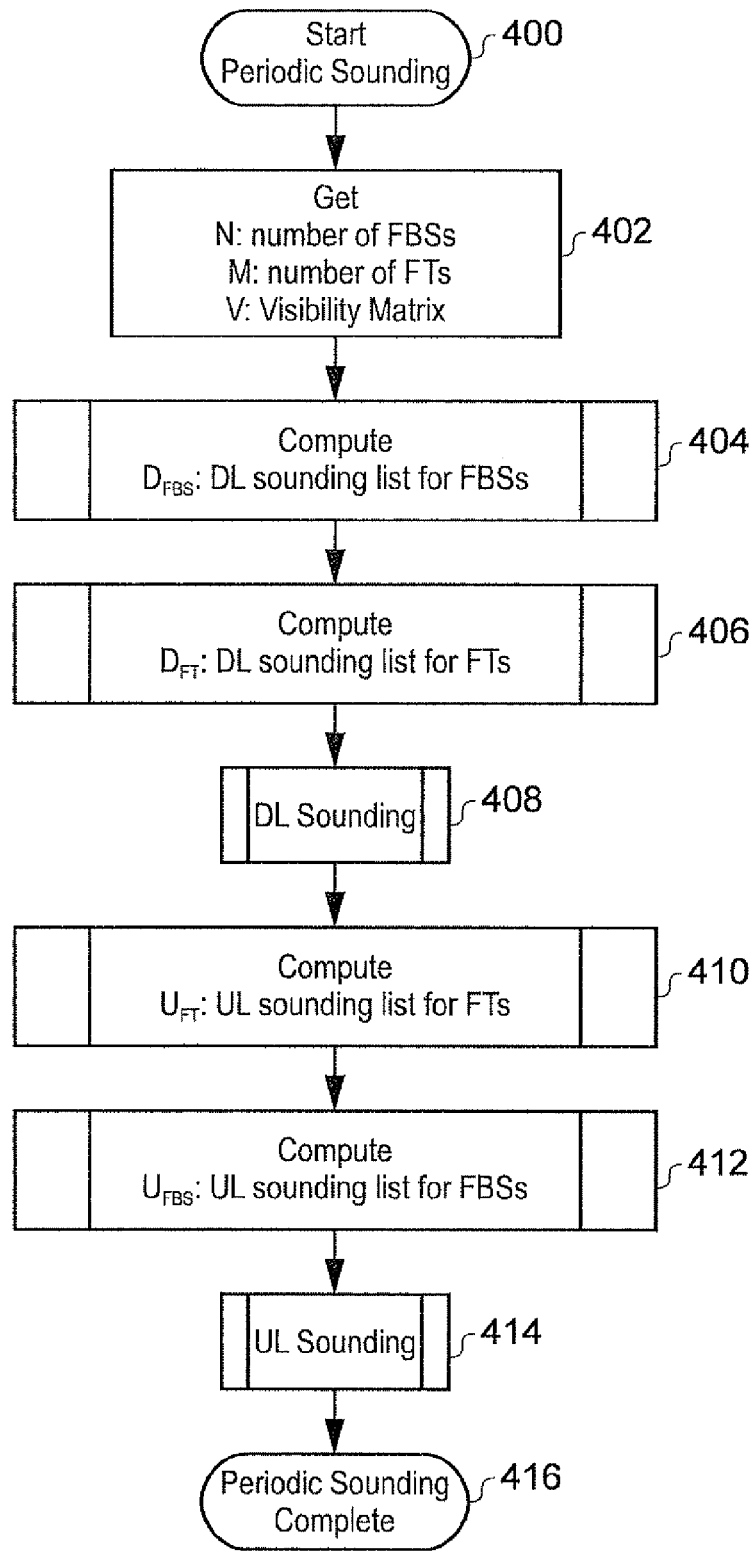
FIG. 18 is a flow diagram illustrating the basic steps performed when determining a periodic sounding schedule and carrying out that periodic sounding according to one embodiment.

The general procedure for carrying out periodic sounding is schematically illustrated in FIG. 18. The flow begins at step 400, whereafter at step 402 the feeder network controller obtains the number of feeder base station (N), the number of feeder terminals (M) and the previously determined visibility matrix (V). Thereafter at step 404 the feeder network controller determines $D_{FBS}$, namely the downlink sounding (transmission) list for the feeder base stations (described in more detail hereinafter with reference to FIG. 19). At step 406 the feeder network controller determines $D_{FT}$, namely the downlink sounding (reception) list for the feeder terminals (described in more detail hereinafter with reference to FIG. 20). At step 408, the downlink sounding process is then carried out (according to the procedure previously described with reference to FIG. 10). At step 410 the feeder network controller determines $U_{FT}$, namely the uplink sounding (transmission) list for the feeder terminals (described in more detail hereinafter with reference to FIG. 21) and at step 412 the feeder network controller calculates $U_{FBS}$, namely the uplink sounding (reception) list for the feeder base station (described in more detail hereinafter with reference to FIG. 22). At step 414, the uplink sounding procedure is then carried out (as previously described with reference to FIG. 11). The procedure is then complete at step 416. It will be appreciated that the sequence of steps illustrated in FIG. 18 is only one example, and it would of course be possible for both downlink sounding and uplink sounding to be carried out after the necessary sounding lists have been calculated (i.e. step 408 could follow step 412). Alternatively, uplink sounding could precede downlink sounding and so on.

Figure 19:
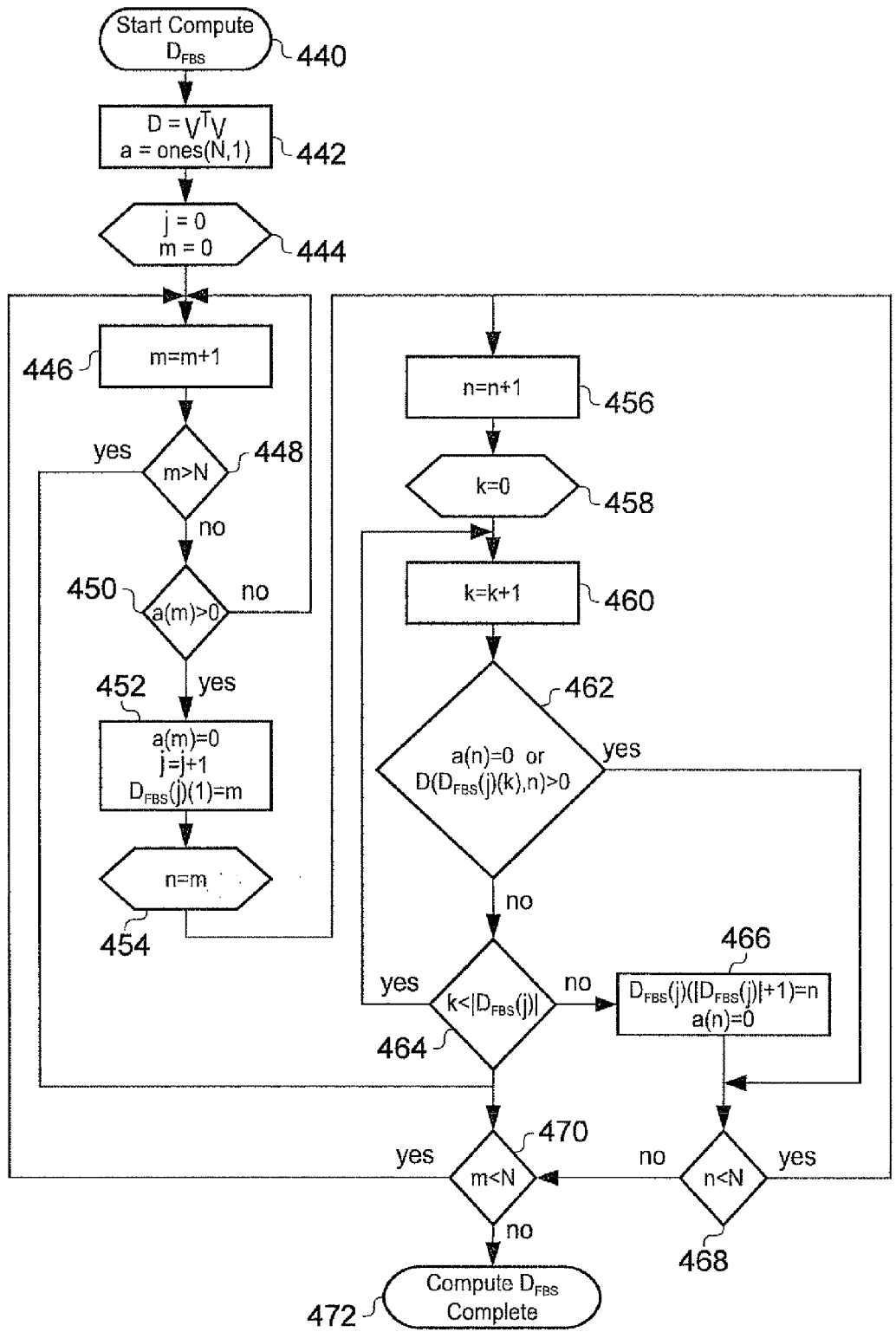
FIG. 19 is a flow diagram illustrating the process performed at step 404 of FIG. 18 according to one embodiment.

The calculation of $D_{FBS}$ is now described in more detail with reference to FIG. 19. The flow begins at step 440, and at step 442 the feeder network controller calculates the matrix product $V^TV$ (i.e. the transpose of the visibility matrix multiplied by the visibility matrix) to give square matrix D, which is an N by N square matrix showing the interference between feeder base stations. Off-diagonal elements of this matrix indicate where interference between feeder base stations is expected to occur. Also at step 442 the feeder network controller prepares a one-dimensional vector a populated by N ones, i.e. a is a vector of length N, corresponding to the number of feeder base stations. Then at step 444 the variable j representing the epoch number and the variable m representing the feeder base station number are each set to 0.

The flow then enters a loop, beginning at step 446, in which each feeder base station will be considered in turn. At step 446 m is incremented by 1, i.e. during the first iteration of this loop m is set to 1. Then at step 448 it is determined whether m is greater than N, i.e. if all feeder base stations have been considered in this loop. If they have not, then the flow proceeds to step 450, where it is checked if a(m) is greater than 0, i.e. if the $m^{th}$ element of vector a has been changed from its initial value of zero. The vector a is used to track which feeder base stations have already been included in the downlink sounding schedule, where a one indicates it has not yet been used. Hence when (at step 450) it is determined that the currently considered feeder base station has not yet been used in the downlink schedule, the flow proceeds to step 452 where a(m) is set to 0 (indicating that this feeder base station has now been used). Also at step 452, the epoch number is incremented by 1 and m (the FBS currently under consideration) is set as the first entry in this $j^{th}$ epoch of the downlink sounding schedule. Then at step 454 the variable n is set to the current value of m, and the flow proceeds to step 456.

Steps 456 and 458 initiate a sub-loop in which the remaining feeder base stations (i.e. $FBS_{m+1}$ to $FBS_N$) are considered in order to determine if any of these feeder base stations can perform their downlink sounding simultaneously with the feeder base station $FBS_m$ under consideration in the main loop (steps 446-450). At step 456 n is incremented by 1 and at step 458 the variable k is set to 0. The loop then begins at step 460 where k is incremented by 1. Variable k is used as the index for the number of feeder base stations occurring in a given epoch. Then at step 462 it is determined if a(n) equals 0 (indicating that feeder base station $FBS_n$ has already been used and allocated to a sounding epoch) or if $D(D_{FBS}(j)(k), n)$ is greater than 0 (i.e. if the FBS interference matrix D has an entry indicating that $FBS_n$ will interfere with another feeder base station (referenced by index k) already listed at this epoch (referenced by index j) of the downlink sounding schedule $D_{FBS}$).

If neither of these conditions at step 462 is true then flow proceeds to step 464, where it is determined if k is less than $|D_{FBS}(j)|$ (i.e. if for this epoch all existing entries in the downlink sounding schedule have been considered). If k is less than this value then flow returns to step 460 to increment k and loop over all entries in the current epoch. Otherwise the flow proceeds to step 466. Step 466 is reached if it is established that FBS$_n$ does not interfere with the main loop feeder base station FBS$_m$, or any of the other feeder base stations in the epoch currently under consideration. Thus at step 466 n is appended to the listed feeder base stations for the current epoch and a(n) is set to 0, indicating that this feeder base station has been used in the downlink sounding schedule. The flow then proceeds to step 468 (which step is also reached from step 462 if either of the conditions tested there are true), where it is tested if n is less than N, i.e. if all further feeder base stations (m+1 up to N) have been considered. If they have not the flow returns to step 456. If they have, the flow proceeds to step 470 where it is tested if m is less than N (i.e. if all feeder base stations in the main loop have been considered). If they have not then the flow returns to step 446, m is incremented by 1 and the next feeder base station is considered. Once all feeder base stations have been considered the flow concludes at step 472. Hence, according to the flow described in FIG. 19, the feeder network controller can determine a downlink sounding schedule for the feeder base stations, systematically determining which feeder base stations may be allocated to the same epoch and therefore perform their downlink sounding simultaneously.

Figure 20:
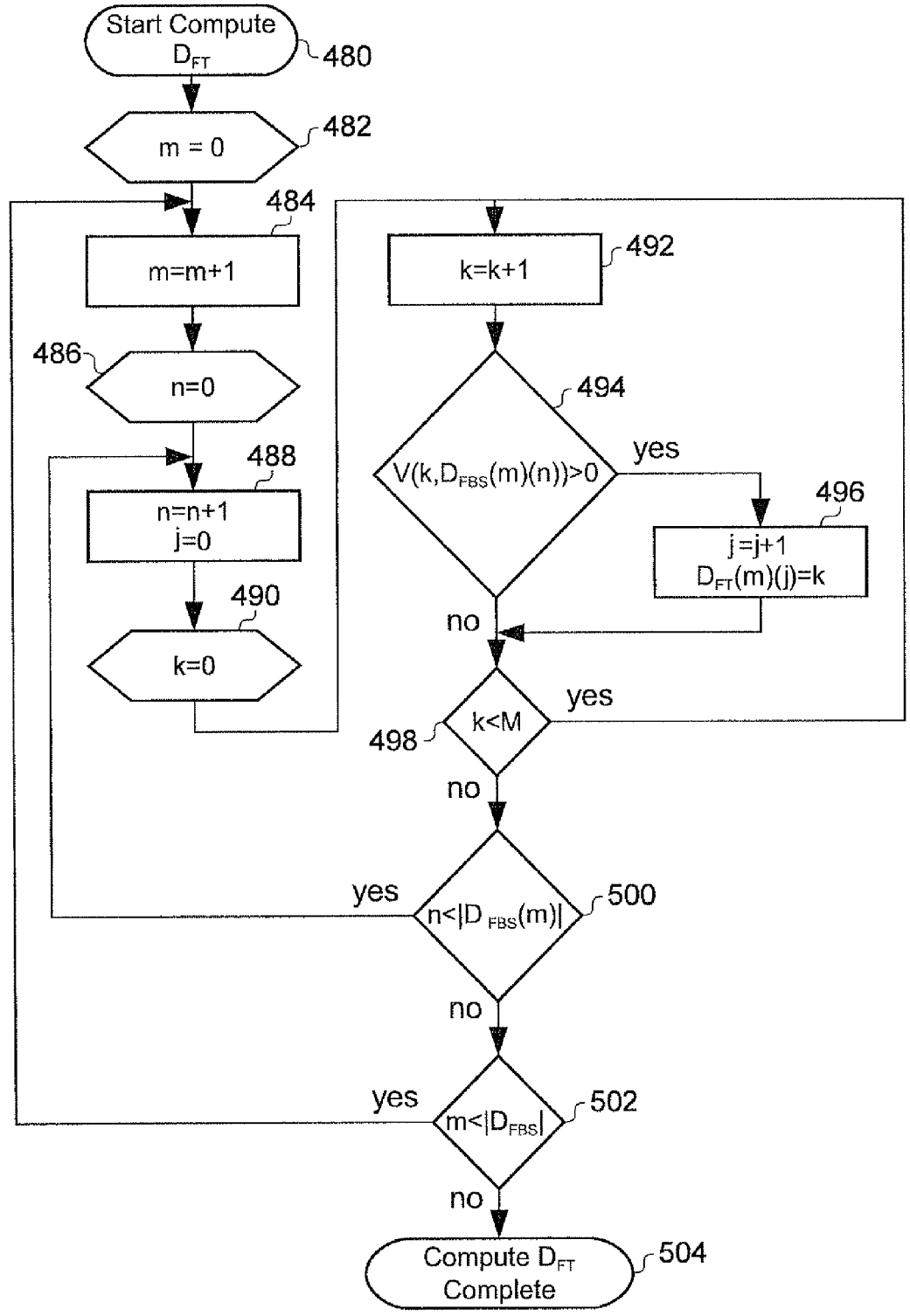
FIG. 20 is a flow diagram illustrating the process performed at step 406 of FIG. 18 according to one embodiment.

The calculation of D$_{FT}$ by the feeder network controller is now described in more detail with reference to the flow diagram illustrated in FIG. 20. The flow begins at step 480, whereafter at step 482 the epoch index m is set to 0. At step 484 the epoch m is incremented by 1 and at step 486 the variable n is set to 0. The variable n is used to loop over all feeder base stations indicated in a given epoch of the schedule D$_{FBS}$. Then at step 488 n is incremented by 1 and the variable j is set to 0. The variable j is used as an index over the number of feeder terminals which are required to receive the downlink signal in any given epoch. Then at step 490 the variable k is set to 0, where k is a variable used to loop over all feeder terminals.

The flow proceeds to step 492, where k is incremented by 1. Then at step 494 it is determined if the visibility matrix indicates visibility between the current feeder terminal under consideration (k) and the n$^{th}$ feeder base station indicated by the downlink sounding schedule D$_{FBS}$ for the current epoch. If there is visibility between this feeder terminal/feeder base station pair, then the flow proceeds via step 496 where the variable j is incremented by 1 and the downlink sounding schedule for the feeder terminals D$_{FT}$ adds feeder terminal k as an additional entry in epoch m. The flow proceeds to step 498 where it is determined if all feeder terminals have been considered (i.e. if k is less than M). If there are still feeder terminals to consider the flow returns to step 492. Once all feeder terminals have been considered the flow proceeds to step 500, at which it is determined if all feeder base stations listed in D$_{FBS}$ for the current epoch have been considered (i.e. if variable n is less than |D$_{FBS}$(m)|). If there are further base stations in the current epoch to consider the flow returns to step 488, where n is incremented by 1. Once all feeder base stations in the current epoch have been considered, the flow proceeds to step 502 where it is determined if all epochs have been considered (i.e. if variable m is less than |D$_{FBS}$|). If there is a further epoch to consider then flow returns to step 484, and once all epochs have been considered the flow concludes at step 504.

Figure 21:
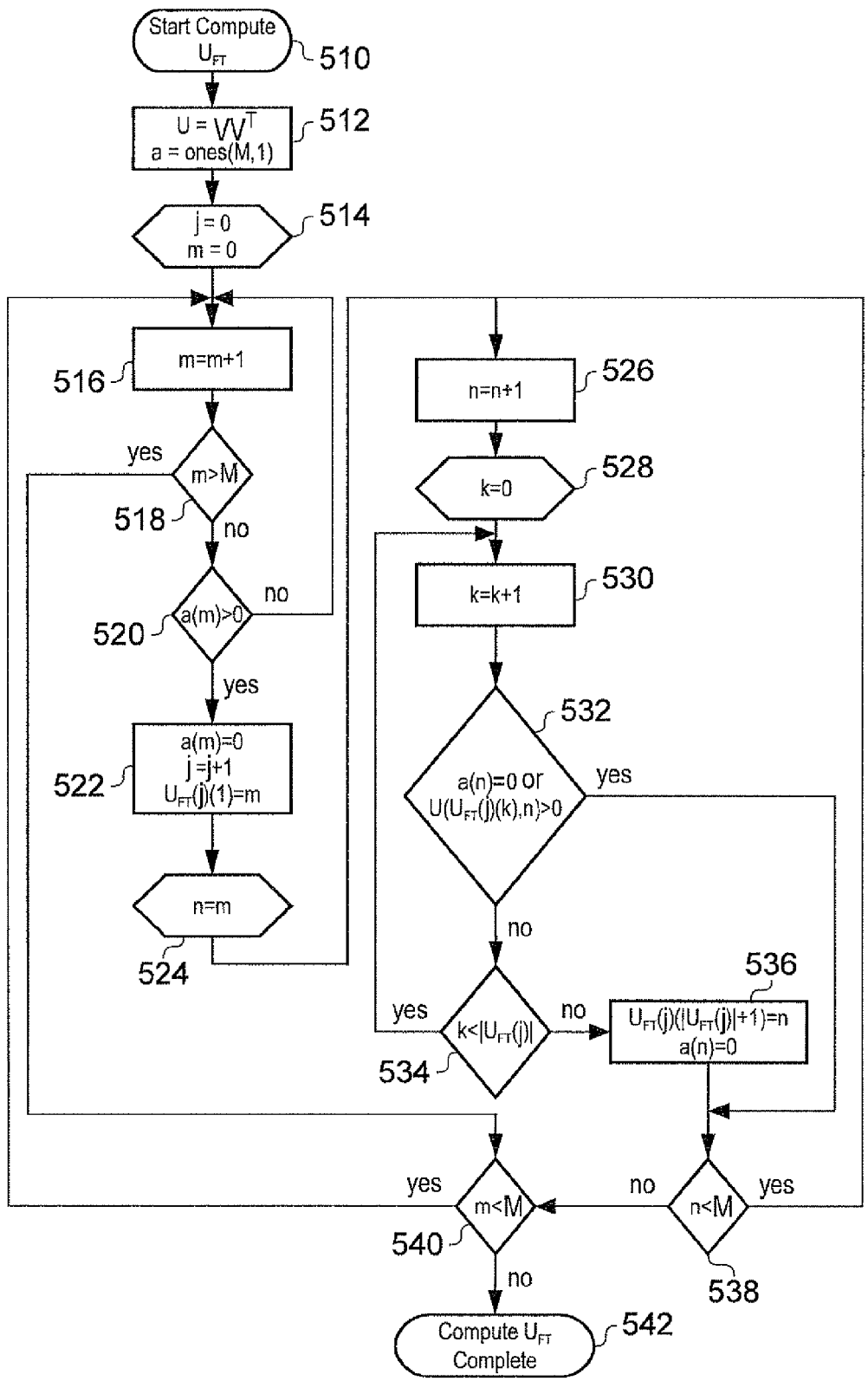
FIG. 21 is a flow diagram illustrating the process performed at step 410 of FIG. 18 according to one embodiment.

The calculation of U$_{FT}$ is now described in more detail with reference to FIG. 21. The flow begins at step 510, and at step 512 the feeder network controller calculates the matrix product VV$^T$ (i.e. the visibility matrix multiplied by the transpose of the visibility matrix) to give square matrix U, which is an M by M square matrix showing the interference between feeder terminals. Off-diagonal elements of this matrix indicate where interference between feeder terminals is expected to occur. Also at step 512 the feeder network controller prepares a one-dimensional vector a populated by M ones, i.e. a is a vector of length M, corresponding to the number of feeder terminals. Then at step 514 the variable j representing the epoch number and the variable m representing the feeder terminal number are each set to 0.

The flow then enters a loop, beginning at step 516, in which each feeder terminal will be considered in turn. At step 516 m is incremented by 1, i.e. during the first iteration of this loop m is set to 1. Then at step 518 it is determined whether m is greater than M, i.e. if all feeder terminals have been considered in this loop. If they have not, then the flow proceeds to step 520, where it is checked if a(m) is greater than 0, i.e. if the m$^{th}$ element of vector a has been changed from its initial value of zero. The vector a is used to track which feeder terminals have already been included in the uplink sounding schedule, where a one indicates it has not yet been used. Hence when (at step 520) it is determined that the currently considered feeder terminal has not yet been used in the uplink schedule, the flow proceeds to step 522 where a(m) is set to 0 (indicating that this feeder terminal has now been used). Also at step 522, the epoch number is incremented by 1 and m (the FT currently under consideration) is set as the first entry in this j$^{th}$ epoch of the uplink sounding schedule. Then at step 524 the variable n is set to the current value of m, and the flow proceeds to step 526.

Steps 526 and 528 initiate a sub-loop in which the remaining feeder base stations (i.e. FT$_{m+1}$ to FT$_M$) are considered in order to determine if any of these feeder terminals can perform their uplink sounding simultaneously with the feeder terminal FT$_m$ under consideration in the main loop (steps 516-520). At step 526 n is incremented by 1 and at step 528 the variable k is set to 0. The loop then begins at step 530 where k is incremented by 1. Variable k is used as the index for the number of feeder terminals occurring in a given epoch. Then at step 532 it is determined if a(n) equals 0 (indicating that feeder terminal FT$_n$ has already been used and allocated to a sounding epoch) or if U(U$_{FT}$(j)(k), n) is greater than 0 (i.e. if the FT interference matrix U has an entry indicating that FT$_n$ will interfere with another feeder terminal (referenced by index k) already listed at this epoch (referenced by index j) of the uplink sounding schedule U$_{FT}$).

If neither of these conditions at step 532 is true then flow proceeds to step 534, where it is determined if k is less than |U$_{FT}$(j)| (i.e. if for this epoch all existing entries in the uplink sounding schedule have been considered). If k is less than this value then flow returns to step 530 to increment k and loop over all entries in the current epoch. Otherwise the flow proceeds to step 536. Step 536 is reached if it is established that FT$_n$ does not interfere with the main loop feeder terminal FT$_m$, or any of the other feeder terminals in the epoch currently under consideration. Thus at step 536 n is appended to the listed feeder terminals for the current epoch and a(n) is set to 0, indicating that this feeder terminal has been used in the uplink sounding schedule. The flow then proceeds to step 538 (which step is also reached from step 532 if either of the conditions tested there are true), where it is tested if n is less than M, i.e. if all further feeder terminals (m+1 up to M) have been considered. If they have not the flow returns to step 526. If they have, the flow proceeds to step 540 where it is tested if m is less than M (i.e. if all feeder terminals in the main loop have been considered). If they have not then the flow returns to step 516, m is incremented by 1 and the next feeder terminal is considered. Once all feeder terminals have been considered the flow concludes at step 542. Hence, according to the flow described in FIG. 21, the feeder network controller can determine an uplink sounding schedule for the feeder terminals, systematically determining which feeder terminals may be allocated to the same epoch and therefore perform their uplink sounding simultaneously.

Figure 22:
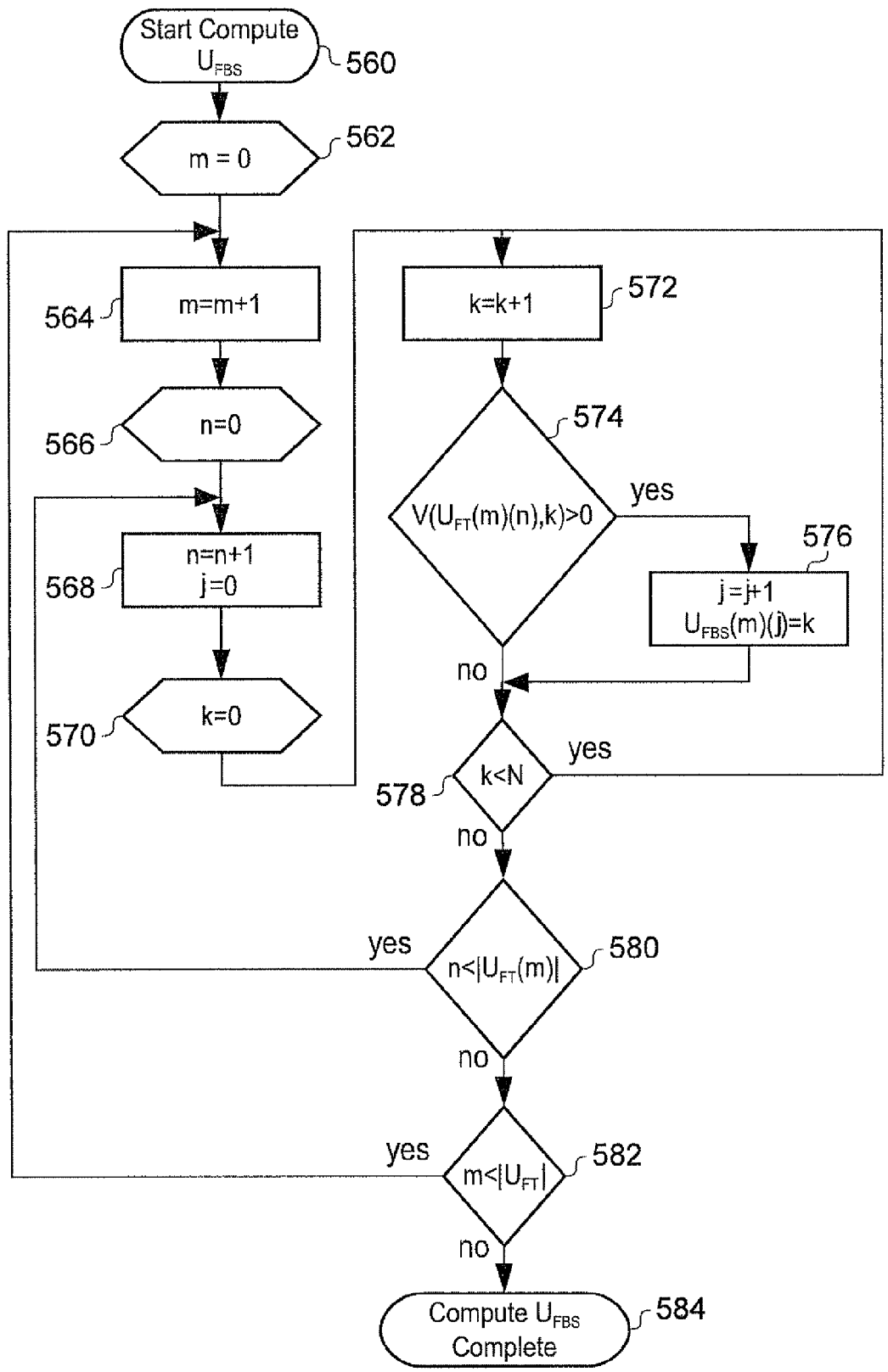
FIG. 22 is a flow diagram illustrating the process performed at step 412 of FIG. 18 according to one embodiment.

The calculation of $U_{FBS}$ by the feeder network controller is now described in more detail with reference to the flow diagram illustrated in FIG. 22. The flow begins at step 560, whereafter at step 562 the epoch index m is set to 0. At step 564 the epoch m is incremented by 1 and at step 566 the variable n is set to 0. The variable n is used to loop over all feeder terminals indicated in a given epoch of the schedule $U_{FT}$. Then at step 568 n is incremented by 1 and the variable j is set to 0. The variable j is used as an index over the number of feeder base stations which are required to receive the uplink signal in any given epoch. Then at step 570 the variable k is set to 0, where k is a variable used to loop over all feeder base stations.

The flow proceeds to step 572, where k is incremented by 1. Then at step 574 it is determined if the visibility matrix indicates visibility between the current feeder base station under consideration (k) and the $n^{th}$ feeder terminal indicated by the uplink sounding schedule $U_{FT}$ for the current epoch. If there is visibility between this feeder terminal/feeder base station pair, then the flow proceeds via step 576 where the variable j is incremented by 1 and the uplink sounding schedule for the feeder base stations $U_{FBS}$ adds feeder base station k as an additional entry in epoch m. The flow proceeds to step 578 where it is determined if all feeder base stations have been considered (i.e. if k is less than N). If there are still feeder base stations to consider the flow returns to step 572. Once all feeder base stations have been considered the flow proceeds to step 580, at which it is determined if all feeder terminals listed in $U_{FT}$ for the current epoch have been considered (i.e. if variable n is less than $|U_{FT}(m)|$). If there are further feeder terminals in the current epoch to consider the flow returns to step 568, where n is incremented by 1. Once all feeder terminals in the current epoch have been considered, the flow proceeds to step 582 where it is determined if all epochs have been considered (i.e. if variable m is less than $|U_{FT}|$). If there is a further epoch to consider then flow returns to step 564, and once all epochs have been considered the flow concludes at step 584.

It should be noted that in the above discussion with reference to FIGS. 8 to 22 the emphasis has been mainly on eliminating interference during a sounding process by relying on spatial orthogonality. However it should be appreciated that other multiple access schemes such as frequency division (FDMA), time division (TDMA) or code division (CDMA) could also be used as alternatives or in addition to reduce the number of sounding epochs required to be carried out.

As discussed earlier, to ensure that the wireless feeder network provides an efficient wireless backhaul, it is necessary for the wireless resource available to the wireless feeder network to be used in as spectrally efficient a manner as possible. The wireless resource comprises a plurality of resource blocks which can be considered to form orthogonal resources. Whilst these orthogonal resources can be established in a variety of ways, in one embodiment the wireless resource is represented in two dimensions as shown in FIG. 23, namely the time dimension (on the horizontal axis) and the frequency dimension (on the vertical axis). The wireless resource is sub-divided into horizontal and vertical strips. The horizontal strips are called sub-channels and the vertical strips are referred to as slots. In Time Division Multiple Access (TDMA), the entire frequency band is assigned to a single user. Multiple users share the radio spectrum by transmitting at different time slots. In Frequency Division Multiple Access (FDMA), each user is assigned to a fixed sub-channel.

In order to increase the system throughput, orthogonal resources may be reused throughout the network at a cost of increased intercell interference. Interference may be reduced by employing well established reuse plans. Such schemes are generally not adaptive, are overly conservative and thus do not permit the maximum utilisation of a wireless feeder network.

In the proposed scheme, traffic-aware multiple access assignments (referred to herein as global schedules) are proposed. A global schedule is a set of instructions on resource utilisation and the associated anticipated network interference. Thus, a global schedule is an allocation of one or more subchannel/slot grids (referred to herein as resource blocks) to a number of feeder base stations (FBSs) to enable downlink (DL) communication to a number of feeder terminals (FTs). Likewise, one or more resource blocks are allocated to a number of FTs to enable uplink (UL) communication. Furthermore, each resource block includes an instruction to support MIMO transmission and the associated network wide co-channel interference. The feeder network controller (FNC) is responsible for computing and communicating the global schedules to the FBSs. With the earlier described FIGS. 5A and 5B in mind, a straightforward resource block assignment that yields no interference in the network is shown in FIG. 23. The square bracketed numbers denote the resource block id number. For the DL, (x,y) denotes the transmission from FBS with index x to FT with index y, and for the UL, (x,y) denotes the transmission from FT with index x to FBS with index y.

Since system wide channel metrics (derived from the sounding process) are available, the FNC can derive a global schedule with no intercell interference that yields a significant increase in throughput. An example resource block assignment is shown in FIG. 24. Again, the resources are equally split among all users, but in contrast to FIG. 23, here the resources are reused without adding any intercell interference.

A further increase in throughput can take place by carefully examining the channel metrics and selecting sets of co-channel users with minimum co-channel interference. In the proposed scheme described herein, a systematic method is provided for computing global schedules by carefully examining the channel metrics and taking traffic into account. Initially a global schedule is derived assuming uniform traffic loading across the network. However, FBSs monitor and report traffic loading to the FNC, which in turn adapts the global schedule to meet the traffic demands. The proposed algorithms are suitable for parallelisation.

Figure 25:
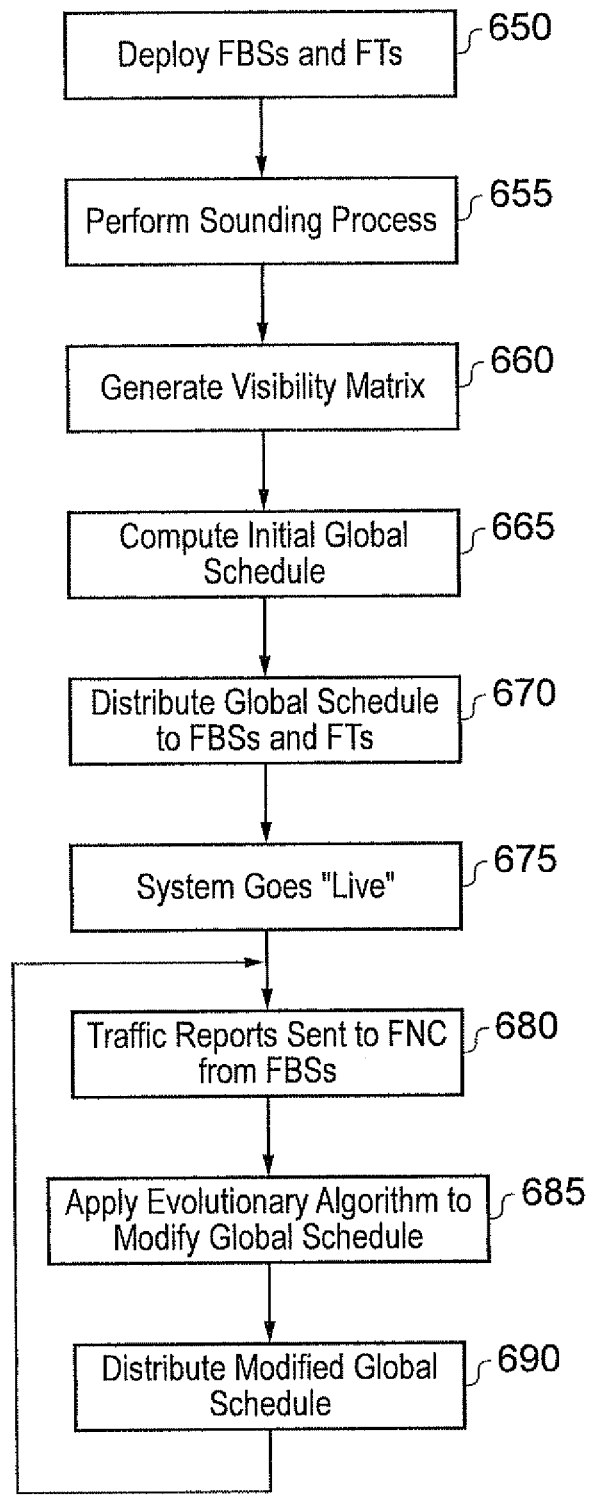
FIG. 25 is a flow diagram schematically illustrating a process performed to compute an initial global schedule and to then iteratively modify the global schedule using an evolutionary algorithm, in accordance with one embodiment.

A general outline of the process performed in accordance with one embodiment in order to compute an initial global schedule and then to adapt that schedule based on reported traffic loading, will be described further with reference to the flow diagram of FIG. 25. At step 650, the various feeder base stations and feeder terminals forming the wireless feeder network are deployed. Thereafter, a sounding process is performed at step 655, using the techniques described earlier. Based on the sounding information during the sounding process, a visibility matrix is generated at step 660. In particular this matrix will identify the various visibility regions for each of the feeder base stations.

Thereafter, at step 665, an initial global schedule is computed based on the information in the matrix generated at step 660. This initial global schedule can be computed in a variety of ways, but purely by way of illustration, an example initial global schedule could be the one discussed earlier with reference to FIG. 24 assuming the visibility regions are as shown in the earlier described FIG. 5B. The global schedule is then distributed to the feeder base stations and feeder terminals at step 670, whereafter at step 675 the system goes live, i.e. is allowed to carry actual traffic.

During use, traffic reports will be sent to the feeder network controller periodically from the various feeder base stations (step 680). Based on this input, an evolutionary algorithm is applied to modify the global schedule at step 685, whereafter a modified global schedule is distributed at step 690.

It is expected that the time taken to perform the initial sounding process and to compute and distribute an initial global schedule will be relatively lengthy, for example of the order of 1 or 2 hours. However, if the schedule is then to be adapted to changing traffic conditions, it is clearly the case that modified global schedules must be capable of being produced much more quickly. Due to the nature of the evolutionary algorithm used and the way in which it is applied to modify the global schedule, it is possible to generate modified global schedules very quickly, thereby enabling the global schedules to be changed in real time to take account of changing traffic conditions. For example, in one embodiment, the loop represented by steps 680, 685 and 690 may be repeated approximately every second.

The optimisation of the global schedules is performed using an Evolutionary Algorithm (EA), as for example described in T. Bäck, "Evolutionary Algorithms in Theory and Practice: Evolution Strategies, Evolutionary Programming, Genetic Algorithms", Oxford University, 1996, T. Bäck, U. Hammel, and H. P. Schwefel, "Evolutionary computation: comments on the history and current state", *IEEE Transactions on Evolutionary Computation,* vol. 1, pp. 3-17, April 1997, and Weise T., "Global Optimization Algorithms, Theory and Application."

Figure 26:
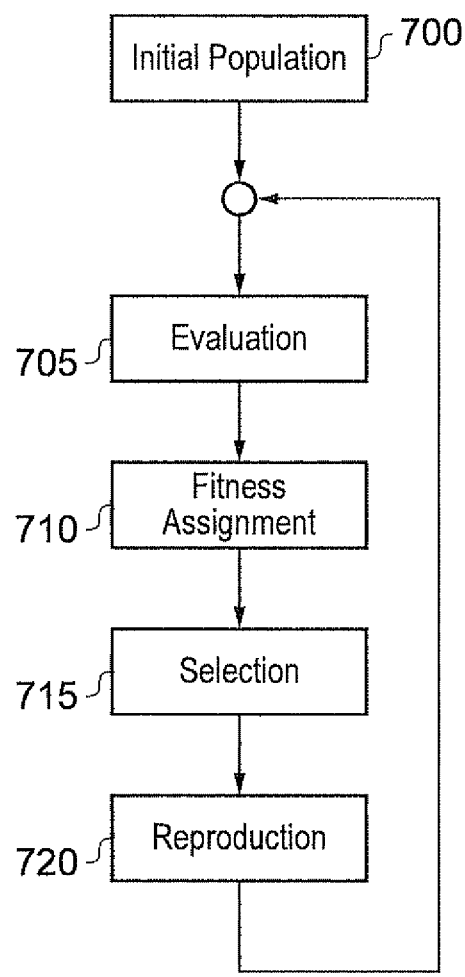
FIG. 26 is a flow diagram illustrating the basic steps performed by the evolutionary algorithm applied at step 685 of FIG. 25.

EAs are generic, population based, metaheuristic optimisation algorithms, largely inspired by biological mechanisms, such as mutation, crossover (reproduction) and selection (see page 95 of the above-mentioned "Global Optimization Algorithms, Theory and Application" document). The basic cycle of EAs is illustrated in FIG. 26, and it comprises of five blocks (as discussed on page 96 of the above-mentioned "Global Optimization Algorithms, Theory and Application" document):

Initial Population (step 700)
Evaluation (step 705)
Fitness Assignment (step 710)
Selection (step 715)
Reproduction (step 720)

The reader is referred to the document "Global Optimization Algorithms, Theory and Application" for a general discussion on the functionalities of the above mentioned blocks (in addition to those pages mentioned above, the reader may refer to pages 304 and 305). The following discussion will describe how the basic evolutionary algorithm approach illustrated in FIG. 26 is adapted to enable its use in the current situation to provide rapid updates of global schedules based on changes in traffic conditions. However, in general terms, the initial population stage 700 involves creating a set of individual entries, each individual entry in this case being an hypothesised global schedule. During the evaluation stage 705, each of the individuals in the population are evaluated, and hence in the current context the channel capacity for every feeder link in the network is computed for each hypothesised global schedule. Then, during fitness assignment step 710, for each link the channel capacity is converted to throughput by considering the number of resource blocks for each frame. This throughput is compared against the target throughput and an associated reward is allocated to each link. A reward can then be calculated for each hypothesised global schedule.

The selection stage then involves applying a process to select the individuals (i.e. the hypothesised global schedules) with high rewards more often than those with low rewards so that the individual entries with low fitness values will eventually be discarded and those with high values will enter the mating pool then used for the reproduction stage 720. At the reproduction stage, pairs in the mating pool are selected and for each pair offspring are created by combining or modifying the attributes of their parents. This results in a revised set of hypothesised global schedules which can then be subjected to another iteration of the evolutionary algorithm.

Before describing in detail the manner in which the evolutionary algorithm of embodiments is used, the operation of the feeder network controller will be described with reference to FIG. 27. The feeder network controller 750 contains global schedule computation circuitry 755 for applying an evolutionary algorithm 760. Via the input interface 765, the global schedule computation circuitry receives sounding data which provides, amongst other things, the visibility matrix identifying the visibility regions for each of the feeder base stations. In addition, via the input interface 770, the global schedule computation circuitry 755 receives traffic reports from at least the feeder base stations deployed within the feeder network. Based on the sounding data and traffic reports, the evolutionary algorithm is applied in order to generate revised sets of hypotheses, each hypothesis representing a global schedule. As and when required, one of the current hypotheses is chosen to provide an updated global schedule, and that updated global schedule is output to the various feeder base stations via the distribution interface 775.

During application of the evolutionary algorithm 760, the global schedule computation circuitry 755 will have reference to the database 780 providing a number of network parameters required by the evolutionary algorithm. These network parameters will be discussed in more detail later with reference to the relevant flow diagrams. An FNC to FNC interface 785 is provided for use in embodiments where multiple FNCs are used to manage the wireless feeder network, as will be discussed in more detail later with reference to FIGS. 36A to 38.

Figure 28:
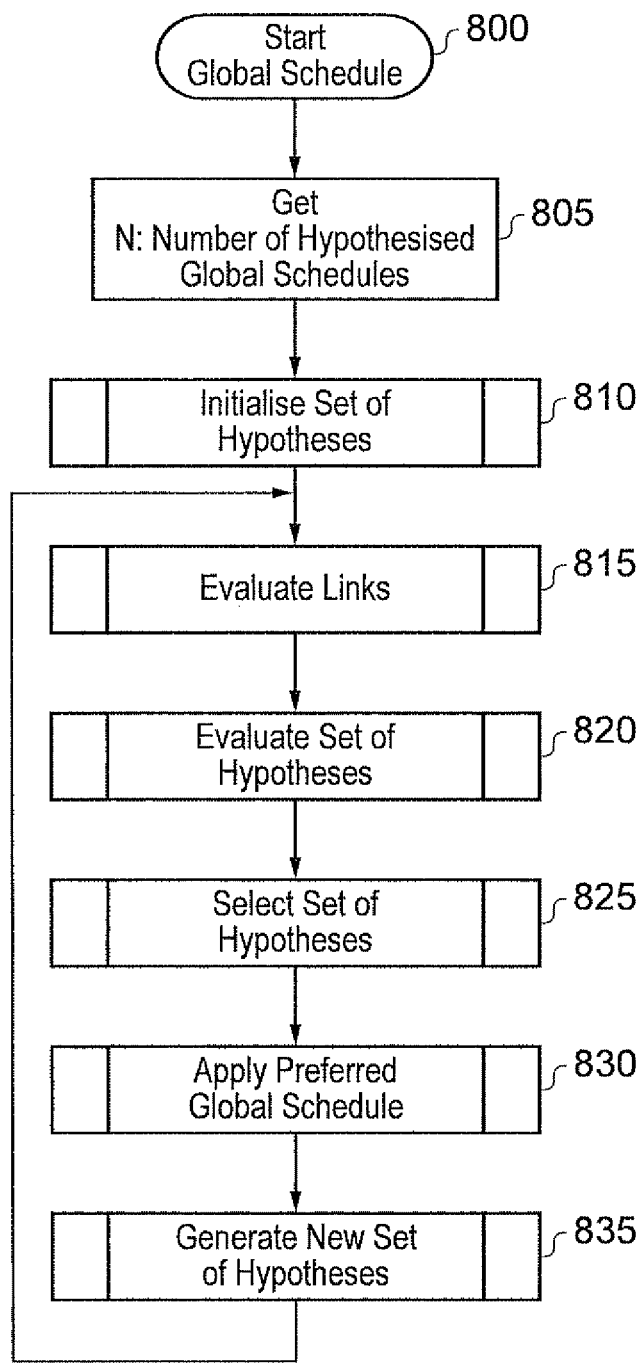
FIG. 28 is a flow diagram illustrating how an evolutionary algorithm is used in one embodiment to generate and apply global schedules.

FIG. 28 is a flow diagram illustrating the steps performed to compute and apply global schedules when a single feeder network controller is employed in the network. At step 800, the process is started, whereafter at step 805 a variable N is set equal to the number of hypothesised global schedules that are to be considered by the evolutionary algorithm. Thereafter, at step 810, a set of hypotheses are initialised. This process will be described in more detail later with reference to FIG. 29. Thereafter, a process of evaluating the various links between feeder terminals and feeder base stations is performed at step 815, this process being described later with reference to FIG. 30. Then, at step 820, the current set of hypotheses are evaluated based on the output of the link evaluation process, in order to associate a reward with each hypothesis in the set. This process will be described in more detail later with reference to FIG. 32. Thereafter, a selection process is performed at step 825 to select a modified set of hypotheses, this process being described in more detail later with reference to FIG. 33.

Then, at step 830, a process is performed to determine and apply a preferred global schedule based on the modified set of hypotheses determined at step 825. For a system including a single feeder network controller, this process will be described in more detail later with reference to FIG. 35. It should be noted that whilst in FIG. 28 step 830 is shown as being performed on each iteration of the evolutionary algorithm, it does not need to be performed on each iteration, and instead can be performed merely as and when a predetermined trigger condition occurs. This trigger condition may be completion of the current iteration of the evolutionary algorithm, or may instead be a less frequently occurring trigger condition, such as an update to a certain traffic report, the receipt of updated sounding data, etc.

At step 835, a reproduction process is performed in order to produce a replacement set of hypotheses, after which the process returns to step 815. The process at step 835 will be discussed in more detail later with reference to FIG. 34.

A more detailed discussion of the steps 810 to 835 of FIG. 28 will now be provided with reference to further flow diagrams.

Initialise Hypotheses

In this stage, multiple global schedule hypotheses are generated. Each hypothesis corresponds to a candidate global schedule. In one embodiment, an entry in the hypothesis consists of an UL or DL transmission and:
1. Resource Block (RB) assignment, indicated by a FBS id, FT id and a resource block (RB) id.
2. Multiple Input Multiple Output (MIMO) mode, specifying the multi-antenna transmission scheme.
3. Transmit Precoding Matrix (TX PCM), instructing the operations to map data streams onto antenna ports.
4. Receive Antenna Selection (RX AS), indicating one or more RX antennas to be used.
5. Link Quality Indicator(s). One or more (depending on the MIMO mode) data stream quality measures.
6. $R_{r,n}$; covariance matrix of the interference as seen by the receiver n on RB index r.

An example hypothesis is given in Table 1 below. For clarity, consider the third row in Table 1. In this example, $FBS_7$ is linked to $FT_{40}$ in the DL transmitting on RB index 1. In addition, MIMO index 2, TX precoding matrix index 2, LQI of 10 and the DL covariance matrix of the interference are all specified.

TABLE 1

Example hypothesised global schedule.

| FBS | FT | UL/DL | RB | MIMO | TX PCM | RX AS | LQI | R |
|---|---|---|---|---|---|---|---|---|
| 1 | 1 | DL | 1 | 2 | 2 | 0 | 8 | $RDL_{1,1}$ |
| 4 | 19 | DL | 1 | 2 | 2 | 0 | 7 | $RDL_{1,19}$ |
| 7 | 40 | DL | 1 | 2 | 2 | 0 | 10 | $RDL_{1,40}$ |
| . | . | . | . | . | . | . | . | . |
| . | . | . | . | . | . | . | . | . |
| 5 | 29 | DL | 9 | 2 | 2 | 0 | 9 | $RDL_{9,29}$ |
| 8 | 45 | DL | 9 | 2 | 2 | 0 | 7 | $RDL_{9,45}$ |
| 1 | 1 | UL | 1 | 2 | 2 | 0 | 8 | $RUL_{1,1}$ |
| 4 | 19 | UL | 1 | 2 | 2 | 0 | 10 | $RUL_{1,4}$ |
|  | 40 | UL | 1 | 2 | 2 | 0 | 7 | $RUL_{1,7}$ |
| . | . | . | . | . | . | . | . | . |
| . | . | . | . | . | . | . | . | . |
| 4 | 20 | UL | 9 | 2 | 2 | 0 | 8 | $RUL_{9,4}$ |
| 6 | 31 | UL | 9 | 2 | 2 | 0 | 9 | $RUL_{9,6}$ |

An example of MIMO modes applicable to a 2-transmit and 2-receive antenna configuration is given in Table 2. Table 3 presents an example of Precoding Matrix modes for 2 TX antenna systems; antenna selection, beam steering and spatial multiplexing/transmit diversity are shown. The table could be extended to include improved granular beam angle steering and beam shaping by applying different power ratios on the two transmit antennas. Antenna selection modes are given in Table 4. In this 2×2 MIMO case the DL (FT/RB specific) interference matrices and the UL (FBS/RB specific) interference matrices are also 2×2. Finally, the LQI is a measure of the quality of the anticipated link. 10 may indicate the best possible link quality, where the highest modulation and code rate may be used.

TABLE 2

MIMO modes.

| MIMO id | Description |
|---|---|
| 0 | Antenna Selection/Beamforming |
| 1 | Cyclic Delay Diversity |
| 2 | Orthogonal Space Frequency Block Coding |
| 3 | Orthogonal Space Time Block Coding |
| 4 | Spatial Multiplexing (horizontal encoding) |
| 5 | Spatial Multiplexing (vertical encoding) |

TABLE 3

TX Precoding Matrix modes for 2 antennas.

| PCM id | Weights | Description |
|---|---|---|
| 0 | $\begin{bmatrix} 1 \\ 0 \end{bmatrix}$ | Select Antenna 1 |
| 1 | $\begin{bmatrix} 0 \\ 1 \end{bmatrix}$ | Select Antenna 2 |
| 2 | $\frac{1}{\sqrt{2}}\begin{bmatrix} 1 \\ 1 \end{bmatrix}$ | Rotate the phase on antenna 2 by 0 degrees |
| 3 | $\frac{1}{\sqrt{2}}\begin{bmatrix} 1 \\ j \end{bmatrix}$ | Rotate the phase on antenna 2 by 90 degrees |
| 4 | $\frac{1}{\sqrt{2}}\begin{bmatrix} 1 \\ -1 \end{bmatrix}$ | Rotate the phase on antenna 2 by 180 degrees |
| 5 | $\frac{1}{\sqrt{2}}\begin{bmatrix} 1 \\ -j \end{bmatrix}$ | Rotate the phase on antenna 2 by 270 degrees |
| 6 | $\frac{1}{\sqrt{2}}\begin{bmatrix} 1 & 0 \\ 0 & 1 \end{bmatrix}$ | Dual stream with uniform power allocation across TX antennas |

TABLE 4

RX Antenna Selection modes for 2 antennas.

| PCM id | Weights | Description |
|---|---|---|
| 0 | $\begin{bmatrix} 1 \\ 1 \end{bmatrix}$ | Select all antennas |
| 1 | $\begin{bmatrix} 1 \\ 0 \end{bmatrix}$ | Select antenna 1 |
| 2 | $\begin{bmatrix} 0 \\ 1 \end{bmatrix}$ | Select antenna 2 |

Figure 29:
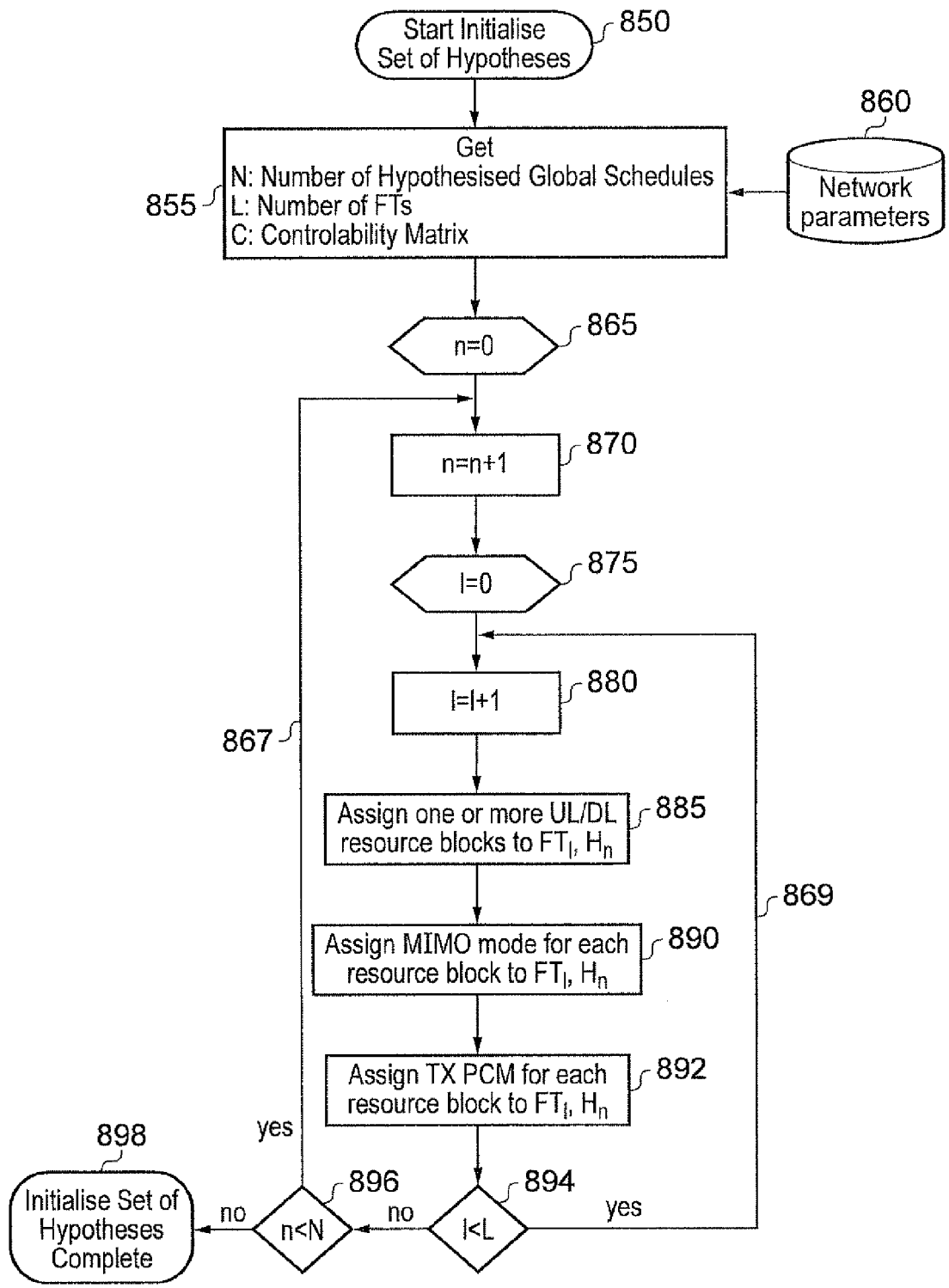
FIG. 29 is a flow diagram illustrating the process performed at step 810 of FIG. 28 in accordance with one embodiment.

FIG. 29, illustrates the steps for generating multiple global schedule hypotheses. Following start of the process at step 850, from a database of Network Parameters 860 the number of FTs (L) and the controllability matrix (C) are obtained at step 855. The controllability matrix indicates the set of valid FBS/FT feeder links in the network. In FIG. 29, two iterations take place—the outer loop 867 generates N hypotheses, whereas the inner loop 869 will, for each hypothesis $H_n$, assign one or more resource blocks to each link, and assign a MIMO mode and a TX precoding matrix to each resource block. Notice that the computation of the interference covariance matrices and the derivation of the LQIs have been omitted here. Their entries in the hypotheses are left empty, to be computed during the evaluation phase of the algorithm.

Accordingly, considering FIG. 29 in more detail, a variable n is set equal to 0 at step 865, and it then incremented at step 870. Thereafter, a variable I is set equal to 0 at step 875, and then incremented at step 880. At step 885, one or more uplink and downlink resource blocks are assigned to feeder terminal I for hypothesised global schedule n, having regard to the controllability matrix. Thereafter, at step 890, a MIMO mode is assigned for each resource block used for feeder terminal I of the hypothesised global schedule n, and then similarly at step 892 a transmit PCM value is assigned for each resource block used for feeder terminal I of hypothesised global schedule n.

At step 894, it is determined whether I is less than L, where as discussed earlier L denotes the number of feeder terminals. If it does, then the inner loop is repeated beginning at step 880. However, if at step 894 it is determined that I is not less than L, then the process proceeds to step 896, where it is determined whether n is less than N, as discussed earlier N being the number of hypothesised global schedules to be used by the evolutionary algorithm. If it is, then the outer loop is reiterated by returning to step 870. If it is not, then this indicates that all of the hypothesised global schedules have been produced, and accordingly the process proceeds to step 898 where the initialisation of the set of hypotheses is considered completed.

Evaluate Links

In accordance with step 815 of FIG. 28, every FT/FBS link within each hypothesis is evaluated. This phase is highly parallelised and may be implemented in a distributed fashion. During this phase, while considering the co-channel interference, the MIMO channel capacity for every link in the network is computed. The capacity is measured in bits per second per Hz and takes into account all implementation losses. The implementation losses are calculated at the FTs and communicated at the associated FBSs. Additional measures may be computed, for example, the round trip delay per link. This measure could play an important part in traffic routing when relays are added to the network.

Figure 30:
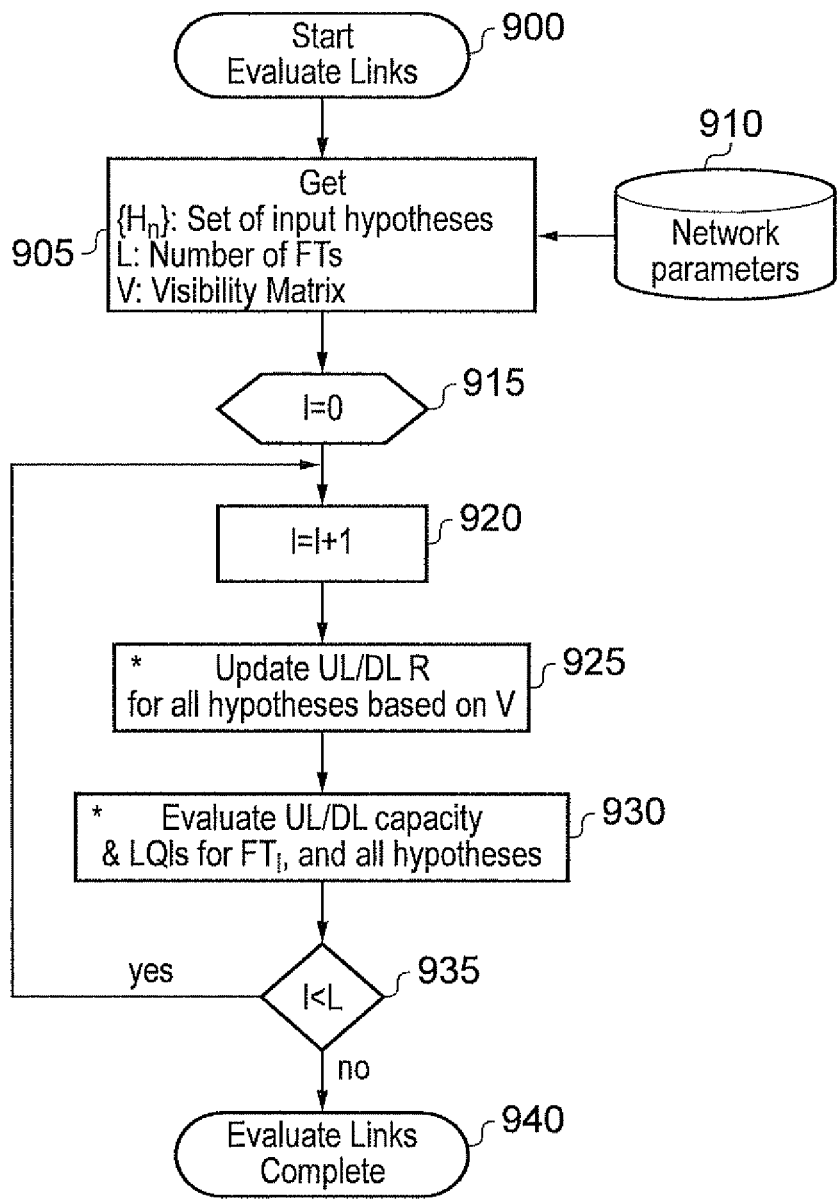
FIG. 30 is a flow diagram illustrating the process performed at step 815 of FIG. 28 in accordance with one embodiment.

FIG. 30 illustrates the steps for evaluating the links. In summary, for each FT, the UL and DL MIMO capacities are evaluated. Parallelisation is indicated by the asterisk in the figure. It should be noted that the visibility matrix is obtained from the network parameter database, and is used to identify relevant co-channel interferers.

Figure 27:
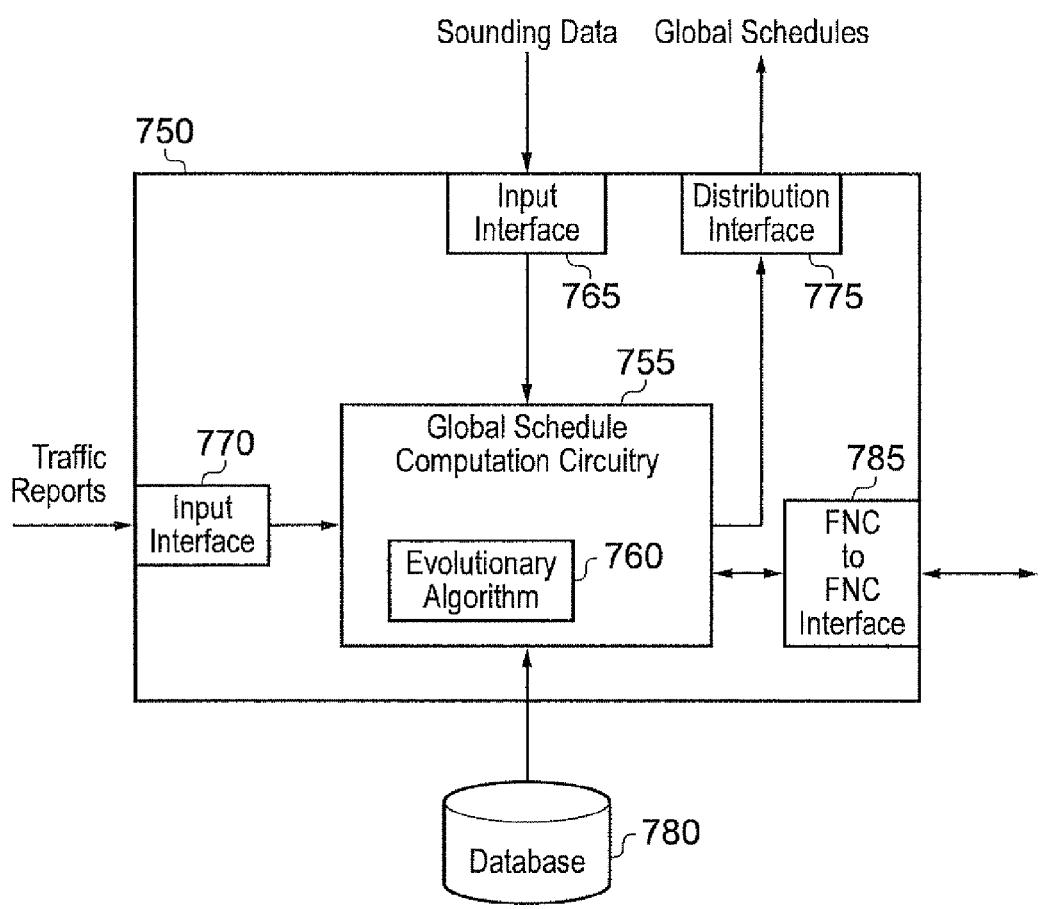
FIG. 27 is a block diagram schematically illustrating the components provided within a feeder network controller in accordance with one embodiment.

Considering FIG. 30 in more detail, at step 900, the process starts, whereafter at step 905 the set of input hypotheses, the number of feeder terminals in the system, and the visibility matrix are obtained from the network parameters 910 stored in a database such as the database 780 of FIG. 27. Thereafter, at step 915, a variable I is set equal to 0, and is then incremented at step 920. At step 925, the uplink and downlink R values are updated for all hypotheses. The visibility matrix is referred to during this process, as the visibility matrix identifies for each FT which FBS communications it can observe. Step 925 can be performed in parallel, due to the separate nature of the individual hypotheses in the set.

At step 930, the uplink and downlink capacities and LQIs are evaluated for feeder terminal I, again across all hypotheses. As with step 925, this process can be highly parallelised, given the separate nature of the individual hypotheses.

At step 935, it is determined whether the variable I is less than the total number of FTs, and if so, the process loops back to step 920. However, when it is determined at step 935 that the variable I is no longer less than the number of FTs, and accordingly all FTs have been analysed, then the process proceeds to step 940, where the evaluate links process is considered complete.

Evaluate Hypotheses

Figure 31A:
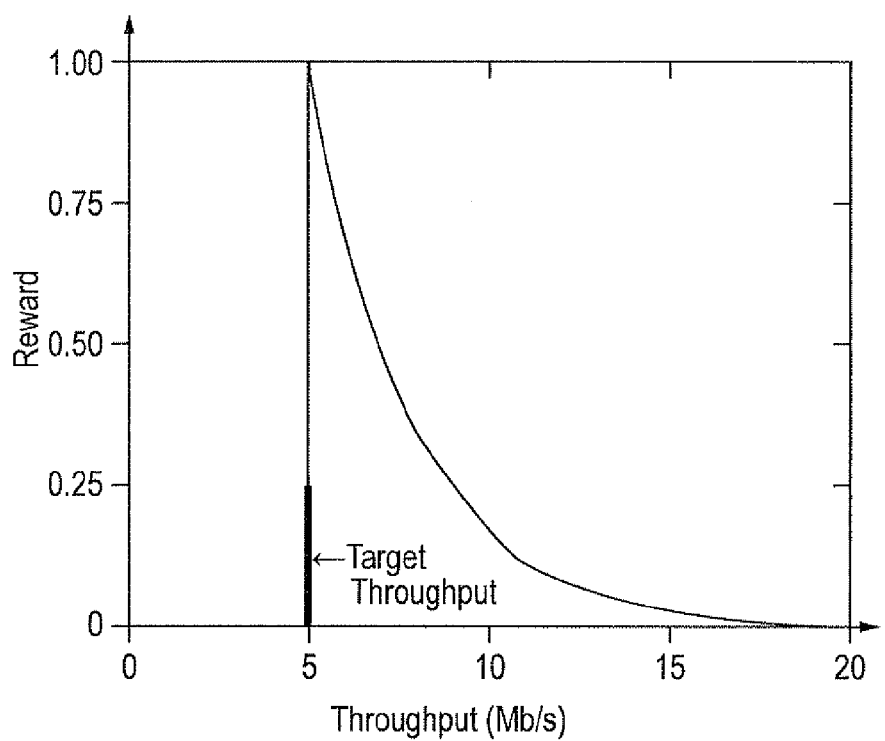
FIGS. 31A and 31B schematically illustrate reward functions that may be utilised when evaluating the set of hypotheses at step 820 of FIG. 28 in accordance with one embodiment.

Here each hypothesis $H_n$ is awarded a score $r_n$. As a rule, the higher the score the better. For each link, the channel capacity per link is converted to throughput (bits per second) by considering the number of resources block allocations for each frame. The throughput per link is checked against the target throughput. A reward is then allocated to each link. The reward, which is a positive value, is a function of the offered throughput and the desired throughput. An example reward function is given in FIG. 31A. In FIG. 31A, no reward is allocated if the offered traffic in a link is less than the desired throughput. A maximum reward is allocated to a link if the target is met. A diminishing reward is applied if the offered traffic far exceeds the target throughput. Throughput targets are time and location dependent. That is, a certain link may demand different amounts of traffic depending on the time of day. Furthermore, it may also be expected that business districts will be heavily loaded during the day and lightly loaded during the night or during public holidays; the reverse may be true in suburban areas.

Figure 31B:
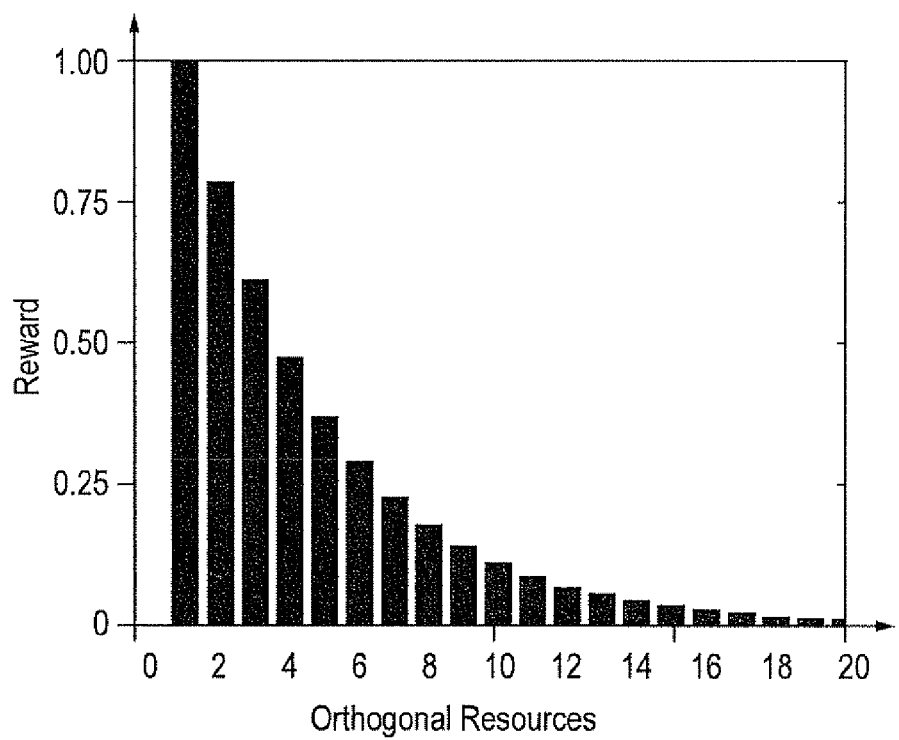

An additional reward is allocated to each link depending on the number of resource blocks used for delivering the traffic. An example function is illustrated in FIG. 31B, where the reward is maximised if one resource block (subchannel/slot) is used.

A further reward may be allocated to each link by considering the round trip delays. Again a candidate reward function may be an exponential decaying function (similar to FIG. 31B) where short delays are rewarded the most, and long round trip delays yield little or no reward.

For each link, the throughput reward, the resource utilisation reward and the round trip delay reward are added (a weighted average may instead be used if desired) to yield the total reward for that link.

For each hypothesis, the vector of (total) rewards is mapped to a single scalar that determines the overall fitness value of the hypothesis. There are a number of mapping functions, for example:

Mean (arithmetic or harmonic): this yield an average fitness value $x^{th}$ percentile: (for example the $5^{th}$ percentile) that ensures (100−x) percent of links have the same or better fitness value min: returns the fitness value of the worst link.

The vector to scalar mapping can be done in multiple steps. For example, the vector reward values for all links associated with an FBS may be mapped to a scalar, and then the scalar output for all FBSs may in turn be mapped to a single scalar to reflect the overall fitness assignment for each hypothesis.

Figure 32:
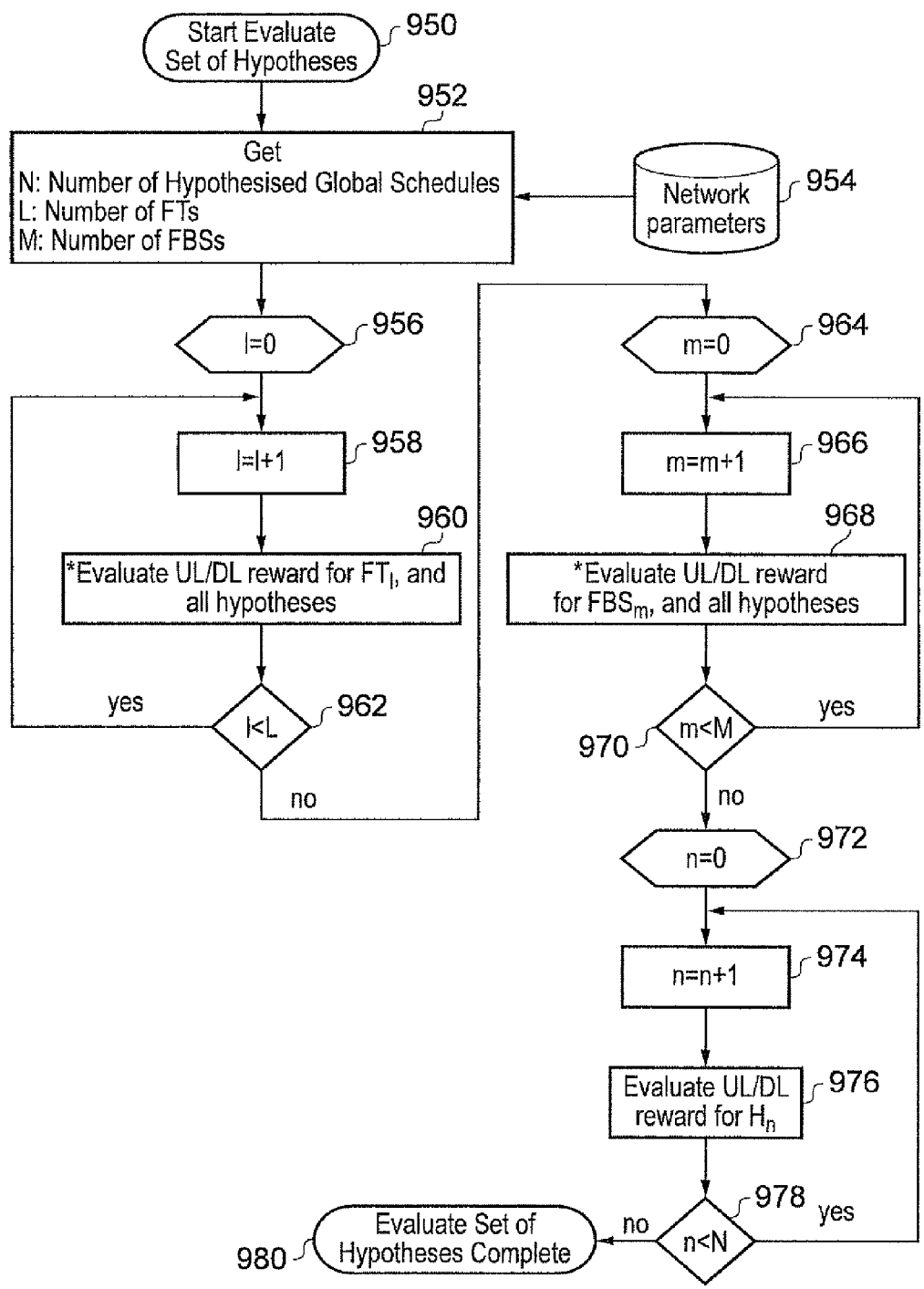
FIG. 32 is a flow diagram illustrating the process performed at step 820 of FIG. 28 in accordance with one embodiment.

FIG. 32 is a flow diagram illustrating how the above evaluation process is performed in one embodiment. At step 950, the evaluation process begins, whereafter at step 952, the number of hypothesised global schedules, the number of FTs and the number of FBSs are obtained from the network parameters 954 in the database 780.

At step 956, the variable I is set equal to 0, whereafter at step 958 I is incremented. Then, at step 960 the uplink and downlink reward for feeder terminal I is evaluated across all hypotheses. This process is performed in parallel, due to the discrete nature of the different hypotheses. Thereafter, at step 962, it is determined whether the variable I is less than the number of FTs, and if so the process returns to step 958. However, when it is decided at step 962 that the variable I is no longer less than the number of FTs, then at this point the uplink and downlink rewards for all feeder terminals across all hypotheses is complete, and the process proceeds to step 964.

Steps 964, 966, 968 and 970 perform the same process as steps 956, 958, 960, 962, but in respect of each FBS rather than each FT. Again, step 968 can be performed in parallel for all hypotheses. Once it is determined at step 970 that all FBSs have been considered, then the process proceeds to step 972.

At step 972, a variable n is set equal to 0 and then at step 974 n is incremented. Thereafter, at step 976 the various uplink and downlink rewards for hypothesis n are evaluated in order to produce a reward value for the hypothesis. At step 978, it is determined whether all hypotheses have been considered, and if not the process returns to step 974. However, once it is determined at step 978 that all hypotheses have been considered, then the process proceeds to step 980 where the evaluation process is considered complete.

Select Hypothesis

The selection performed at step 825 of FIG. 28 is done in a random fashion, selecting the hypotheses with high rewards more often. As a consequence, hypotheses with low rewards will eventually be discarded and those with high values will proceed to the next stage. If N denotes the number of (input) hypotheses that enter the selection process, then N will also be the number of (output) hypotheses that will be generated by the selection process. It should be clear that some output hypotheses will be in duplicate.

Figure 33:
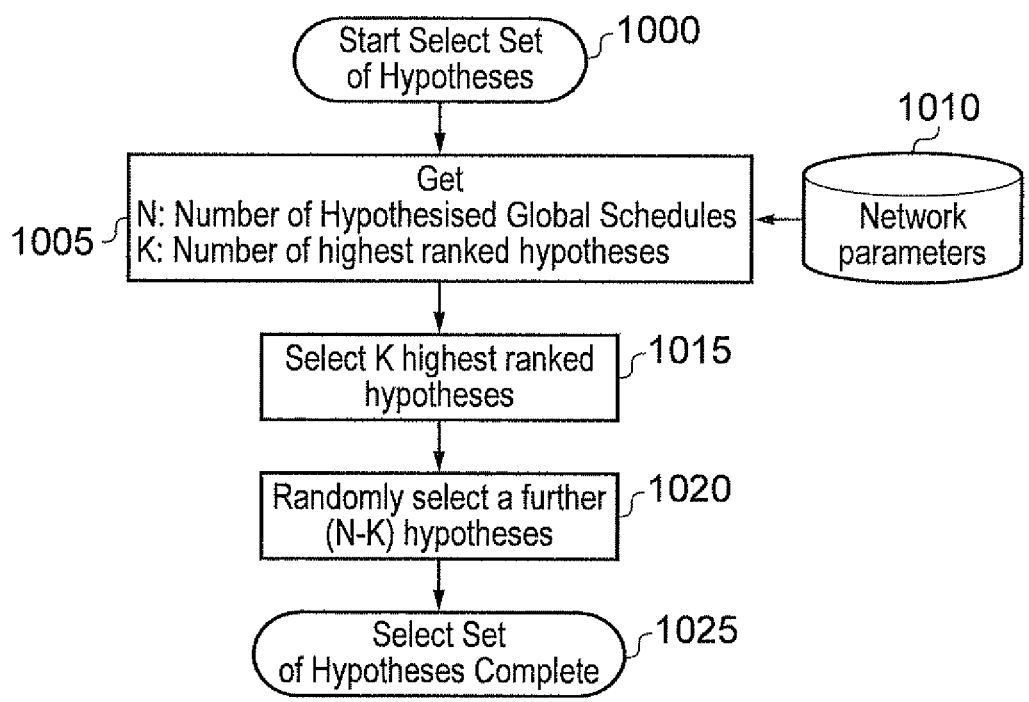
FIG. 33 is a flow diagram illustrating the process performed at step 825 of FIG. 28 in accordance with one embodiment.

FIG. 33 illustrates the steps performed in one embodiment in order to select a modified set of hypotheses. At step 1000, the process begins, whereafter at step 1005 the number of hypothesised global schedules N is obtained, and then the number of highest ranked hypotheses K is determined with reference to the results of the evaluation process described with reference to FIG. 32, this information being stored as network parameters 1010 within the database 780.

At step 1015, the K highest ranked hypotheses are selected, whereafter at step 1020 a further N-K hypotheses are selected randomly. Thereafter, at step 1025, the selection process is considered complete, and the resultant modified set of hypotheses are output.

In practice, the value K is typically equal to one or two. The selection of the K highest ranked hypotheses guarantees the survival of the best solution.

Generate a New Set of Hypotheses

After the modified set of hypotheses has been produced by step 825 of FIG. 28, a replacement set of hypotheses is created by the reproduction step 835 of FIG. 28. If N denotes the number of (input) hypotheses that enter this process, then N will also be the number of new (output) hypotheses that will be generated.

This phase contains the following four operations, described for example in the earlier mentioned publication Weise T., "Global Optimization Algorithms, Theory and Application", http://www.it-weise.de/projects/book.pdf.

Creation: One or more hypotheses are generated with random attributes.

Duplication: One or more input hypotheses with the highest score are copied without any modifications.

Mutation: A minor attribute of an input hypothesis is randomly modified to generate a new hypothesis. The selected input hypotheses for this stage are selected in a random fashion.

Recombination (or Crossover): Attributes from pairs of input hypotheses are randomly swapped to create pairs of new hypotheses. The selected input hypotheses for this stage are selected by random.

In one embodiment, a fifth new operation is also added:

Reincarnation: Reinstate one or more global schedules (stored in a database). For example, reinstate a global schedule that was applied 24 h and/or 7 days ago. The assumption here is that traffic demand is cyclostationary.

Let $N_C$, $N_D$, $N_M$, $N_R$, and $N_I$, denote the number of creations, duplications, mutations, recombinations and reincarnations, respectively. It will be clear that $N=N_C+N_D+N_M+N_R N_I$. In one embodiment, $N_C$ is typically set to 1; random starting points are generally a good idea to avoid local minima during optimisation. $N_D$ is typically set to 2 ensuring the survival of the fittest. The number of recombination $N_R$ is by design an even number and usually does not exceed the number of mutations $N_M$.

During a mutation or a recombination one or more attributes of the hypotheses are modified. This is carried out by modifying or appending one of the following:

1. Resource block assignment (use an alternative, add a new one, or delete one),
2. MIMO mode
3. TX Precoding matrix mode For any mutation or recombination it must be ensured that the changes result in valid entries. For example, resource block assignments must be orthogonal for all FTs connected to the same FBS.

Figure 34:
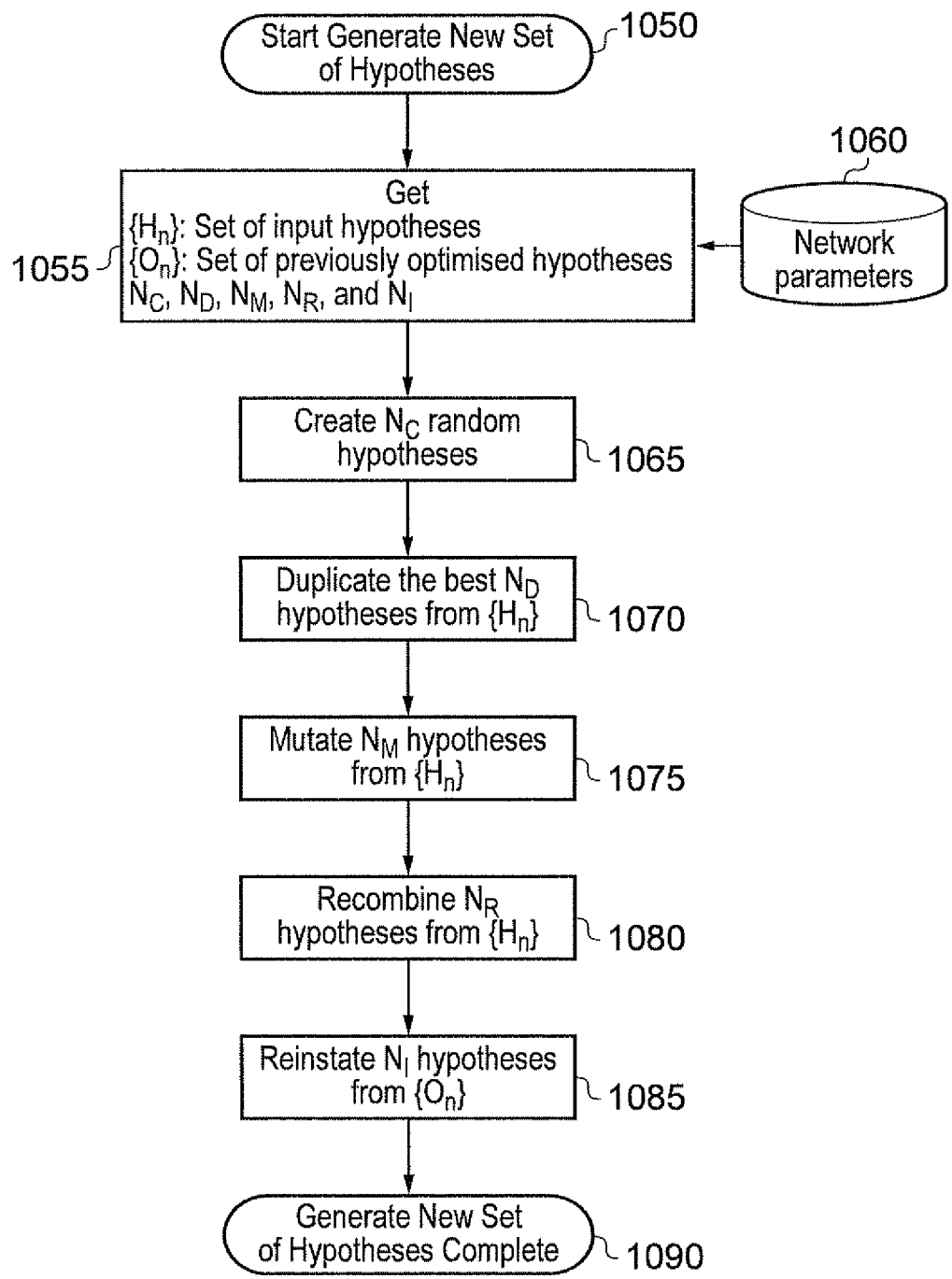
FIG. 34 is a flow diagram illustrating the process performed at step 835 of FIG. 28 in accordance with one embodiment.

FIG. 34 illustrates the steps for generating a new set of hypotheses.

At step 1050, the generation step begins, whereafter at step 1055 the set of input hypotheses are obtained from the network parameters 1060 along with a set of previously optimised hypotheses, for example hypotheses that are considered to provide particularly good solutions having regard to a particular time of day, day of the week, etc. The variables $N_C$, $N_D$, $N_M$, $N_R$, and $N_I$ are also obtained, these values typically having been set in advance. Thereafter, at step 1065, $N_C$ random hypotheses are created, and at step 1070 the best $N_D$ hypotheses from the set of input hypotheses are duplicated. At step 1075, $N_M$ hypotheses from the set of input hypotheses are mutated, with the hypotheses selected for this process typically being random. At step 1080, $N_R$ hypotheses from the set of input hypotheses are subjected to the recombination process. Again, the hypotheses chosen for this process are typically random, other than the requirement for an even number of hypotheses to be chosen. At step 1085, $N_I$ hypotheses are reinstated from the set of previously optimised hypotheses, whereafter the generation process is considered complete at step 1090.

It will be appreciated that the various parameters $N_C$, $N_D$, $N_M$, $N_R$, and $N_I$ can be varied if desired. For example, whilst at some times of the day, it may be appropriate to reinstate an hypothesis from a set of previously optimised hypotheses at step 1085, there may be other times of day when this is not appropriate, and accordingly it would be appropriate to set the variable $N_I$ to 0 and to adjust the other variables accordingly.

Apply Preferred Global Schedule

This procedure (step 830 of FIG. 28) is responsible for selecting the global schedule and disseminating the information to the various nodes of the network. Specifically, the FNC searches through the current set of hypotheses and selects the one yielding the highest score. The selected hypothesis will thus be the next global schedule to be applied to the network. The FNC is also responsible for communicating the global schedule to its connected FBSs. In order to minimise the amount of information sent to each FBS, the FNC will communicate portions of the global schedule pertinent to each FBS.

Figure 35:
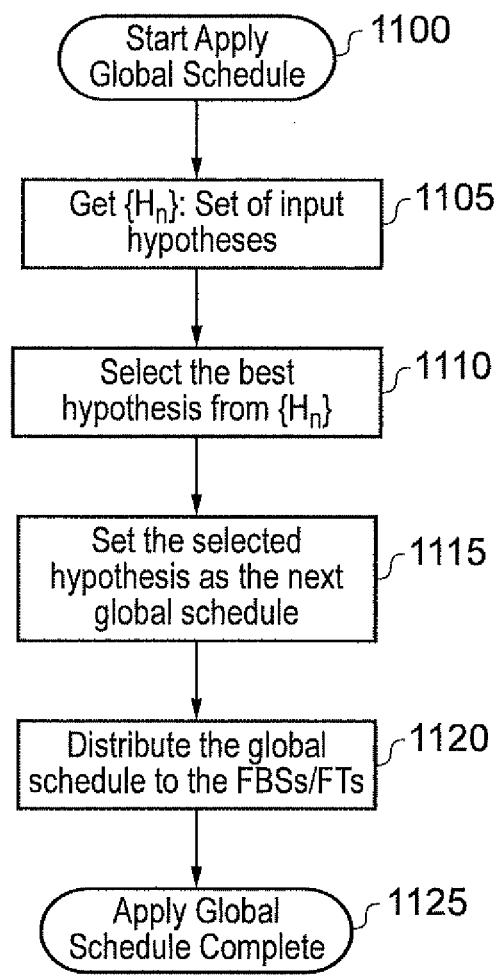
FIG. 35 is a flow diagram illustrating the process performed at step 830 of FIG. 28 in accordance with one embodiment.

FIG. 35 is a flow diagram illustrating the above process. At step 1100, the process starts, whereafter at step 1105 the set of input hypotheses is obtained. At step 1110, the best hypothesis from the set, based on its current reward value, is selected, and then at step 1115 the selected hypothesis is set as the next global schedule. Thereafter, at step 1120, the global schedule is distributed to the FBSs and FTs, whereafter the process is considered completed at step 1125.

In the above described embodiment, it is assumed that a single feeder network controller manages all of the FBSs and FTs. However, in an alternative embodiment, it is possible to distribute this task amongst multiple feeder network controllers, as for example illustrated in FIG. 36A. In particular, from a comparison of FIG. 36A with FIG. 5A, it will be seen that the number of FBSs and FTs are unchanged, and the individual controllability regions of each FBS 161 to 168 is also unchanged (namely the regions 171 to 178). However, the various FBSs are not all controlled by a single FNC and instead FNC 1150 controls the FBSs 161, 162, 163, the FNC 1160 controls the FBSs 164, 165 and the FNC 1170 controls the FBSs 166, 167, 168. Accordingly, in this embodiment, not only are there controllability regions for each FBS, defining the FTs controlled by that FBS, but there are also now separate controllability regions for each FNC, defining the FBSs within the control of each FNC. Accordingly, the FNC 1150 has the associated controllability region 1155, the FNC 1160 has the associated controllability region 1165, and the FNC 1170 has the associated controllability region 1175. Accordingly, the following two controllability matrices can be formed:

FBS/FT controllability matrix (C1): this is a sparse matrix populated primarily with zeros. The rows of C1 correspond to the FTs and the columns to the FBSs. A one in the $i^{th}$ row and the $j^{th}$ column indicates that the $FT_i$-$FBS_j$ pair is connected (i.e. an actual feeder link exists between them). Thus, data and control messages are delivered in the UL and the DL for the $FT_i$-$FBS_j$ pair.

FNC/FBS controllability matrix (C2): this is again a sparse matrix populated primarily with zeros. The rows of C2 correspond to the FBSs and the columns to the FNCs. A one in the $i^{th}$ row and the $j^{th}$ column indicates that the $FBS_i$-$FNC_j$ pair is connected, and $FNC_j$ is responsible for the delivery and reception of data and control messages to $FBS_i$.

Figure 36A:
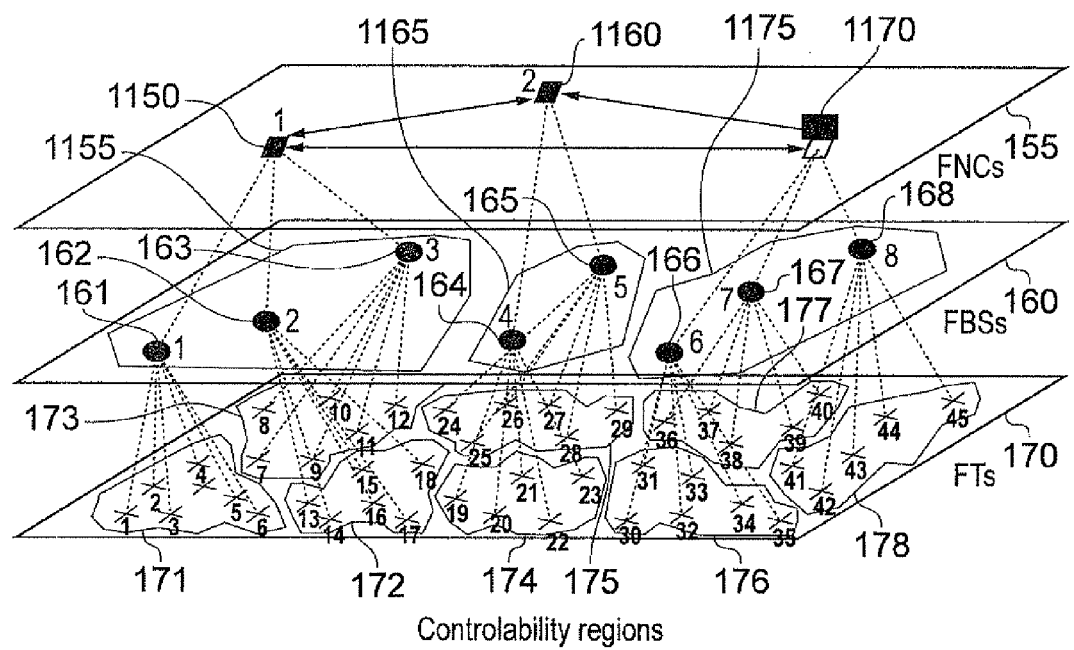
FIGS. 36A and 36B illustrate the same arrangement of feeder base stations and feeder terminals as shown in FIGS. 5A and 5B, but consider a situation where three feeder network controllers are used to collectively control the wireless feeder network in accordance with one embodiment.
Figure 36B:
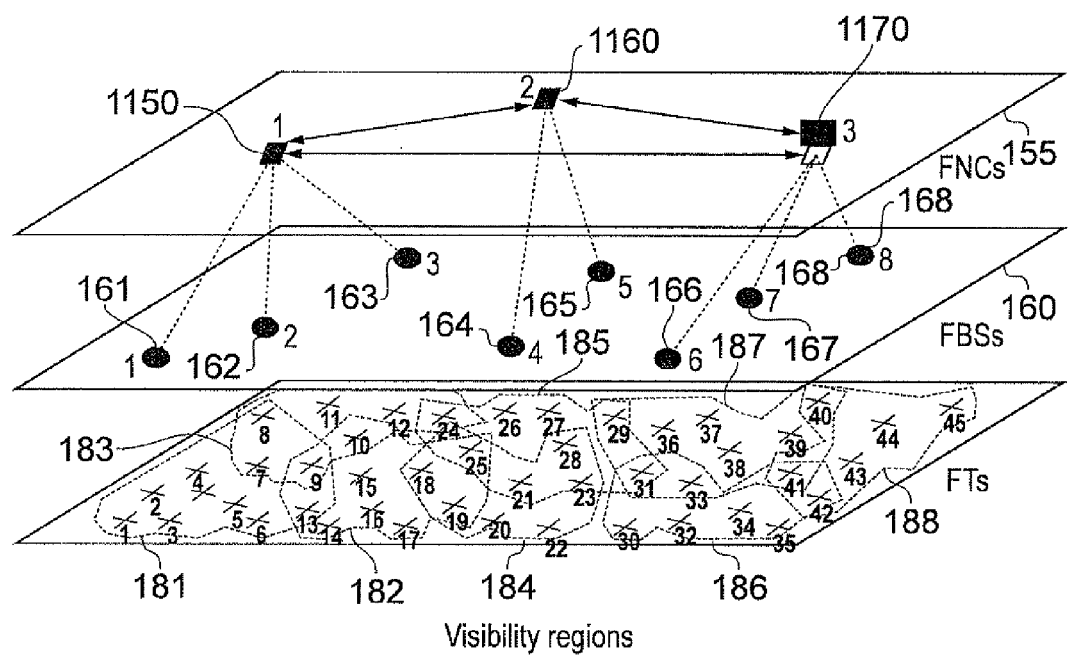

The visibility regions are also defined, which are specified by the visibility matrix (V): The rows of the visibility matrix correspond to the FTs and the columns to the FBSs. A one in the $i^{th}$ row and the $j^{th}$ column indicates that the $FT_i$-$FBS_j$ pair may communicate or interfere with each other; a zero indicates that the FT-FBS pair cannot communicate or interfere with one another. These visibility regions 181 to 188 are shown in FIG. 36B, and are unchanged from those shown in FIG. 5B.

During the deployment of the FBSs in the network, each FBS is allocated (for example manually) to an FNC. The matrix C2 is completely specified after the deployment stage. Following the FT deployment, the sounding process yields the matrix V. The FNC responsible for global sounding will determine the initial FBS/FT controllability matrix C1. The initial FBS/FT assignment may for simplicity be based on the carrier Received Signal Strength Indicator (RSSI), which is a wideband measure primarily affected by path loss and shadow fading.

C1 (or C2) is a valid matrix, if the sum of each rows of C1 (or C2) is equal to one. Assuming equal loading across the network, it is reasonable to assume that each FBS (or FNC) is connect to the approximately the same number of FTs (of FBSs). Thus, the column sums of C1 (or C2) should be approximately the same. While any valid matrix for C2 is acceptable as an initial setting, C1 must satisfy the following rule: C1=C1.*V1. Here the operator (.*) denotes element wise multiplication. The rule ensures that the FBS/FT controllability regions are a subset of the visibility regions.

Figure 37:
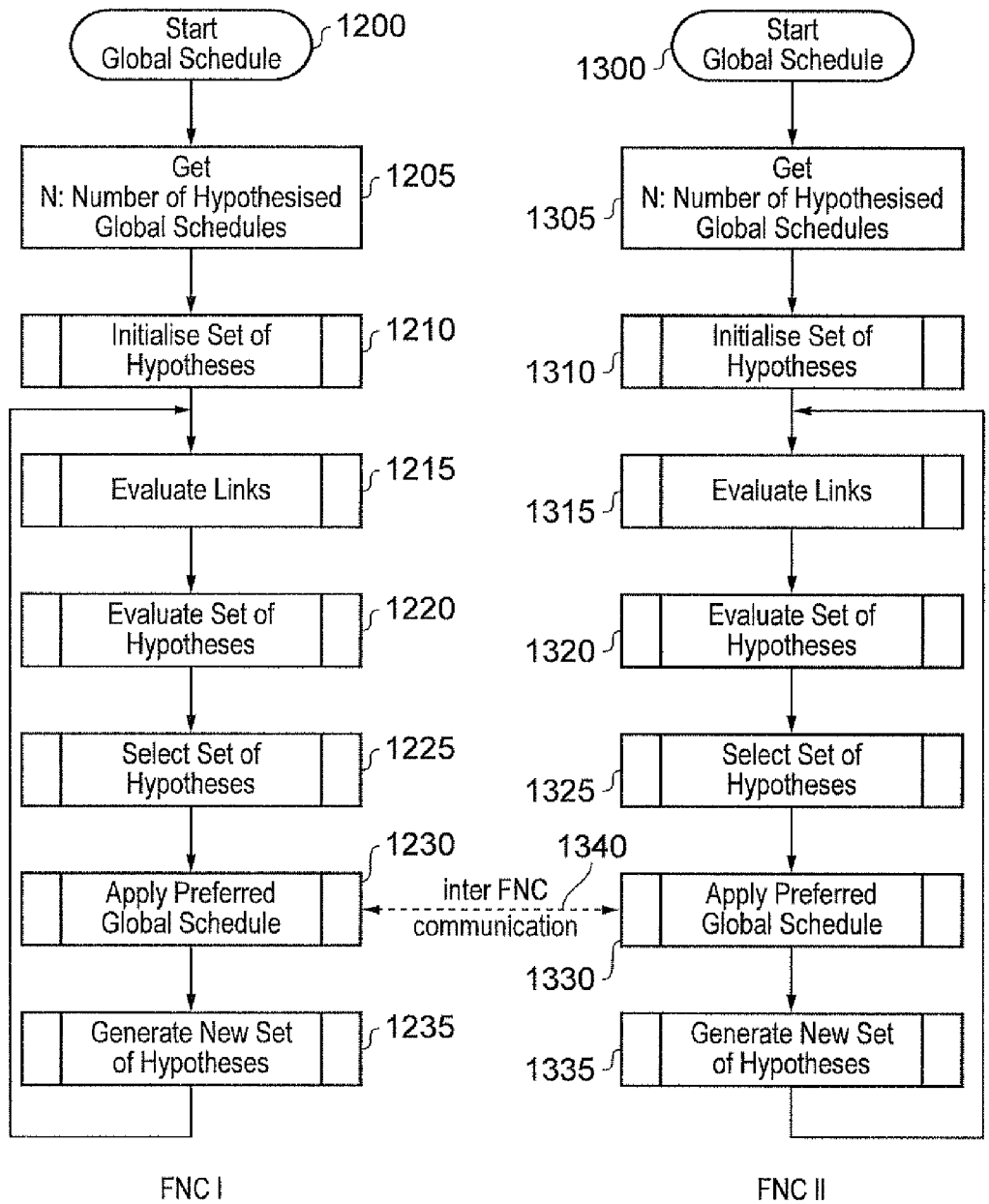
FIG. 37 illustrates how the process of FIG. 28 can be applied in parallel across multiple feeder network controllers in accordance with one embodiment.
Figure 38:
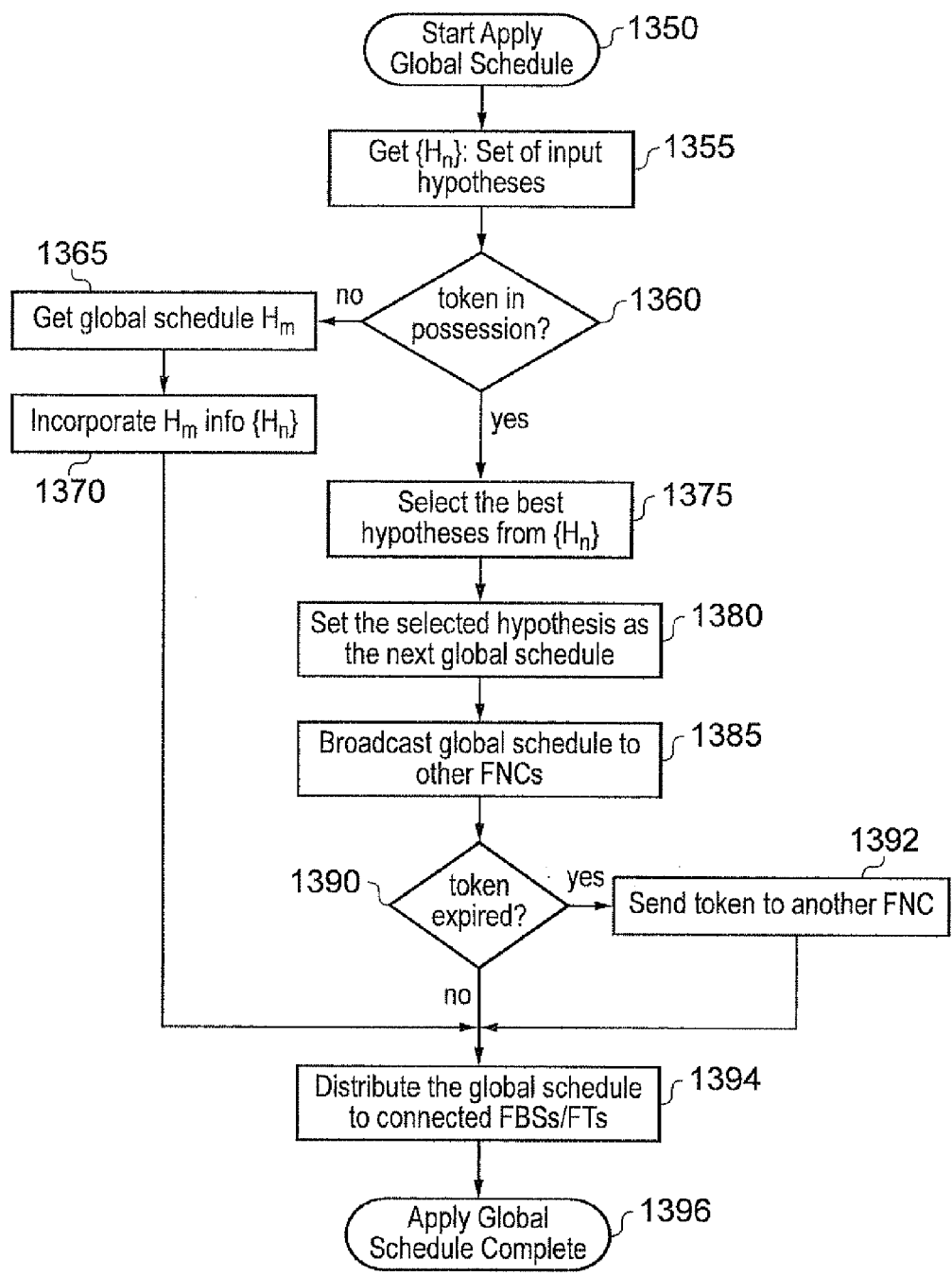
FIG. 38 illustrates the steps performed at step 1230 and at step 1330 of FIG. 37 in accordance with one embodiment.

The steps for computing and applying global schedules in the multi-FNC case generally follow the single FNC case described earlier with reference to FIG. 28. FIG. 37 illustrates the general process performed across multiple FNCs. Accordingly it can be seen that FNC 1 performs the steps 1200 to 1235, which correspond generally with the steps 800 to 835 of FIG. 28. Similarly, FNC 2 performs the steps 1300 to 1335, which again correspond generally with steps 800 to 835 of FIG. 28.

In one embodiment, when initialising the set of hypotheses in each individual FNC, each FNC has regard to its specific controllability matrix given by the combination of C1 and C2. Considering the earlier described FIG. 29, this then involves the additional step between steps 880 and 885 of determining whether the feeder terminal I resides within the controllability matrix specific to that FNC. If it does, then steps 885, 890 and 892 are performed, whereas if not the process just branches directly to step 894. It will be appreciated that by this process, in the initialised set of hypotheses in each FNC, each hypothesised global schedule will be only partly completed.

However, at any point in time the distribution of the global schedule is controlled by one of the FNCs holding a valid token. During the startup phase this setup will simply force traffic through the part of the feeder network associated with the FNC holding the token. However, as will be discussed in more detail later with reference to FIG. 38, the token is passed over time between the various FNCs, and as a result the size of the active network at any point in time will further expand to cover the previous FNC controllability region(s) plus the controllability region of the current FNC. Assuming the token is passed relatively frequently during the startup phase, then this will ensure that the entire network will be up and running very quickly and that the set of hypotheses being considered independently by each FNC will rapidly become fully populated.

With regard to the evaluation of links step described earlier with reference to FIG. 30, the process of FIG. 30 can be applied independently in each FNC. In one embodiment, for any unfilled entry in an input hypotheses, a reward value of 0 will be applied. Over time this will ensure that the more completed global schedules achieve higher rewards, displacing only partly completed global schedules. The step of evaluating the set of hypotheses as described earlier with reference to FIG. 32 can again be applied independently in each of the FNCs in order to produce overall rewards for each hypothesis. Similarly, the step of selecting a set of hypotheses described earlier with reference to FIG. 33 can again be applied independently in each FNC. Further, the step of generating a new set of hypotheses as described earlier with reference to FIG. 34 can be applied independently in each FNC. However, in one particular embodiment, the steps 1065, 1075 and 1080 will be performed such that any particular FNC only alters entries of the hypotheses that are within its associated controllability region as given by the matrices C1 and C2.

As shown in FIG. 37, the process of applying a preferred global schedule involves some inter-FNC communication as indicated by the line 1340. In particular, within each FNC, the step of applying the global schedule in one embodiment follows the process shown in FIG. 38.

The process starts at step 1350, whereafter at step 1355 each FNC gets its associated set of input hypotheses. It is then determined whether the FNC performing the process has the token in its possession at step 1360. If it does, then steps 1375, 1380 and 1385 are followed, these corresponding with the earlier described steps 1110, 1115 and 1120 of FIG. 35, but with the global schedules being broadcast to the other FNCs at step 1385 rather than directly to the FBSs and FTs.

If it is determined at step 1360 that the token is not in the possession of the FNC, then the process proceeds to step 1365, where that FNC gets the global schedule $H_m$, this being the global schedule that has been broadcast by the FNC that is in possession of the token. In addition to using that broadcast global schedule as the current global schedule, at step 1370 the FNC will also incorporate that global schedule into its set of hypotheses. One simple approach to achieve this would be to swap out randomly one of its current hypotheses and replace it by the broadcasted global schedule received at step 1365.

Assuming the FNC does have the token in its possession, and accordingly has performed steps 1375, 1380 and 1385, it is then determined at step 1390 whether the token has expired. If it has, then the token is sent to another FNC at step 1392. Various schemes can be used to decide which FNC to send the token to, but in a simple scheme a round-robin approach is adopted, so that each FNC is responsible for managing the global schedule in turn.

When the process proceeds to step 1394, the current global schedule is distributed to the connected FBSs and FTs. In order to minimise the amount of information sent "over the air" to each FBS, the FNCs will communicate portions of the global schedule that are pertinent to each FBS/FT. Each individual FNC will decide the relevant information based on the controllability matrices C1 and C2. Following step 1394, the step of applying the global schedule is considered complete at step 1396.

By employing multiple feeder network controllers, improved performance can be realised, since the evolutionary algorithm is applied in parallel across multiple feeder network controllers, enabling a faster convergence upon a good solution for an updated global schedule having regard to observed or anticipated traffic loading.

In addition to the above discussed global schedules which a feeder network controller can compute and communicate to the FBSs, in some embodiments the feeder network controller is configured to provide each FBS with an "autonomous schedule". As previously discussed, global schedules for the network are centrally determined by the FNC, seeking to attain high spectral efficiency by providing highly-optimised physical-layer allocations for every FBS-FT link. However, whilst a global schedule may be regularly updated by the FNC, for any specific physical-layer frame the schedule is fixed network-wide. Furthermore, given the computation requirements associated with generating a global schedule, it is expected that updates to the global schedule may occur in a timescale of, say, every few seconds. As such, situations may arise in which the time required to update a global schedule may be too long to respond to rapidly changing network demand. For example, in order to maintain an acceptable quality of service (QoS) for voice data transmission, response times of the order of tens of milliseconds may be required when the bandwidth requirements of particular links in the network are changing rapidly. In such a situation an autonomous schedule, which provides each base station with the ability to schedule its own traffic may be more appropriate.

In general a "schedule" consists of control information indicating how the available resource blocks are to be used and network interference information associated with each resource block. In the case of a global schedule (as discussed above), the following components are specified (in addition to an indication of whether the schedule corresponds to uplink (UL) or downlink (DL) transmission:
  1. Resource Block (RB) assignment, indicated by a FBS ID, FT ID and a resource block ID;
  2. Multiple Input Multiple Output (MIMO) mode, specifying the multi-antenna transmission scheme;
  3. Transmit Precoding Matrix (TX PCM), instructing the operations to map data streams onto antenna ports;
  4. Receive Antenna Selection (RX AS), indicating one or more RX antennas to be used;
  5. Link Quality Indicator(s)—one or more (depending on the MIMO mode) data stream quality measures; and
  6. $R_{r,n}$—a covariance matrix of the interference as seen by the receiver n on RB index r.

In the case of an autonomous schedule, essentially the same parameters are provided, except that the RB assignment may now specify a number of FT IDs, indicating that the specified FBS is being granted the ability to use this RB to establish a link with any one of these specified FTs. Furthermore, the above-listed six parameters are supplemented in an autonomous schedule by a seventh parameter:
  7. RU—a resource utilisation fraction, telling the FBS the probability of using the specified RB.

This resource utilisation fraction (RU) is a function of the number of resource blocks available and the traffic intensity, and can range from a small value up to the maximum of 100%. In other words, when scheduling its own traffic according to the autonomous schedule the FBS selects from the RBs available for establishing a link to a particular FT in accordance with the RU values associated with each RB.

Given the probabilistic nature of the selection of RBs by the FBSs to establish its links and since the autonomous schedules are designed to carry fast-rate, time-varying traffic, it is not possible to precisely determine (and therefore minimise) the intercell interference. Instead an approach is taken which seeks to keep such intercell interference at an acceptable level. The mitigation of intercell interference in the autonomous regions is carried out by: i) interference avoidance, and ii) interference averaging.

i) Interference avoidance is carried by resource partitioning. The RBs in the autonomous region may be subdivided into sets of disjoint RB allocations. A collection of RBs belonging to the same set is called a "group". For example, a re-use 3 partitioning scheme will divide the entire autonomous region into three groups. In this example each group will be associated with a unique channel (RB). Initially, for uplink transmission, the allocation of a FT to a group will be done by considering the visibility regions. FTs in the same visibility regions are selected in a round-robin fashion and randomly assigned to one of the available groups. A similar procedure then follows for the downlink transmission. Further refinement of the FT/RB association may be done using some well known techniques (see, for example: M. Döttling, W. Mohr and A. Osseiran, *Radio Technologies and Concepts for IMT-Advanced*, Wiley, 2009, pp. 360-365), such as Soft Frequency Reuse (SFR), Fractional Frequency Reuse (FFR), or scheduling techniques based on a cost function that includes the interference, path loss and data rates achieved by each receiver.

ii) Interference averaging is accomplished within the autonomous schedule by randomising the physical layer accesses (i.e. the selection of RB) across frequency and in time. The reliability of the transmitted signals is ensured by well established wireless communication techniques such as Forward Error Correction (FEC), and Hybrid Automatic Repeat Request (H-ARQ). In addition, and most importantly, the FNC also specifies an expected interference covariance matrix which takes into account the probability of co-channel interference generated by other FBS-FT links in the same autonomous region. Thus a probabilistic approach is taken to the expected co-channel interference. Whilst in this preferred embodiment the resource utilisation fractions are used as a selection probability when selecting between the resource blocks, in a variant the interference averaging in the autonomous schedule may also be achieved by selecting from said resource blocks such that within a predetermined time period usage of said resource blocks corresponds to said resource utilisation fractions. According to this variant, the allocation of the resource blocks for a given link may for example be performed in a simple round robin fashion, but wherein the resource blocks available for each selection is determined by the need to comply with the resource utilisation fractions in the predetermined time period. For example, to provide a given link any appropriate resource block may be initially selected, but as the predetermined time period elapses, the resource blocks available may be biased such that usage of resource blocks evolves towards the resource utilisation fractions.

Figure 39:
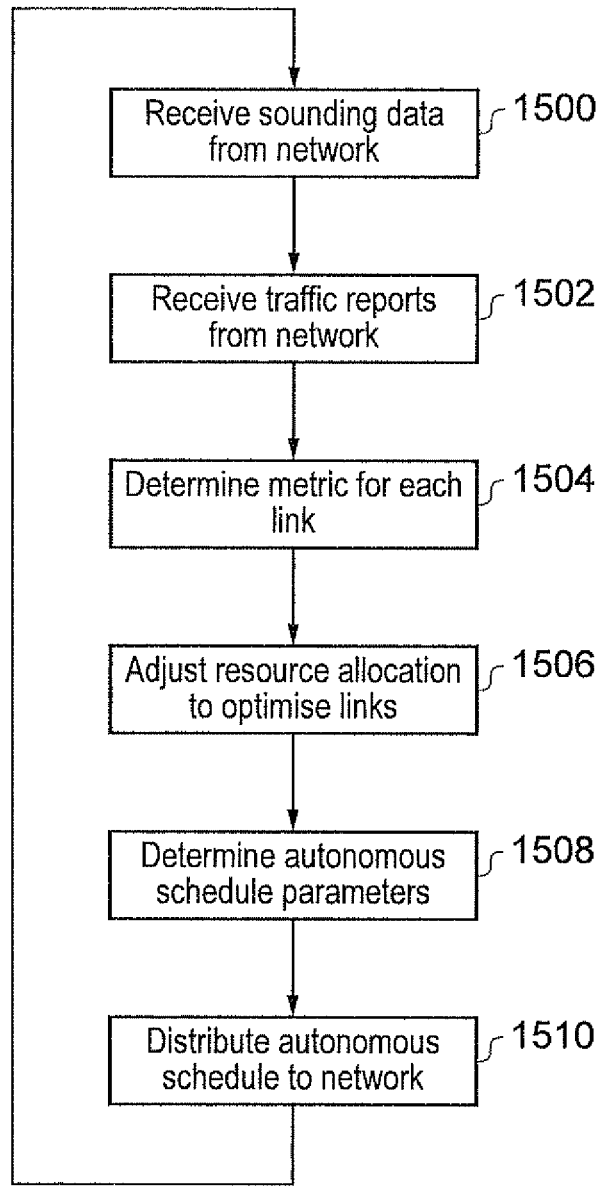
FIG. 39 is a flow diagram schematically illustrating a process performed to compute an autonomous schedule in accordance with one embodiment.

FIG. 39 schematically illustrates the basic steps involved in generating an autonomous schedule in a feeder network controller for distributing to the network. At step 1500 the process is started, where the FNC receives sounding data from the network. This sounding data can yield various channel metrics that include (but are not limited to): channel impulse responses, complex channel frequency responses, frequency dependent co-variance matrices of the received signals, frequency dependent eigenmodes, and so on. Essentially these channel metrics provide a system-wide view of the quality of the wireless channels in use.

Next at step 1502 the FNC receives traffic reports from the network. These traffic reports provide the FNC with detailed information about the network traffic currently being handled, and in particular how the loading of that network traffic is distributed across the various links that comprise the network.

On the basis of the information received at steps 1500 and 1502, at step 1504 the FNC determines a metric for each link. This metric gives the FNC an indication of the current quality of each link (for example this may be an indication of a current rate of packet loss or a current average packet delay, or conversely it may be an indication of the throughput on that link). Having determined the metric for each link, at step 1506 the FNC determines the resource allocation fraction (RU) values, seeking to optimise the links under consideration. For example, the FNC may adjust the RU values such that the rate of packet loss does not exceed a predefined maximum level.

Then, on the basis of these RU values, at step 1508 the FNC determines the other autonomous schedule parameters, in particular determining the co-channel interference matrices $R_{r,n}$ and at step 1510 the autonomous schedule is distributed to the network.

Figure 40:
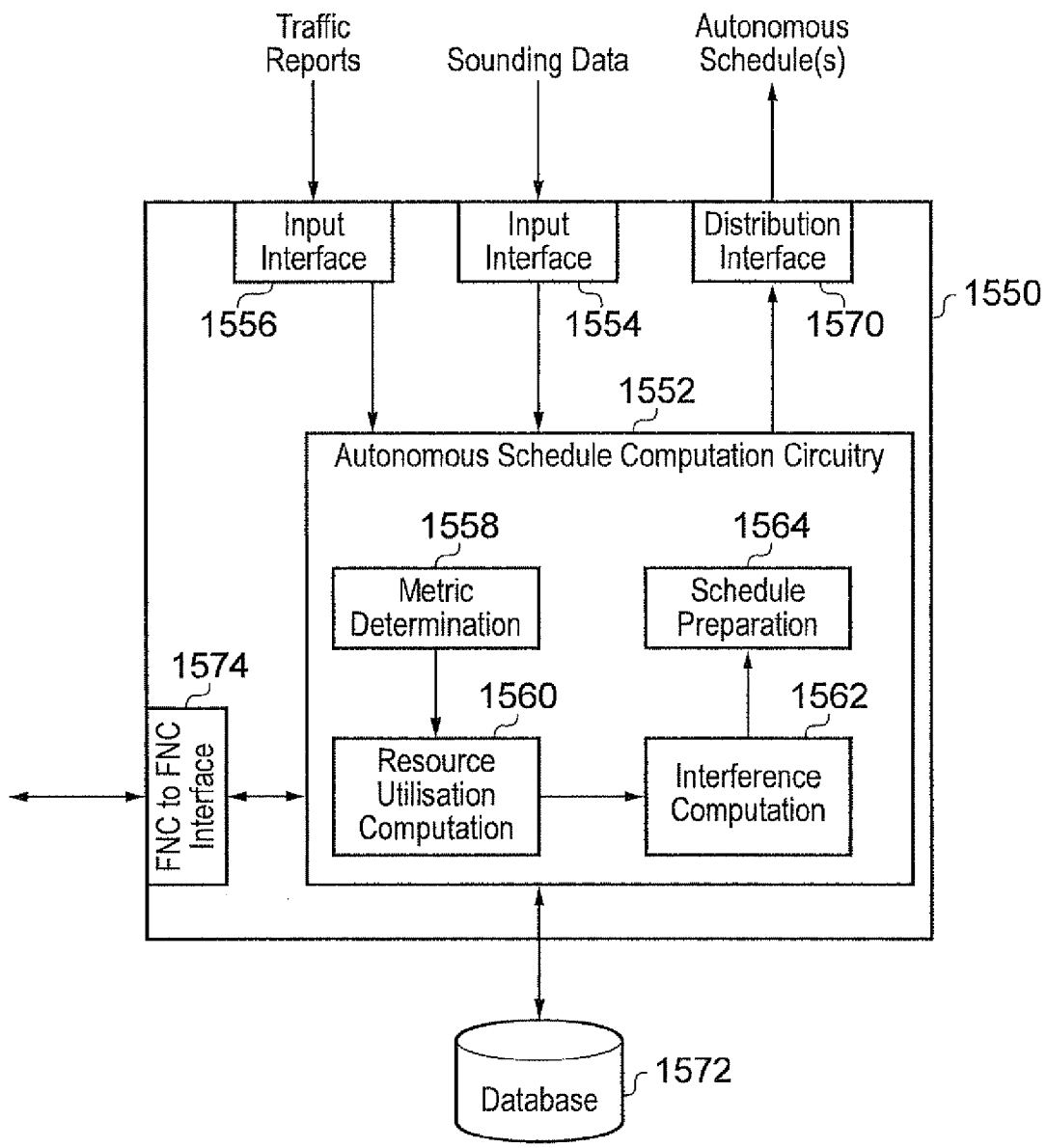
FIG. 40 is a block diagram schematically illustrating the components provided in a feeder network controller is accordance with one embodiment.

FIG. 40 schematically illustrates the configuration of a feeder network controller in this embodiment. Feeder network controller 1550 contains autonomous schedule computation circuitry 1552 for determining resource utilisation fractions, for determining co-channel interference matrices and for generating autonomous schedules. Via the input interface 1554, the autonomous schedule computation circuitry receives sounding data from the network which provides information about the quality of the links in use. Via the input interface 1556, the autonomous schedule computation circuitry 1552 receives traffic reports from the network indicating how the network traffic currently being handled is distributed across the links in the network.

The autonomous schedule computation circuitry 1552 itself comprises a metric determination unit 1558 which is configured to determine the quality of each link on the basis of the received traffic reports. The schedule computation circuitry 1552 also comprises resource utilisation computation unit 1560, which determines the resource allocation fraction (RU) values, seeking to optimise the links under consideration. These RU values are passed to the interference computation unit 1562, which determines the co-channel interference matrices $R_{r,n}$ in a probabilistic fashion on the basis of the RU values. Finally, uplink and downlink autonomous schedules are prepared for distribution in the schedule preparation unit 1564 in which the full parameters required to define each schedule are collated. The autonomous schedules are passed to the network from autonomous schedule computation circuitry 1552 via distribution interface 1570. Autonomous schedule computation circuitry 1552 also has access to a database 1572, in which previous schedules, traffic reports, sounding data and so on can be stored for future reference, and from which previously stored schedules, parameters, data and so on can be retrieved. Finally, feeder network controller 1550 also has an FNC-to-FNC interface 1574 enabling it to exchange data with other feeder network controllers.

Figure 41:
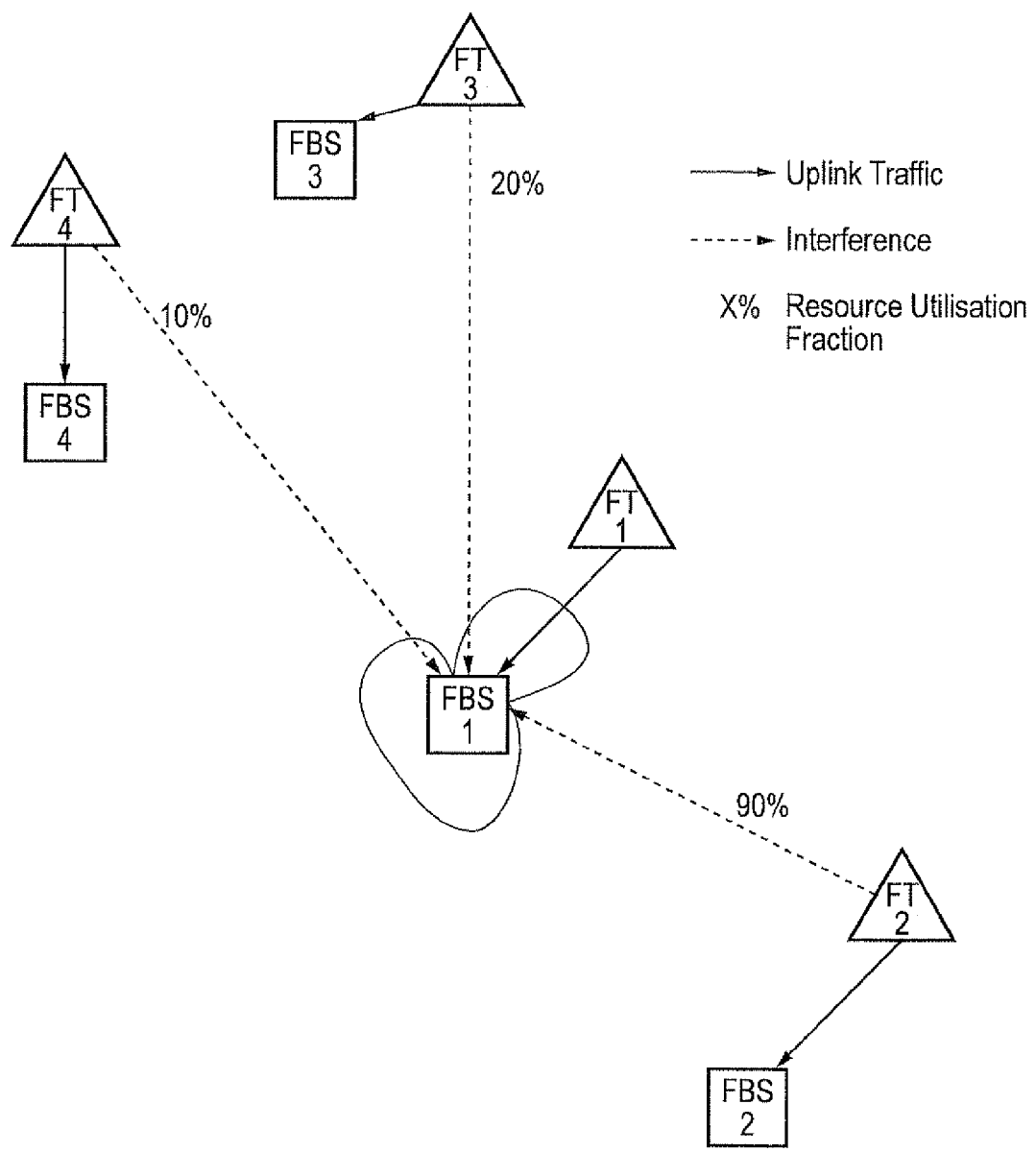
FIG. 41 schematically illustrates co-channel interference between network components in one embodiment.

FIG. 41 illustrates an example arrangement of FBSs and FTs during an uplink schedule, showing how a determined set of co-channel interference matrices for these network components (which takes into account the corresponding resource utilisation (RU) fractions) may determine a selected reception beam shaping to be applied to one of the FBS (in this case FBS 1). The arrangement illustrates four FBSs and four FTS, which (purely for the sake of clarity of explanation here) are configured in this uplink schedule such that FT 1 transmits to FBS 1, FT 2 transmits to FBS 2, FT 3 transmits to FBS 3 and FT 4 transmits to FBS 4.

However, due to the fact that all four of these transmissions are configured to be provided by links which may be established using the same RB, the co-channel interference experienced by each FBS when receiving its uplink transmission needs to be taken into account. The figure is illustrated from the point of view of FBS 1, which is receiving an uplink transmission from FT 1, but may experience co-channel interference due to the simultaneous uplink transmissions generated by FT 2, FT 3 and FT 4. Note in particular that for the RB under consideration, the FT 2-FBS 2 link is allocated an RU of 90%, the FT 3-FBS 3 link is allocated an RU of 20%, and the FT 4-FBS 4 link is allocated an RU of 10%. Given these values, and other parameters such as the relative distances from FBS 1 of the other FTs and information derived from channel sounding, a co-channel interference matrix has been determined for FBS 1. In particular this co-channel interference matrix indicates that the most significant source of co-channel interference for FBS 1 during this uplink schedule using this RB is FT2.

On the basis of the expected co-channel interference matrix, FBS 1 is configured to apply beam weighting to its multiple antenna, to shape the beam pattern in its reception configuration. Hence, one of the nulls of the beam pattern is arranged to be pointed directly at FT2 to suppress that source of co-channel interference. The other null of the beam pattern is arranged to be pointed somewhere between FT 3 and FT 4, since this has been found to give the best co-channel interference suppression that can be attained with only two nulls. A more complex antenna which could be beam weighted in a more sophisticated manner could of course direct nulls at each of the interfering FTs in the illustrated example.

FIG. 42 illustrates how, for a limited number of links (namely between one FBS and three FTs) the resource utilisation fractions are distributed across the orthogonal resource blocks. The figure shows an example autonomous schedule determined for use within the network illustrated in 17. Here the autonomous schedule is determined for $FBS_2$ to schedule the network traffic it exchanges with $FT_{11}$, $FT_{12}$ and $FT_{13}$. As can be seen in the figure, the upper five frequency rows do not form part of the autonomous schedule (all RBs being allocated a zero RU value), whilst the lower 4 frequency rows show the allocated RU values for $FT_{11}$, $FT_{12}$ and $FT_{13}$ respectively. Hence $FBS_2$ is able to use these lower 4 frequency rows to allocate to its own network traffic as required, and is therefore able to respond faster to short term local variations in network usage than would be the case if these resource blocks belonged to a global schedule.

From the above description of embodiments, it will be appreciated that the wireless feeder network of such embodiments provides an efficient wireless backhaul, which can be used to access base stations in cases where the provisioning of wired backhaul would be uneconomic. A typical scenario where the wireless feeder network would be useful would be in a dense urban deployment where pico base stations are deployed on street furniture. The pico base station provides much needed capacity and coverage enhancements, and by eliminating the need for wired backhaul, use of the wireless feeder network has the potential to reduce ongoing operational expense (OPEX). By employing the above described techniques of embodiments, it is ensured that the spectrum is used sparingly in the wireless feeder network, thereby maximising the amount of spectrum available for the access network.

In one embodiment, the wireless feeder network operates in the same band as the access layer. This allows the operator to deploy a pico base station style of network within the constraints of a single RF spectrum license. In accordance with embodiments, it is possible to achieve an average spectral efficiency greater than 10 bits per second per Hertz. This can be achieved within a single frequency network, and enables preservation of spectrum for the access layer.

The wireless feeder network may be deployed in either in-band or out-of-band modes. In-band operation means that the feeder transmissions are multiplexed to operate within the same radio channel as the access layer. Out-of-band operation means a different RF channel may be used, adjacent, non-adjacent or in a completely different RF band to the access layer channel(s).

The wireless feeder network may be deployed in either TDD or FDD modes. TDD is primarily required for compatibility with mobile WiMAX, and FDD with LTE.

As described above, the feeder network controller can provide a centrally administered global schedule to the FBSs or can provide each FBS with a feeder base station administered autonomous schedule in which the recipient FBS is granted the ability to determine for itself how to use one or more resource blocks to establish a link with any one of its associated feeder terminals. The global and autonomous schedules need not be strict alternatives and in some embodiments the feeder network controller is configured to determine an allocation of the resource blocks (RBs) between a global schedule for the network and autonomous schedules for each FBS. This approach enables the benefits of each style of schedule to be gained, providing a balanced approach to the two styles of resource block scheduling. Accordingly, resource blocks which are allocated to the global schedule can benefit from particularly high spectral efficiency by providing highly-optimized physical-layer allocations for specified FBS-FT links, whilst an improved quality of service can be provided in particular in terms of response times to rapidly changing bandwidth requirements of particular links in the network, by also providing the FBs with their own autonomous schedules according to which each base station can schedule a part of its own traffic dynamically.

Figure 43:
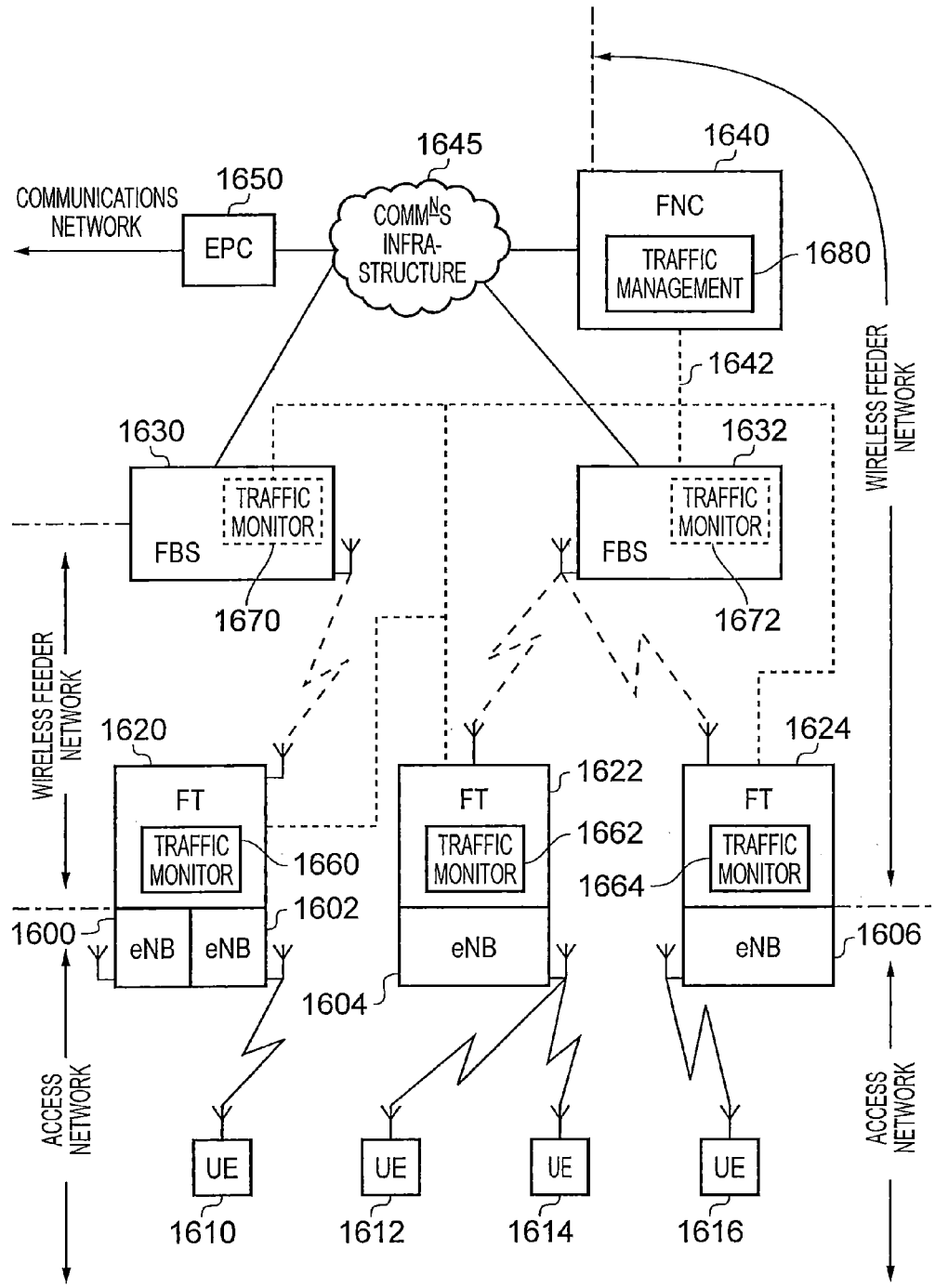
FIG. 43 is a diagram schematically illustrating a network architecture including a wireless feeder network in accordance with one embodiment.

FIG. 43 is a block diagram schematically illustrating a network architecture including a wireless feeder network in accordance with one embodiment in which both global and autonomous schedules are distributed to the FBS. It will be recognised that the structure is similar to that illustrated in FIG. 1. As shown in FIG. 43, a number of access base stations 1600, 1602, 1604, 1606 are provided to communicate with end user equipment (UE) 1610, 1612, 1614 and 1616. In general it should be noted that FIG. 43 illustrates an example network implementing a LTE air interface (with correspondingly labelled components such as EPC, eNB and UE) but the techniques of controlling a wireless feeder network presented here in are equally applicable to other air interfaces such as fixed or mobile WiMax and so on. Each access base station is coupled to a feeder terminal 1620, 1622 and 1624. Note that there may be a one-to-one relationship between an access base station and a feeder terminal (e.g. access base station 1606 and feeder terminal 1624) but there may alternatively be more than one access base station associated with a given feeder terminal (as in the case of access base stations 1600 and 1602 associated with feeder terminal 1620).

The feeder terminals 1620, 1622 and 1624 form a wireless feeder network with the feeder base stations 1630 and 1632. Each feeder base station communicates with one or more feeder terminals via a wireless resource comprising a plurality of resource blocks as described above. The wireless feeder network is controlled by feeder network controller 1640 which in particular determines the allocation of resource blocks between the global schedule for the whole wireless feeder network and the autonomous schedules provided to each FBS. The FBSs 1630 and 1632 are connected via a wired connection to the communications infrastructure 1645, which in term couples the illustrated network via EPC 1650 to the wider communications network. As described with reference to FIG. 1, the FNC 1640 controls the components of the wireless feeder network, this control path being shown here as dashed line 1642 and the control path may in fact be established via wired or wireless means.

Of particular interest in the present context is the provision of the traffic monitoring units 1660, 1662 and 1664 in the feeder terminals 1620, 1622 and 1624 respectively. As will be described in more detail in the following, these traffic monitoring units are configured to monitor the network traffic being carried by the feeder links between the corresponding feeder terminal and its associated feeder base station. Alternatively or in addition a traffic monitoring unit (1670; 1672) may be provided in the feeder base stations 1630, 1632. These traffic monitoring units are configured to gather traffic information and to communicate this to the traffic management unit 1680 in the feeder network controller 1640. The traffic management unit 1680 in feeder network controller 1640 is configured to gather the traffic information transmitted to it from the components of the wireless feeder network and on the basis of this information to determine an appropriate allocation of the resource blocks available in the wireless feeder network to the global schedule and to autonomous schedules for each FBS.

Figure 44:
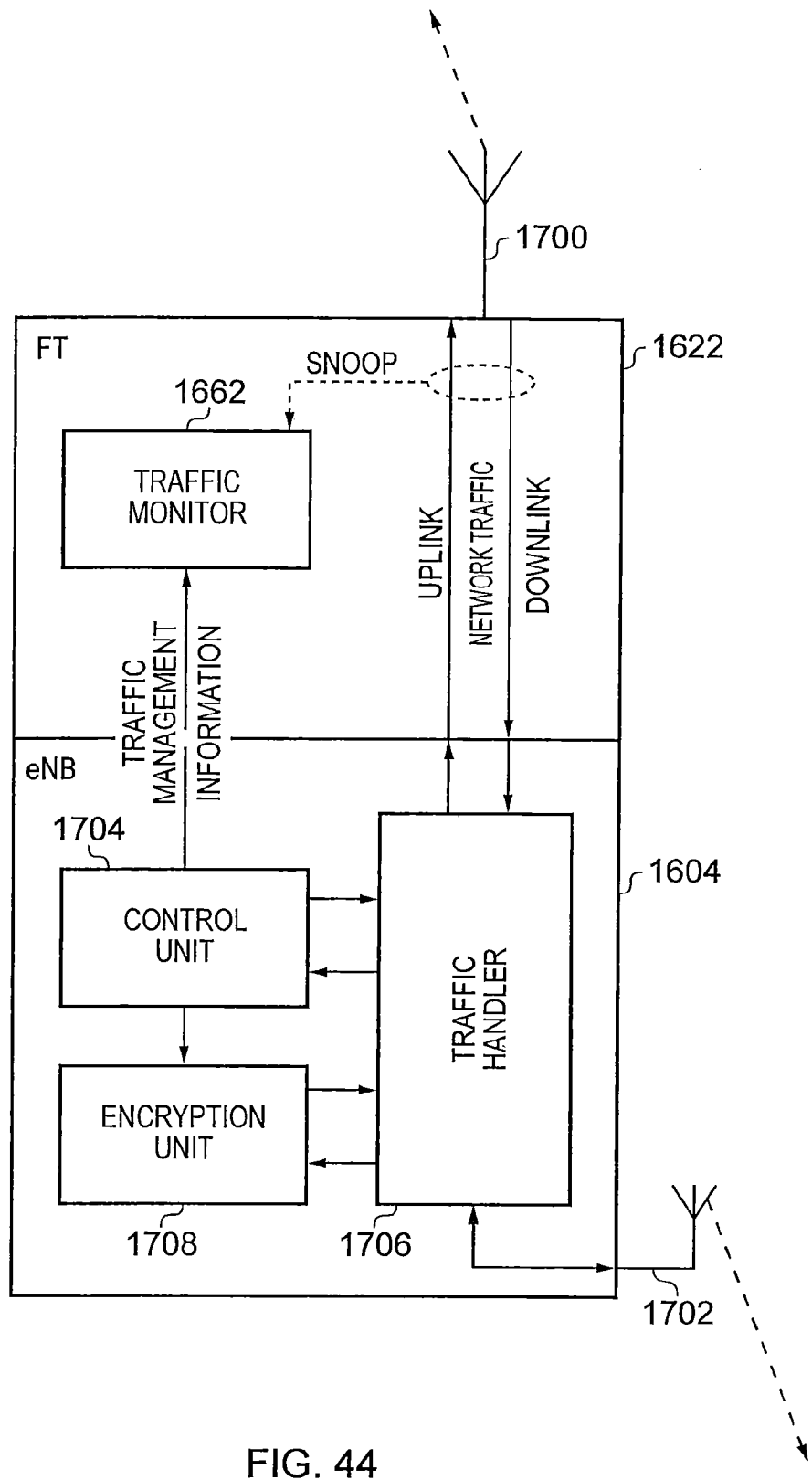
FIG. 44 schematically illustrates a feeder terminal and its associated access base station in accordance with one embodiment.

FIG. 44 schematically illustrates in more detail the configuration of a feeder terminal and its associated access base station, which in the example illustrated in FIG. 44 are the feeder terminal 1622 and eNodeB access base station 1604 of FIG. 43. The feeder terminal 1622 and access base station 1604 share an interface by which certain information can pass between the two. Generally, this interface is used to carry downlink information received by the feeder terminal 1622's antenna 1700 over the feeder link from the associated feeder base station and passed onwards by the associated access base station 1604 on the access network to the appropriate user equipment (UE) via the access base station 1604's antenna 1702. Conversely, uplink network traffic received by antenna 1702 is passed from the access base station 1604 via feeder terminal 1622 to be transmitted from antenna 1700 over the feeder link.

The feeder terminal 1622 is provided with a traffic monitoring unit 1662 which is arranged to monitor the network traffic being carried by the feeder link which couples this feeder terminal to its associated feeder base station. There are two ways in which the traffic monitor 1662 can perform this monitoring function. Firstly, it may "snoop" the network traffic which it receives from and passes to the access base station 1604. Alternately, or in addition, the traffic monitor 1662 can receive traffic management information passed to it from the control unit 1704 in access base station 1604. In the illustrated embodiment in FIG. 44, the feeder terminal 1622 and access base station 1604 are closely associated with one another and are indeed are formed as a single physical unit. Accordingly, the interface between the control unit 1704 and traffic monitoring unit 1662 is relatively easily and securely provided.

The control unit 1704 in access base station 1604 is more generally arranged to control the operations of the access base station itself. In particular, the control unit 1704 controls operation of the traffic handler 1706 which receives uplink network traffic from antenna 1702 and passes it onwards via feeder terminal 1622, as well as receiving downlink network traffic from feeder terminal 1662 and passing it on to antenna 1702. The specific details of the operation traffic handler 1706 are familiar to the skilled person and hence are not described in greater detail herein, however one aspect of the traffic handling operation carried out by traffic handler 1706 is the encryption of data transmitted over the feeder link via the wireless feeder network and onwards to the communications network. This encryption is performed under control of control unit 1704 by means of encryption unit 1708. The encryption of network traffic that passes through feeder terminal 1622 limits the level of detail which the traffic monitor 1662 is able to determine by snooping. For example, when encrypted network traffic is snooped the specific detail of the data being carried will not be accessible, but nevertheless some information such as unencrypted packet headers may nonetheless be visible. Furthermore, the traffic monitor 1662 can still gather statistical information about the network traffic such as information relating to its bit rate and packet size.

In the illustrated example in FIG. 44 the control unit 1704 is configured to pass traffic management information to the traffic monitoring unit 1662 which allows the traffic monitoring unit 1662 to develop a more detailed view of the network traffic being handled. In particular, the control unit 1704 is configured to provide information relating to the type of network traffic being handled (for example VoIP data, browsing data etc) as well as information relating to the transmission protocol being used by the network traffic. The control unit 1704 can further provide the traffic monitor 1662 with information relating to network events, such as when a new user (UE) connects to the access base station 1604 ("signs on"). Accordingly, the traffic monitoring unit 1662 can gain both relatively short term information about the network traffic (such as an indication of a network event such as user sign on) as well as more long term information (such as a statistical picture of the network traffic being handled through this feeder link/feeder terminal).

Figure 45:
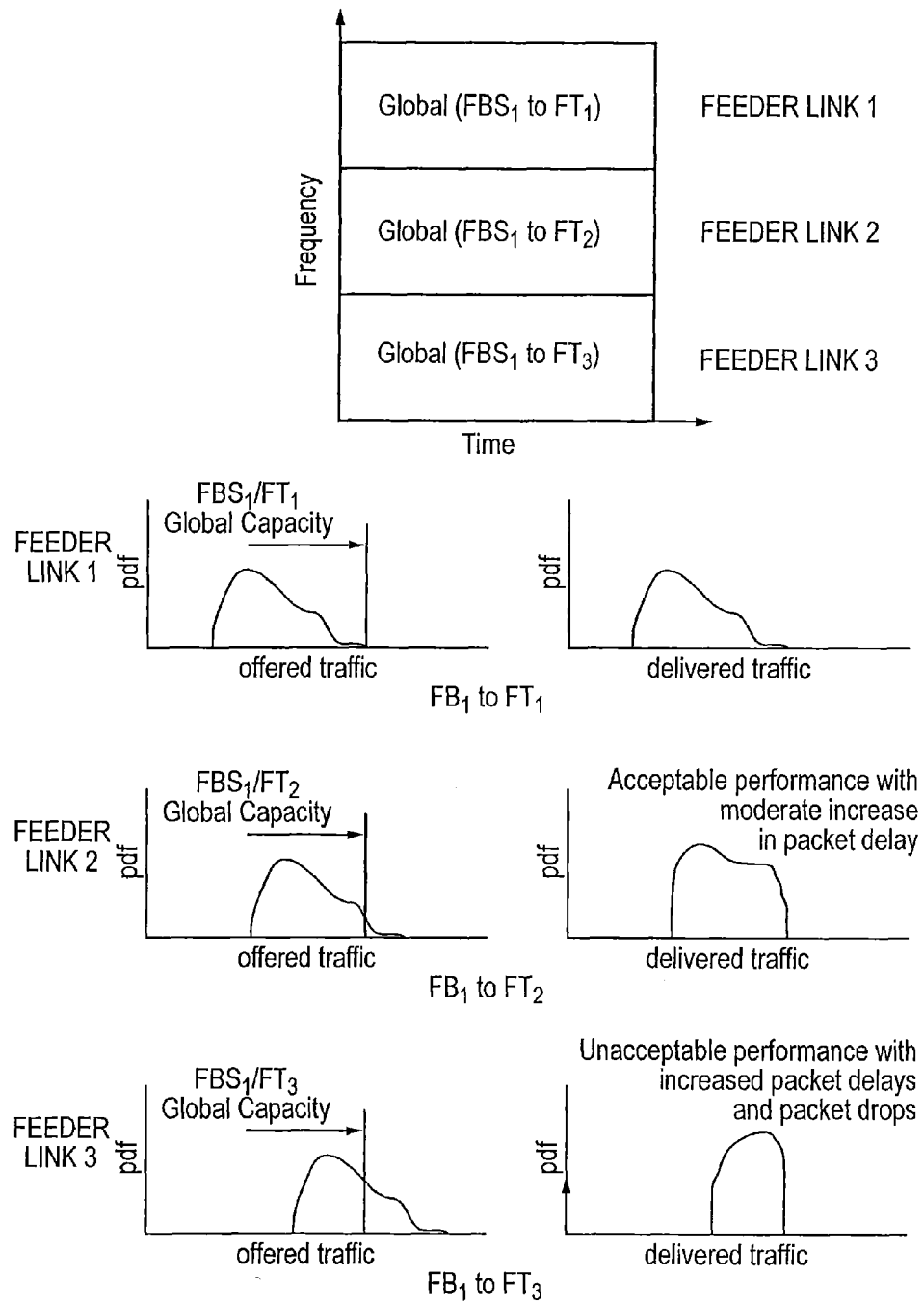
FIG. 45 schematically illustrates the allocation of resource blocks in a centrally administered global schedule and an example of offered and delivered network traffic for various traffic demands (bit rate distributions) using those global schedules.

A statistical view of the network traffic being handled over three example feeder links is now discussed with reference to FIGS. 45 and 46. The upper part of FIG. 45 schematically illustrates the allocation of the wireless resource between feeder links associated with a feeder base station (refer to here as $FBS_1$) which provide the communication path in the wireless feeder network to three different associated feeder terminals (referred to here as $FT_1$, $FT_2$, and $FT_3$). It will be appreciated that the wireless resource division between these three feeder links represents a number of resource blocks being allocated to each feeder link. The allocation of resource blocks to specific feeder links thus represents a global schedule.

The lower half of FIG. 45 illustrates an example of the bit rate distributions offered and delivered on each of the three feeder links, the bit rate distributions being illustrated as probability density functions with respect to the bit rate of the traffic. Each of the three feeder links has the same global capacity as illustrated by the three dotted lines in the "offered traffic" distributions. The three feeder links are presented with different distributions of offered traffic, the spread of offered traffic generally being at higher bit rates for feeder link 2 with respect to feeder link 1, and the distribution of feeder link 3 generally being at higher bit rate than that of feeder link 2. Because the bit rate distribution of the offered traffic on feeder link 1 falls within the global capacity of feeder link 1, the distribution of the bit rates of the delivered traffic can be seen to have the same shape as that offered. In the case of feeder link 2 a small upper tail of the distribution exceeds the global capacity of feeder link 2. This results in a change in the bit rate distribution of the delivered traffic wherein the higher bit rate traffic has been redistributed over bit rates below the global capacity limit of feeder link 2. This comes at the cost of a moderate increase in some packet delays but still results in an acceptable performance. In the case of feeder link 3 it can be seen that a significant proportion of the offered traffic exceeds the global capacity of the wireless resource allocated to this link. Because of this, the amount of traffic which exceeds the global capacity of this link is too great to be absorbed by packet delay alone and not only do longer packet delays result but some packets are dropped entirely (represented by the delta function superimposed on the ordinate axis). Accordingly, taking a wider view of feeder links 1, 2 and 3 together, it can be seen that feeder link 3 has been unable to cope with the traffic which it has been asked to carry, whilst feeder link 2 has operated somewhere near to its full capacity and feeder link 1 has operated with capacity to spare.

Figure 46:
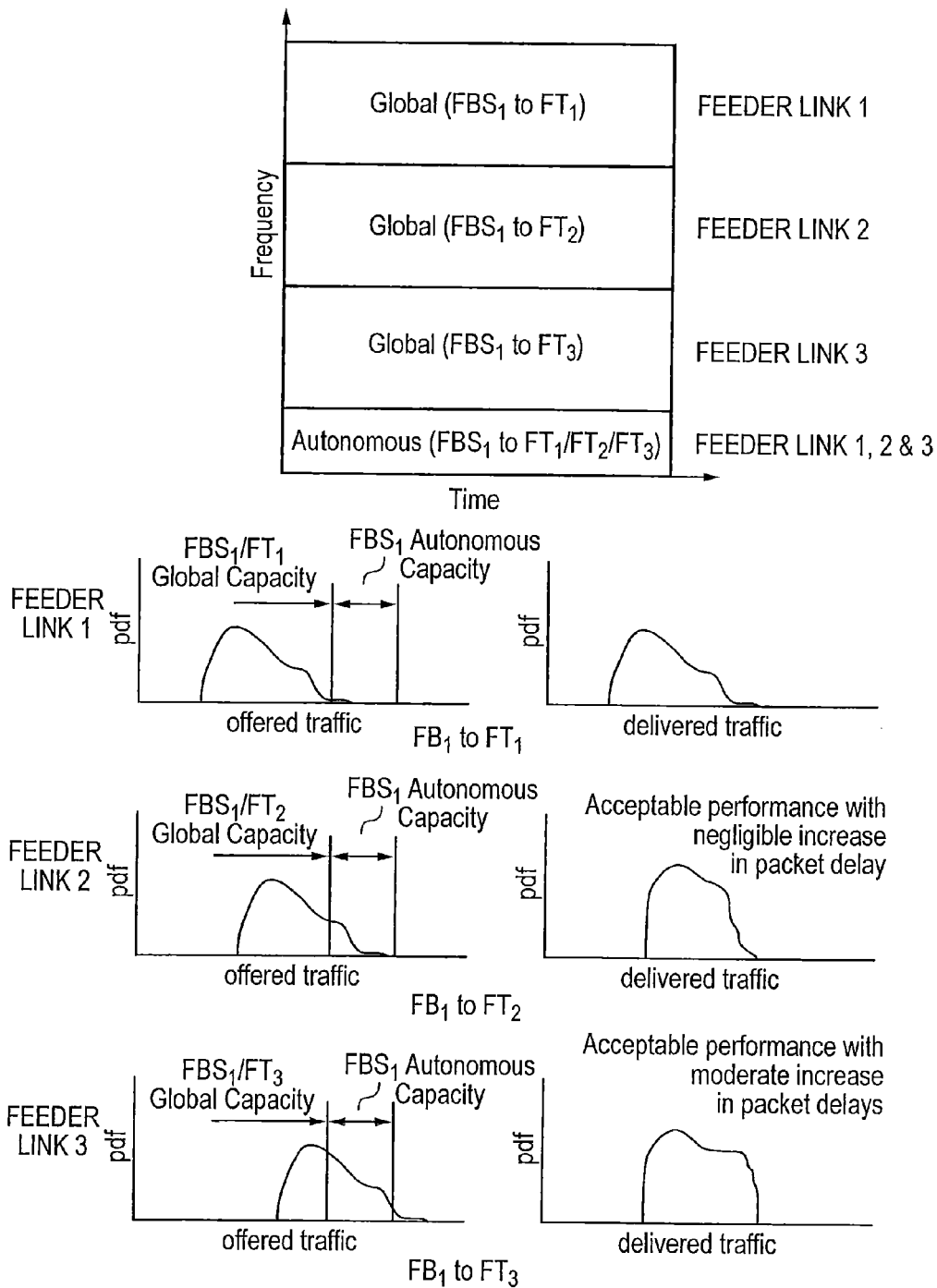
FIG. 46 schematically illustrates an allocation of resource blocks between a centrally administered global schedule and a feeder base station administered autonomous schedule and an example of offered and delivered network traffic for various traffic demands (bit rate distributions) using those example schedules.

Turning to FIG. 46, an example is given of the wireless resource being allocated between a global schedule which associates particular resource blocks with particular feeder links and an autonomous schedule which associates resource blocks with a feeder base station, but leaves the use of those resource blocks to be decided by the feeder base station. Accordingly, it can be seen that by comparison to FIG. 45, a small amount from the global schedule allocated to each feeder link has been taken to provide the autonomous schedule for $FBS_1$ in FIG. 46 (upper part of FIG. 46). Equivalently, in the lower part of FIG. 46 it can be seen that the global capacity allocated to each feeder link has been slightly reduced but additional autonomous capacity is provided (although not simultaneously) to each link in addition its own global capacity. Note that in the lower half of FIG. 46 the same offered traffic distributions for each link are shown as those illustrated in FIG. 45. Accordingly, a very small amount of the upper tail of the offered traffic distribution on feeder link 1 now exceeds the global capacity of that link, but this is easily absorbed by the use of only a small proportion of the autonomous allocated resource. The offered traffic on feeder link 2 now more greatly exceeds to global capacity of feeder link two but the amount of traffic which now falls within the autonomous capacity of $FBS_1$ is still relatively modest and an acceptable performance is achieved with negligible increase in the packet delay. Turning to feeder link 3, it can be seen that significant proportion of its offered traffic exceeds to global capacity of this feeder link and even a small upper tail exceeds the capacity of the feeder link three global capacity and $FBS_1$ autonomous capacity combined. However, the overshoot is very small and the offered traffic is able to be delivered with a still acceptable performance with only moderate increase in the packet delay. Accordingly, by reserving some of the wireless resource for the autonomous schedule which the $FBS_1$ can allocate as required, the three feeder links associated with this FBS have been better able to handle the traffic offered to them.

Figure 47:
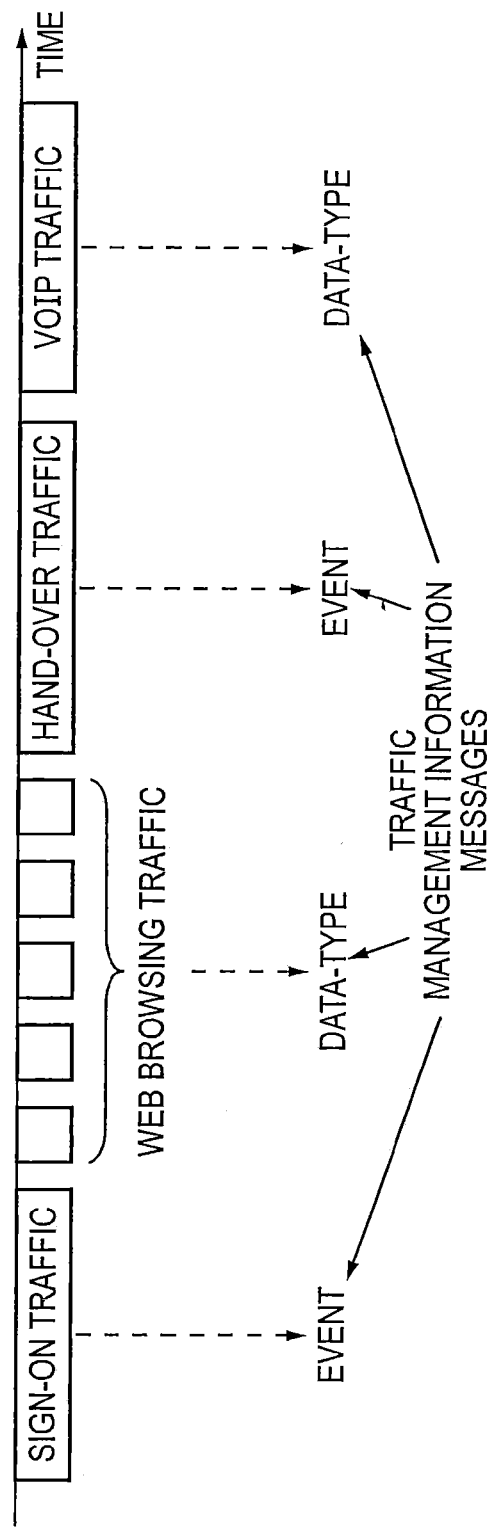
FIG. 47 schematically illustrates changing types of network traffic being carried by a feeder link and the identification of network events and data types therefrom.

FIG. 47 schematically illustrates the derivation of some high level traffic management information messages of the type which can be passed from the control unit 1704 to the traffic monitor 1662 in FIG. 44. Note that the information content of these messages could also be directly derived by traffic monitor 1662 by snooping the network traffic handled by the feeder terminal 1622, if the (lack of) encryption of the network traffic allows the traffic monitor 1662 a sufficiently detailed view of the traffic being handled. The time line in FIG. 47 (which is not linear) shows a first block of network traffic associated with the sign-on of a new UE to the access base station 1604 in the access network. Characteristic aspects of this sign-on traffic can identify this as a notable "network event" which may be signalled from the control unit 1704 to traffic monitor 1662 and/or logged within traffic monitor 1662. Following the sign-on traffic comes a sequence of web browsing traffic which may also be identified (either by the control unit 1704 or the traffic monitor 1662) as such, for example by specific detail of the transmission protocol used or more generally by the traffic structure, mode packet size or other statistical characteristic of a sequence of this type of traffic. Again, this data type may be signalled from control unit 1704 to the traffic monitor 1662 and/or logged as such by the traffic monitor 1662. Network traffic associated with a further "network event" then comes from a hand-over process when the UE (typically due to movement of a user owner of the UE within the geographical range of the access network) changes from one access bass station to another. Finally, another example of a particular type of traffic namely VoIP traffic is illustrated which may be identified as a particular data type.

There are various ways in which different network traffic types could be categorised, but a simple categorisation is illustrated in the table of FIG. 48. These example categories provide an illustration of a range of significant factors in determining how resource blocks of the wireless resource should be allocated both in terms of the split between a global schedule and autonomous schedules and in terms of the particular requirements of each type of data. For example, although VoIP data only requires a relatively low bandwidth, its sensitivity to latency is deemed "critical" since imposing packet delays on this type of network traffic will very quickly result in a perceived lower quality of service for the end user due to the consequent disruption to telephone conversations. Equally, VoIP data is determined to be of "continuous" persistence, in other words the network traffic tends to be relatively even in bit rate and not as "bursty" as say browsing network traffic. Overall, the VoIP network traffic is categorised as high priority. This high priority categorisation can be taken into account when determining the resource block allocation such that a negative impact on the quality of service provided is less likely to occur, even if this is at the expense of, for example some packet delay being imposed on another feeder link which is currently handling browsing data, since this is less likely to be perceived as a drop in quality of service.

Figure 49:
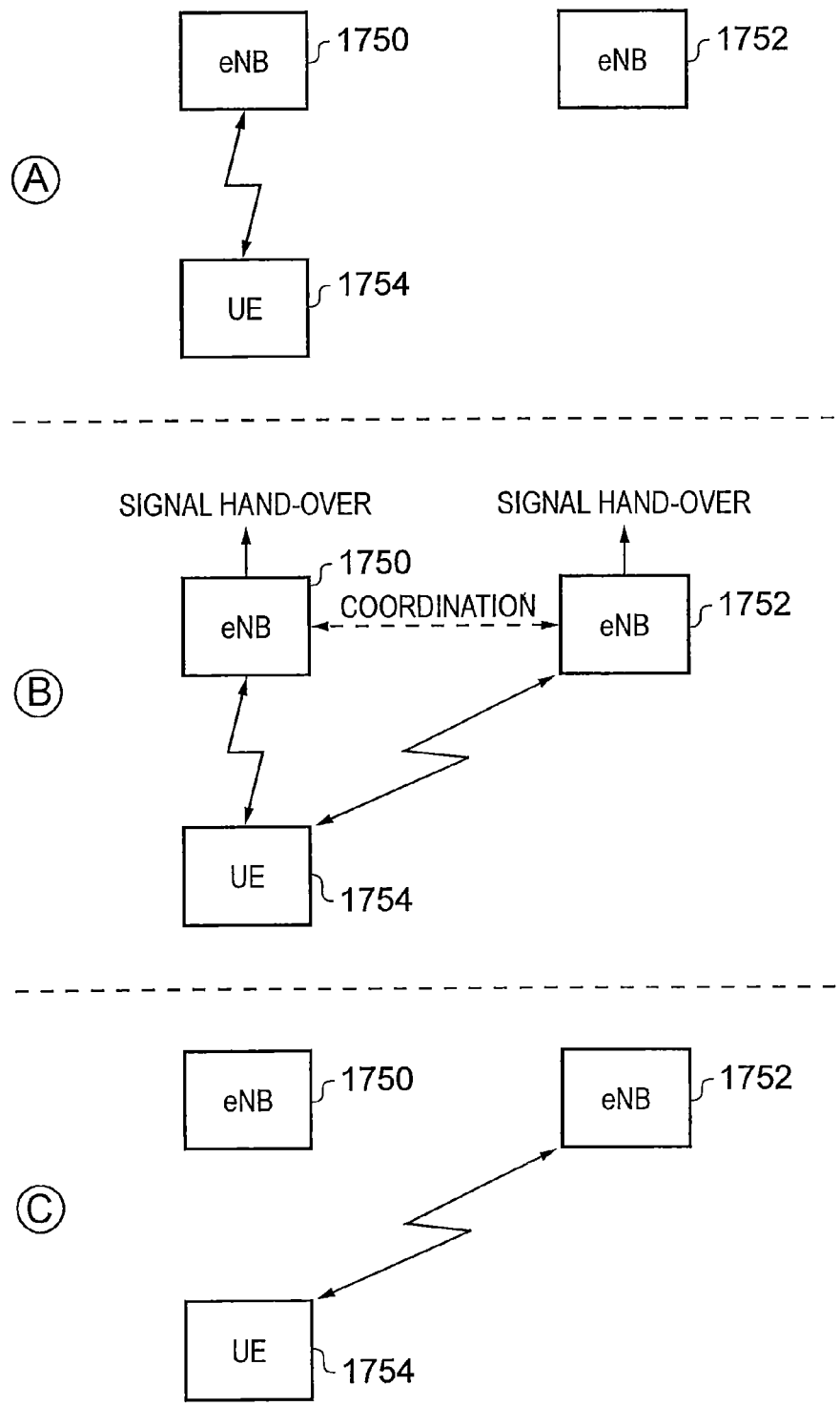
FIG. 49 schematically illustrates the hand-over of user equipment between two access base stations.

FIG. 49 schematically illustrates the hand-over of a UE from one access base station (an eNodeB in the illustrated LTE example) to another access a base station. Accordingly the configuration transitions from the situation illustrated in A in which the UE 1754 is communicating with the access base station 1750 to the situation illustrated in C in which the UE 1754 is communicating with access base station 1752. In order to make this transition the intermediate stage (illustrated in B) takes place in which the handover from access base station 1750 to access base station 1752 is coordinated between the two access base stations and in which the UE 1754 briefly is in communication with both access base stations (i.e. "make before break"). This intermediate state B also represents a point at which either access base station 1750 or 1752 can usefully signal the handover to the wireless feeder network and in particular (via the associated feeder terminal and a feeder base station) to the feeder network controller, such that the allocation of resource blocks can be redistributed to proactively take account of the imminent handover.

Figure 50:
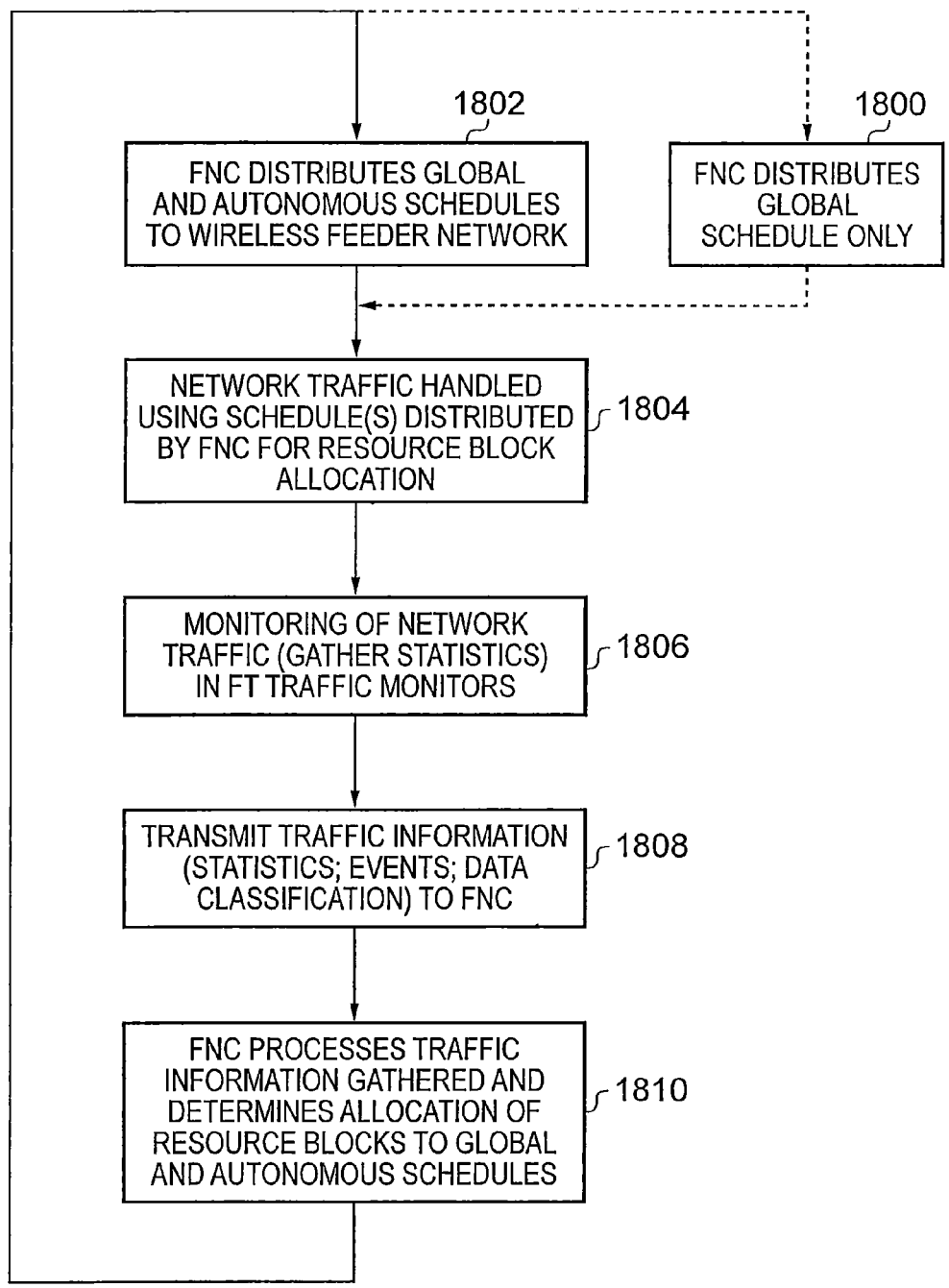
FIG. 50 is a flow diagram schematically illustrating the basic steps performed when allocating resource blocks between global and autonomous schedules in the wireless feeder network in one embodiment.

FIG. 50 schematically illustrates a series of steps taken in an embodiment in which the resource blocks of the wireless resource are allocated between a global schedule and autonomous schedules in the wireless feeder network. In ongoing operation the flow can generally be considered to start at 1802 in which the feeder network controller distributes global and autonomous schedules to the wireless feeder network to configure its operation. However, FIG. 50 also illustrates step 1800 which is an optional step which can be carried out as a preliminary initialisation step in which the feeder network controller distributes only a global schedule to the wireless feeder network. This initial step may be carried out in the example of a newly set up network in which the relative usage of the feeder links is not yet well understood and a global schedule is used to initially gather usage statistics on the basis of which the autonomous schedules may be introduced. Via either step 1800 or 1802 the flow proceeds to step 1804 where the network traffic is handled using the schedule or schedules distributed by the feeder network controller. Step 1806 illustrates the (in fact parallel) step of monitoring the network traffic which is handled by the feeder terminals by their respective traffic monitors. Intermittently (at step 1808) the gathered traffic information is transmitted to the feeder network controller. The frequency with which traffic information is transmitted to the feeder network controller will depend to some extent on the nature of that traffic information. For example, a statistical view of the bit rate distribution of the network traffic handled by particular feeder terminal (for example in the form of a mean value of that bit rate and the variant of that bit rate) may be transmitted to the feeder network controller at predetermined intervals. However, information relating to specific network events which may be expected to cause a step change in the network traffic being handled by a feeder terminal (for example a sign-on event) may be transmitted to the feeder network control as and when such events occur. At step 1810, the feeder network controller processes the traffic information it has gathered and determines a new allocation of the resource blocks between the global and autonomous schedules. The updating of the allocation of resource blocks between the global and autonomous schedules may also take place at regular predetermined intervals (for example on the basis of updated network traffic statistics) or may occur on a more ad-hoc basis (for example of the basis of a network event indication being received). When a new allocation of resource blocks between the global and autonomous schedules has been determined flow returns to step 1802 where these schedules are distributed to the wireless feeder network.

Figure 51:
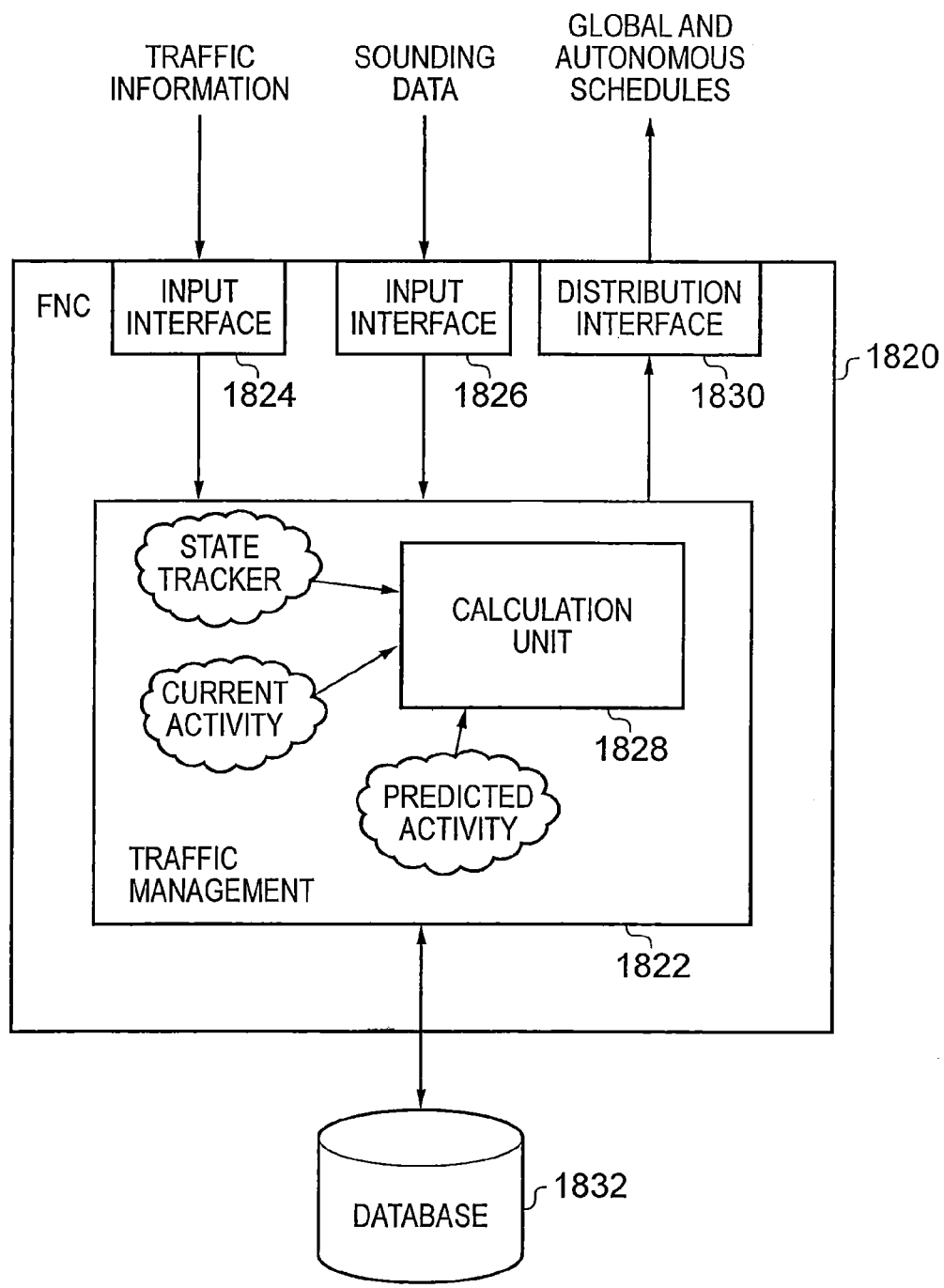
FIG. 51 is a block diagram schematically illustrating the components provided in a feeder network controller in accordance with one embodiment.

FIG. 51 schematically illustrates a configuration of the feeder network controller. It should be understood that this configuration of the feeder network controller is not alternative to the configurations described with respect to FIGS. 7, 27 and 40 but can be viewed as a further configuration of those feeder network controller configurations (which themselves are also complementary rather than exclusive with respect to one another). Feeder network controller 1820 contains traffic management unit 1822 which receives traffic information reports from the wireless feeder network via input interface 1824 together with sounding data (as described above) via input interface 1826 and is configured to determine an allocation of the resource blocks of the wireless resource used by the wireless feeder network between a global schedule and autonomous schedules for the feeder base stations in the wireless feeder network. In general, the traffic management unit 1822 maintains a local model of the state of the wireless feeder network ("state tracker") and also maintains a local model of the network traffic currently being handled in the wireless feeder network ("current activity"). On the basis of this information the traffic management unit determines an allocation of the resource blocks of the wireless resource. In addition, the traffic management unit also predicts how the "current activity" of the wireless network will evolve in the near future, modelling this as a "predicted activity" model of the activity of the wireless feeder network. For example, the "predicted activity" model of the wireless feeder network may be updated by changes in the statistical distribution of the network traffic within the wireless feeder network (on a longer term basis) or network events signalling an expected step change in the distribution of network traffic. The determination of the allocation of the resource blocks is determined by calculation unit 1828 in traffic management unit 1822. Once determined the global and autonomous schedules are distributed for wireless feeder network via distribution interface 1830. The local models which the traffic management unit 1822 maintains ("state tracker", "current activity" and "predicted activity") may for example be held in local memory within the feeder network controller 1820, or (depending on the space requirements for the storage of these models) they may at least in part be stored in the data base 1832 to which the feeder network controller has access. This data base 1832 also can store previous schedules, template schedules, traffic reports, sounding data and so on which may be made use of by the traffic management unit in determining the allocation of resource box between global and autonomous schedules.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of controlling a wireless feeder network used to couple access base stations of an access network with a communications network, the wireless feeder network connecting a plurality of feeder base stations coupled to the communications network and a plurality of feeder terminals coupled to associated access base stations, each feeder terminal having a feeder link with a feeder base station, and the feeder links being established over a wireless resource comprising a plurality of resource blocks, the method comprising the steps of:
   allocating resource blocks for use by said plurality of feeder base stations and said plurality of feeder terminals to establish said feeder links between feeder base stations in the plurality of feeder base stations and feeder terminals in the plurality of feeder terminals;
   wherein said resource blocks are allocated to a centrally administered schedule in which each resource block is associated with a predetermined feeder link and to at least one feeder base station administered schedule in which a set of resource blocks is associated with a predetermined feeder base station, said predetermined feeder base station being configured to implement said feeder base station administered schedule dynamically by using said set of resource blocks depending on current traffic requirements of said predetermined feeder base station;
   monitoring network traffic being carried by said feeder links to determine at least one characteristic of said network traffic; and
   re-allocating said resource blocks to said centrally administered schedule and to said at least one feeder base station administered schedule depending on said at least one characteristic of said network traffic.

2. The method of controlling a wireless feeder network as claimed in claim 1, wherein said monitoring step comprises:
   gathering traffic information in at least one feeder terminal, said traffic information indicative of said network traffic being handled by said at least one feeder terminal.

3. The method of controlling a wireless feeder network as claimed in claim 2, wherein said traffic information is received in said at least one feeder terminal from an access base station associated with that feeder terminal.

4. The method of controlling a wireless feeder network as claimed in claim 3, wherein said step of gathering traffic information is performed by snooping said network traffic being handled by said at least one feeder terminal.

5. The method of controlling a wireless feeder network as claimed in claim 3, wherein said step of gathering traffic information is performed by receiving traffic management information from said access base station associated with that feeder terminal.

6. The method of controlling a wireless feeder network as claimed in claim 1, wherein said monitoring step comprises:
gathering traffic information in at least one feeder base station, said traffic information indicative of said network traffic being handled by said at least one feeder base station.

7. The method of controlling a wireless feeder network as claimed in claim 2, wherein said monitoring step further comprises:
transmitting said traffic information to a feeder network controller, said feeder network controller configured to perform said re-allocating step.

8. The method of controlling a wireless feeder network as claimed in claim 2, wherein said traffic information comprises a statistical representation of said network traffic.

9. The method of controlling a wireless feeder network as claimed in claim 8, wherein said statistical representation of said network traffic is indicative of a bit-rate distribution of said network traffic.

10. The method of controlling a wireless feeder network as claimed in claim 9, wherein said statistical representation comprises a characteristic value derived from said bit-rate distribution.

11. The method of controlling a wireless feeder network as claimed in claim 10, wherein said characteristic value comprises at least one of:
a mean value of said bit-rate; and
a variance of said bit-rate.

12. The method of controlling a wireless feeder network as claimed in claim 2, wherein said traffic information comprises at least one traffic type indication, said traffic type indication being indicative of a predetermined classification of network traffic.

13. The method of controlling a wireless feeder network as claimed in claim 12, wherein said predetermined classification is characterised by a data rate of said network traffic.

14. The method of controlling a wireless feeder network as claimed in claim 12, wherein said predetermined classification is characterised by a periodicity of said network traffic.

15. The method of controlling a wireless feeder network as claimed in claim 12, wherein said predetermined classification is characterised by a sensitivity to latency of said network traffic.

16. The method of controlling a wireless feeder network as claimed in claim 12, wherein said predetermined classification is characterised by a sensitivity to error of said network traffic.

17. The method of controlling a wireless feeder network as claimed in claim 12, wherein said predetermined classification is associated with a predetermined network event.

18. The method of controlling a wireless feeder network as claimed in claim 17, wherein said predetermined network event is at least one of:
a signing-on event;
a hand-over event; and
a signing-off event.

19. The method of controlling a wireless feeder network as claimed in claim 1, wherein said re-allocating said resource blocks is performed on the basis of a network traffic prediction.

20. The method of controlling a wireless feeder network as claimed in claim 19, wherein said traffic information comprises at least one traffic type indication, said traffic type indication being indicative of a predetermined classification of network traffic, wherein said network traffic prediction is determined in dependence on said at least one traffic type indication.

21. The method of controlling a wireless feeder network as claimed in claim 1, wherein said step of monitoring said network traffic comprises identifying a transmission protocol used by said network traffic.

22. The method of controlling a wireless feeder network as claimed in claim 1, wherein said step of monitoring said network traffic comprises identifying a traffic structure of said network traffic.

23. The method of controlling a wireless feeder network as claimed in claim 1, wherein said step of monitoring said network traffic comprises identifying a mode packet size of said network traffic.

24. The method of controlling a wireless feeder network as claimed in claim 1, further comprising the steps, performed prior to allocating said resource blocks between said centrally administered schedule and said at least one feeder base station administered schedule, of:
initially allocating all resource blocks according to said centrally administered schedule; and
initially monitoring said network traffic being carried by said feeder links to determine at least one initial characteristic of said network traffic,
wherein said step of allocating resource blocks is performed in dependence on said at least one initial characteristic of said network traffic.

25. A feeder network controller configured to control a wireless feeder network used to couple access base stations of an access network with a communications network, the wireless feeder network connecting a plurality of feeder base stations coupled to the communications network and a plurality of feeder terminals coupled to associated access base stations, each feeder terminal having a feeder link with a feeder base station, and the feeder links being established over a wireless resource comprising a plurality of resource blocks, the feeder network controller comprising:
a resource block allocation unit configured to allocate resource blocks for use by said plurality of feeder base stations and said plurality of feeder terminals to establish said feeder links between feeder base stations in the plurality of feeder base stations and feeder terminals in the plurality of feeder terminals;
wherein said resource blocks are allocated to a centrally administered schedule in which each resource block is associated with a predetermined feeder link and to at least one feeder base station administered schedule in which a set of resource blocks is associated with a predetermined feeder base station, said predetermined feeder base station being configured to implement said feeder base station administered schedule dynamically by using said set of resource blocks depending on current traffic requirements of said predetermined feeder base station; and
a network traffic monitoring unit configured to monitor network traffic being carried by said feeder links to determine at least one characteristic of said network traffic,
wherein said resource block allocation unit is configured to re-allocate said resource blocks to said centrally administered schedule and said to at least one feeder base station administered schedule depending on said at least one characteristic of said network traffic.

26. A feeder network controller configured to control a wireless feeder network used to couple access base stations of an access network with a communications network, the wireless feeder network connecting a plurality of feeder base stations coupled to the communications network and a plurality of feeder terminals coupled to associated access base stations, each feeder terminal having a feeder link with a feeder base station, and the feeder links being established over a wireless resource comprising a plurality of resource blocks, the feeder network controller comprising:
- means for allocating resource blocks for use by said plurality of feeder base stations and said plurality of feeder terminals to establish said feeder links,
- wherein said resource blocks are allocated to a centrally administered schedule in which each resource block is associated with a predetermined feeder link and to at least one feeder base station administered schedule in which a set of resource blocks is associated with a predetermined feeder base station, said predetermined feeder base station including means for implementing said feeder base station administered schedule dynamically by using said set of resource blocks depending on current traffic requirements of said predetermined feeder base station; and
- a means for monitoring network traffic being carried by said feeder links to determine at least one characteristic of said network traffic,
- wherein said means for allocating resource blocks re-allocates said resource blocks to said centrally administered schedule and to said at least one feeder base station administered schedule depending on said at least one characteristic of said network traffic.

* * * * *